United States Patent
Gottemukkala et al.

(10) Patent No.: US 12,062,002 B2
(45) Date of Patent: *Aug. 13, 2024

(54) UNSTRUCTURED DATA PROCESSING IN PLAN MODELING

(71) Applicant: o9 Solutions, Inc., Dallas, TX (US)

(72) Inventors: Chakradhar Gottemukkala, Austin, TX (US); Umesh Arasu, Coppell, TX (US); Koustuv Chatterjee, Gilbert, AZ (US); Raghav Ranganathan, New York, NY (US); Amit Agarwal, Bangalore (IN)

(73) Assignee: o9 Solutions, Inc., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/835,639

(22) Filed: Jun. 8, 2022

(65) Prior Publication Data

US 2023/0054383 A1 Feb. 23, 2023

Related U.S. Application Data

(63) Continuation of application No. 15/054,036, filed on Feb. 25, 2016, now Pat. No. 11,379,781, which is a continuation-in-part of application No. 14/751,526, filed on Jun. 26, 2015, now Pat. No. 10,614,400.

(60) Provisional application No. 62/018,386, filed on Jun. 27, 2014.

(51) Int. Cl.
*G06Q 10/067* (2023.01)
*G06F 16/38* (2019.01)
*G06F 16/383* (2019.01)

(52) U.S. Cl.
CPC ........... *G06Q 10/067* (2013.01); *G06F 16/38* (2019.01); *G06F 16/383* (2019.01)

(58) Field of Classification Search
None
See application file for complete search history.

(56) References Cited

U.S. PATENT DOCUMENTS

| | | |
|---|---|---|
| 5,918,232 A | 6/1999 | Pouschine et al. |
| 6,983,237 B2 | 1/2006 | Paterson et al. |
| 7,165,037 B2 | 1/2007 | Lazarus et al. |
| 7,222,302 B2 | 5/2007 | Hauser et al. |

(Continued)

FOREIGN PATENT DOCUMENTS

WO  WO-2014032037 A1  2/2014

OTHER PUBLICATIONS

"U.S. Appl. No. 14/751,526, Final Office Action mailed Mar. 27, 2019", 6 pgs.

(Continued)

*Primary Examiner* — Susanna M. Diaz
(74) *Attorney, Agent, or Firm* — Schwegman Lundberg & Woessner, P.A.

(57) ABSTRACT

An unstructured data input is accessed that includes an electronic communication. Content of the unstructured data is parsed to determine one or more terms in the unstructured data input. It is determined that one or more particular elements defined in a structured business data model correspond to the terms. Tags are assigned to the unstructured data based on the terms corresponding to the one or more particular elements, where the tags define an association between the unstructured data and the structured data model.

20 Claims, 30 Drawing Sheets

(56) References Cited

U.S. PATENT DOCUMENTS

| | | |
|---|---|---|
| 7,437,277 B2 | 10/2008 | Benayon et al. |
| 7,571,082 B2 | 8/2009 | Gilpin et al. |
| 7,711,588 B2 | 5/2010 | Ouimet |
| 7,756,901 B2 | 7/2010 | Thier |
| 7,835,893 B2 | 11/2010 | Cullick et al. |
| 7,861,215 B2 | 12/2010 | Tong et al. |
| 7,904,327 B2 | 3/2011 | Phelan et al. |
| 7,908,159 B1 | 3/2011 | Ordonez |
| 7,917,344 B2 | 3/2011 | Butine |
| 7,971,180 B2 | 6/2011 | Kreamer et al. |
| 7,979,248 B2 | 7/2011 | Benayon et al. |
| 8,145,518 B2 | 3/2012 | Cao et al. |
| 8,175,911 B2 | 5/2012 | Cao et al. |
| 8,180,623 B2 | 5/2012 | Lendermann et al. |
| 8,195,709 B2 | 6/2012 | Pulfer |
| 8,200,527 B1 | 6/2012 | Thompson et al. |
| 8,209,216 B2 | 6/2012 | Whipkey et al. |
| 8,214,238 B1 | 7/2012 | Fairfield et al. |
| 8,214,246 B2 | 7/2012 | Springfield et al. |
| 8,230,332 B2 | 7/2012 | Summers et al. |
| 8,260,587 B2 | 9/2012 | Sanchez et al. |
| 8,306,845 B2 | 11/2012 | D'imporzano et al. |
| 8,311,863 B1 | 11/2012 | Kemp |
| 8,352,397 B2 | 1/2013 | Rubin et al. |
| 8,359,216 B2 | 1/2013 | Cao et al. |
| 8,386,300 B2 | 2/2013 | April et al. |
| 8,412,548 B2 | 4/2013 | Benayon et al. |
| 8,612,262 B1 | 12/2013 | Condon et al. |
| 8,712,812 B2 | 4/2014 | Snow et al. |
| 9,363,239 B1 | 6/2016 | Luman et al. |
| 10,614,400 B2 | 4/2020 | Gottemukkala et al. |
| 2001/0004520 A1 | 6/2001 | Nomoto et al. |
| 2001/0027455 A1 | 10/2001 | Abulleil et al. |
| 2001/0049595 A1 | 12/2001 | Plumer et al. |
| 2001/0053991 A1 | 12/2001 | Bonabeau |
| 2002/0065888 A1 | 5/2002 | Wall et al. |
| 2002/0069401 A1 | 6/2002 | Wall et al. |
| 2002/0107994 A1 | 8/2002 | William, III et al. |
| 2002/0169658 A1 | 11/2002 | Adler |
| 2003/0187717 A1 | 10/2003 | Crites et al. |
| 2004/0039499 A1 | 2/2004 | Felke et al. |
| 2004/0138934 A1 | 7/2004 | Johnson et al. |
| 2004/0162743 A1 | 8/2004 | Thier |
| 2004/0163043 A1 | 8/2004 | Baudin et al. |
| 2004/0181378 A1 | 9/2004 | Gilmore |
| 2004/0210509 A1 | 10/2004 | Eder |
| 2004/0249645 A1 | 12/2004 | Hauser et al. |
| 2005/0096950 A1 | 5/2005 | Caplan |
| 2005/0144228 A1 | 6/2005 | Rokosz et al. |
| 2005/0246215 A1 | 11/2005 | Rackham |
| 2005/0261787 A1 | 11/2005 | Plante |
| 2006/0010197 A1 | 1/2006 | Ovenden |
| 2006/0031048 A1 | 2/2006 | Gilpin et al. |
| 2006/0069585 A1 | 3/2006 | Springfield et al. |
| 2006/0116922 A1 | 6/2006 | Homann et al. |
| 2006/0129518 A1 | 6/2006 | Andreev et al. |
| 2007/0038465 A1 | 2/2007 | Jang et al. |
| 2007/0038501 A1 | 2/2007 | Lee et al. |
| 2007/0078869 A1 | 4/2007 | Carr et al. |
| 2007/0118419 A1 | 5/2007 | Maga et al. |
| 2007/0156677 A1 | 7/2007 | Szabo |
| 2007/0219863 A1 | 9/2007 | Park et al. |
| 2007/0299743 A1 | 12/2007 | Staib et al. |
| 2008/0004922 A1 | 1/2008 | Eder |
| 2008/0004924 A1 | 1/2008 | Cao et al. |
| 2008/0052355 A1 | 2/2008 | Lance et al. |
| 2008/0066067 A1 | 3/2008 | Stimpson et al. |
| 2008/0104032 A1 | 5/2008 | Sarkar |
| 2008/0126394 A1 | 5/2008 | Jain et al. |
| 2008/0133299 A1 | 6/2008 | Sitarski |
| 2008/0140688 A1 | 6/2008 | Clayton et al. |
| 2008/0141144 A1 | 6/2008 | Muller et al. |
| 2008/0162480 A1 | 7/2008 | Clayton et al. |
| 2008/0172273 A1 | 7/2008 | Rackham et al. |
| 2008/0221940 A1 | 9/2008 | Cohn et al. |
| 2008/0235179 A1 | 9/2008 | Kurien et al. |
| 2008/0243912 A1 | 10/2008 | Azvine et al. |
| 2008/0312980 A1 | 12/2008 | Boulineau et al. |
| 2008/0313110 A1 | 12/2008 | Kreamer |
| 2009/0018879 A1 | 1/2009 | Flaxer et al. |
| 2009/0112678 A1 | 4/2009 | Luzardo |
| 2009/0192867 A1 | 7/2009 | Farooq et al. |
| 2009/0254825 A1 | 10/2009 | Sichart et al. |
| 2009/0319246 A1 | 12/2009 | Takayama |
| 2010/0070251 A1 | 3/2010 | Sanchez et al. |
| 2010/0082381 A1 | 4/2010 | Merrifield, Jr. et al. |
| 2010/0082386 A1 | 4/2010 | Cao et al. |
| 2010/0082387 A1 | 4/2010 | Cao et al. |
| 2010/0082696 A1 | 4/2010 | Cao et al. |
| 2010/0106561 A1 | 4/2010 | Peredriy et al. |
| 2010/0161360 A1 | 6/2010 | Clement et al. |
| 2010/0179794 A1 | 7/2010 | Shah et al. |
| 2010/0229149 A1 | 9/2010 | Gella et al. |
| 2010/0250683 A1 | 9/2010 | Hoyne et al. |
| 2010/0281241 A1 | 11/2010 | El-nakhily et al. |
| 2010/0325196 A1 | 12/2010 | Beckman et al. |
| 2011/0015958 A1 | 1/2011 | April et al. |
| 2011/0022374 A1 | 1/2011 | Benayon et al. |
| 2011/0060704 A1 | 3/2011 | Rubin et al. |
| 2011/0071811 A1 | 3/2011 | Kuehr-Mclaren et al. |
| 2011/0153685 A1 | 6/2011 | Butine |
| 2011/0307290 A1 | 12/2011 | Rolia et al. |
| 2012/0116850 A1 | 5/2012 | Abe et al. |
| 2012/0151377 A1 | 6/2012 | Schultz et al. |
| 2013/0035985 A1 | 2/2013 | Gilbert |
| 2013/0104099 A1 | 4/2013 | Göres et al. |
| 2013/0151305 A1 | 6/2013 | Akinola et al. |
| 2013/0151315 A1 | 6/2013 | Akinola et al. |
| 2013/0159306 A1 | 6/2013 | Janssen, Jr. et al. |
| 2013/0226907 A1 | 8/2013 | Wolf |
| 2013/0275420 A1* | 10/2013 | Adler .................. G06F 16/9032 707/723 |
| 2013/0295536 A1 | 11/2013 | Khalsa et al. |
| 2014/0032449 A1* | 1/2014 | Kacin .................. H04L 41/0883 707/741 |
| 2014/0058712 A1 | 2/2014 | Gottemukkala et al. |
| 2014/0058798 A1 | 2/2014 | Gottemukkala et al. |
| 2014/0095416 A1 | 4/2014 | Butte et al. |
| 2014/0278985 A1 | 9/2014 | Ramakrishnan et al. |
| 2014/0279753 A1 | 9/2014 | Dalessandro et al. |
| 2014/0322677 A1 | 10/2014 | Segal |
| 2015/0134425 A1 | 5/2015 | Legris |
| 2016/0034512 A1* | 2/2016 | Singhal .................. G06F 16/35 707/741 |
| 2016/0364426 A1* | 12/2016 | Schroetel .............. G06F 16/907 |
| 2017/0140040 A1 | 5/2017 | Gottemukkala et al. |
| 2017/0140310 A1 | 5/2017 | Gottemukkala et al. |
| 2017/0140405 A1 | 5/2017 | Gottemukkala et al. |
| 2019/0378044 A1* | 12/2019 | Jeffery .................. G06N 20/00 |
| 2020/0401962 A1 | 12/2020 | Gottemukkala et al. |

OTHER PUBLICATIONS

"U.S. Appl. No. 14/751,526, Final Office Action mailed May 3, 2018", 20 pgs.

"U.S. Appl. No. 14/751,526, Non Final Office Action mailed Sep. 25, 2017", 14 pgs.

"U.S. Appl. No. 14/751,526, Non Final Office Action mailed Sep. 27, 2018", 21 pgs.

"U.S. Appl. No. 14/751,526, Notice of Allowance mailed Nov. 25, 2019", 6 pgs.

"U.S. Appl. No. 14/751,526, Response filed Feb. 27, 2019 to Non Final Office Action mailed Sep. 27, 2018", 13 pgs.

"U.S. Appl. No. 14/751,526, Response filed Sep. 4, 2018 to Final Office Action mailed May 3, 2018", 13 pgs.

"U.S. Appl. No. 14/751,526, Response filed Dec. 22, 2017 to Non Final Office Action mailed Sep. 25, 2017", 10 pgs.

"U.S. Appl. No. 14/751,526, Response filed Sep. 25, 2019 to Final Office Action mailed Mar. 27, 2019", 11 pgs.

"U.S. Appl. No. 15/054,036 Response filed Dec. 2, 2019 to Non-Final Office Action mailed May 31, 2019", 12 pgs.

(56) References Cited

OTHER PUBLICATIONS

"U.S. Appl. No. 15/054,036, Final Office Action mailed Feb. 4, 2021", 19 pgs.

"U.S. Appl. No. 15/054,036, Final Office Action mailed May 28, 2020", 15 pgs.

"U.S. Appl. No. 15/054,036, Non Final Office Action mailed May 31, 2019", 17 pgs.

"U.S. Appl. No. 15/054,036, Non Final Office Action mailed Sep. 16, 2020", 17 pgs.

"U.S. Appl. No. 15/054,036, Non Final Office Action mailed Sep. 16, 2021", 19 pgs.

"U.S. Appl. No. 15/054,036, Notice of Allowance mailed Mar. 2, 2022", 7 pgs.

"U.S. Appl. No. 15/054,036, Notice of Non-Compliant Amendment mailed Dec. 17, 2019", 4 pgs.

"U.S. Appl. No. 15/054,036, Response filed Jan. 18, 2022 to Non Final Office Action mailed Sep. 16, 2021", 14 pgs.

"U.S. Appl. No. 15/054,036, Response filed Feb. 12, 2020 to Notice of Non-Compliant Amendment mailed Dec. 17, 2019", 8 pgs.

"U.S. Appl. No. 15/054,036, Response filed Jul. 6, 2021 to Final Office Action mailed Feb. 4, 2021", 12 pgs.

"U.S. Appl. No. 15/054,036, Response filed Aug. 28, 2020 to Final Office Action mailed May 28, 2020", 12 pgs.

"U.S. Appl. No. 15/054,036, Response filed Dec. 16, 2020 to Non Final Office Action mailed Sep. 16, 2020", 12 pgs.

"U.S. Appl. No. 16/800,884, Non Final Office Action mailed Oct. 1, 2021", 16 pgs.

"U.S. Appl. No. 16/800,884, Notice of Allowance mailed Feb. 28, 2022", 9 pgs.

"U.S. Appl. No. 16/800,884, Preliminary Amendment filed Sep. 11, 2020", 8 pgs.

"U.S. Appl. No. 16/800,884, Response filed Feb. 1, 2022 to Non Final Office Action mailed Oct. 1, 2021", 11 pgs.

"International Application Serial No. PCT/US2013/056540, International Preliminary Report on Patentability mailed Mar. 5, 2015", 15 pgs.

"International Application Serial No. PCT/US2013/056540, International Search Report mailed Dec. 17, 2013", 3 pgs.

"International Application Serial No. PCT/US2013/056540, Written Opinion mailed Dec. 17, 2013", 13 pgs.

Agarwal, Amit, et al., "Plan Model Searching", U.S. Appl. No. 14/885,764, filed Oct. 16, 2015, 119 pgs.

Gottemukkala, Chakri, et al., "Plan Modeling and Task Management", U.S. Appl. No. 14/752,774, filed Jun. 26, 2015, 82 pgs.

Gottemukkala, Chakri, et al., "Plan Modeling and User Feedback", U.S. Appl. No. 14/751,526, filed Jun. 26, 2015, 54 pgs.

Gottemukkala, Chakri, et al., "Plan Modeling Visualization", U.S. Appl. No. 14/752,810, filed Jun. 26, 2015, 143 pgs.

Gottemukkala, Chakri, et al., "Unstructured Data Processing in Plan Modeling", U.S. Appl. No. 15/054,036, filed Feb. 25, 2016, 95 pgs.

Prabhu, Devaraya, et al., "Business Graph Model", U.S. Appl. No. 14/493,277, filed Sep. 22, 2014, 75 pgs.

* cited by examiner

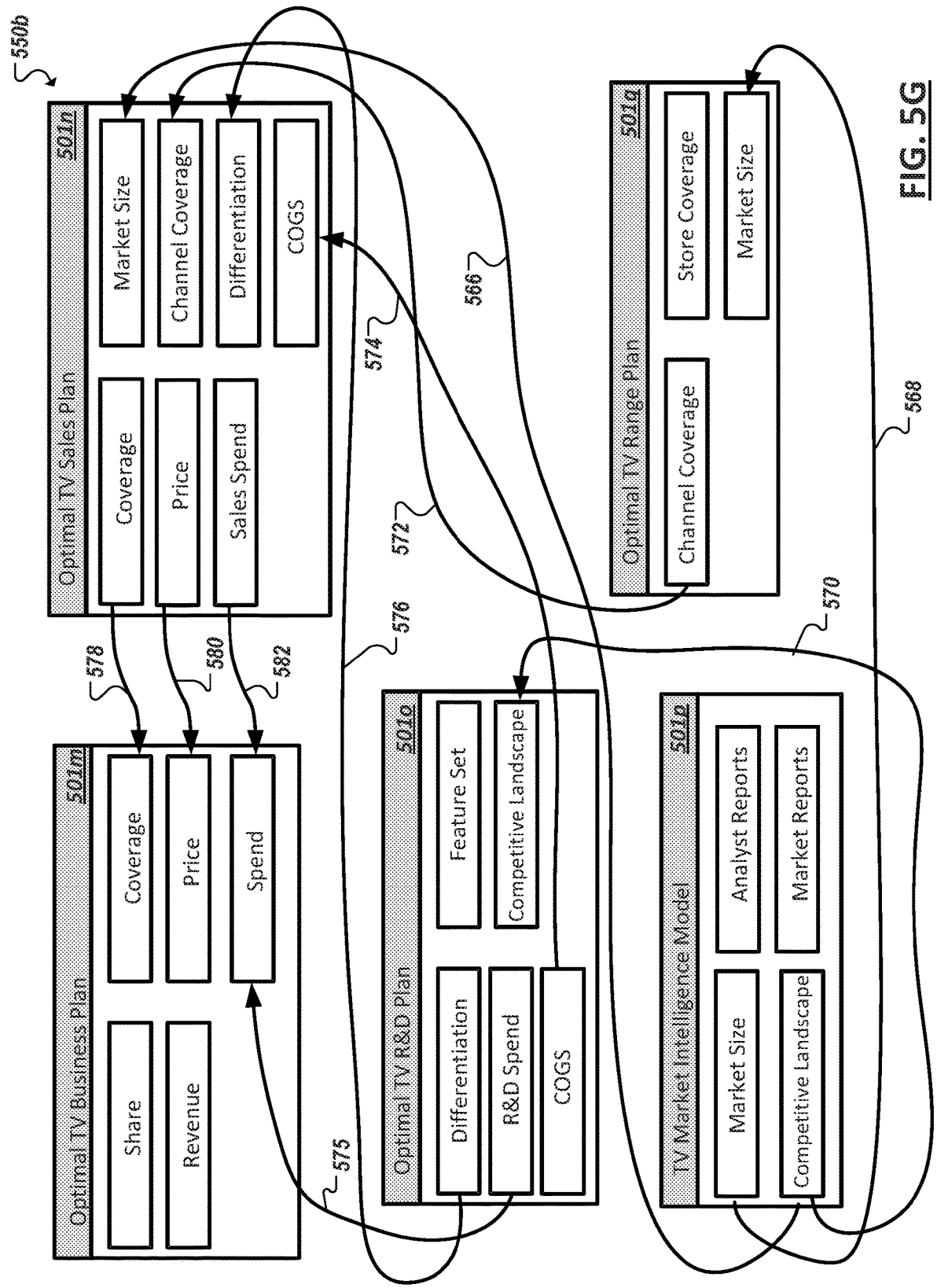

FIG. 9M ations by intelligently connecting structured plans to unstructured collaboration outside the plan, among other example benefits.

UNSTRUCTURED DATA PROCESSING IN PLAN MODELING

CROSS REFERENCE TO RELATED APPLICATIONS

This application is a continuation of and claims priority to U.S. patent application Ser. No. 15/054,036, filed Feb. 25, 2016, which is a continuation-in-part of and claims priority to U.S. patent application Ser. No. 14/751,526, filed Jun. 26, 2015, which claims priority to U.S. Provisional Patent Application Ser. No. 62/018,386, filed Jun. 27, 2014, each of which are incorporated by reference herein in their entirety.

TECHNICAL FIELD

This disclosure relates in general to the field of computer software modeling and, more particularly, to business modeling.

BACKGROUND

Modern enterprises are competing in global markets that are increasingly complex and dynamic. A single enterprise may have a multitude of different departments, managers, and assignments, each having their own respective objectives, plans, and goals commensurate with their respective roles within the enterprise. Additionally, a single enterprise may have one or more enterprise-wide goals that involve the collaboration and involvement of its different departments, managers, and business units. For each goal, an enterprise may develop a plan for realizing the goal. Collaboration within an organization can involve a variety of communication tools and a variety of individuals, including communication via email, instant messaging, teleconferencing, discussion boards, and social networks. Collaboration can also include communications with parties outside the organization. These communications, as well as communications outside the organization, can include information relevant to the goals of the organization.

BRIEF DESCRIPTION OF DRAWINGS

FIGS. 5A-5G are simplified block diagrams illustrating example features and models of example plan models;

FIGS. 9A-9M are screenshots of example user interfaces for use in connection with an example planning system;

Like reference numbers and designations in the various drawings indicate like elements.

DETAILED DESCRIPTION

Figure 1:
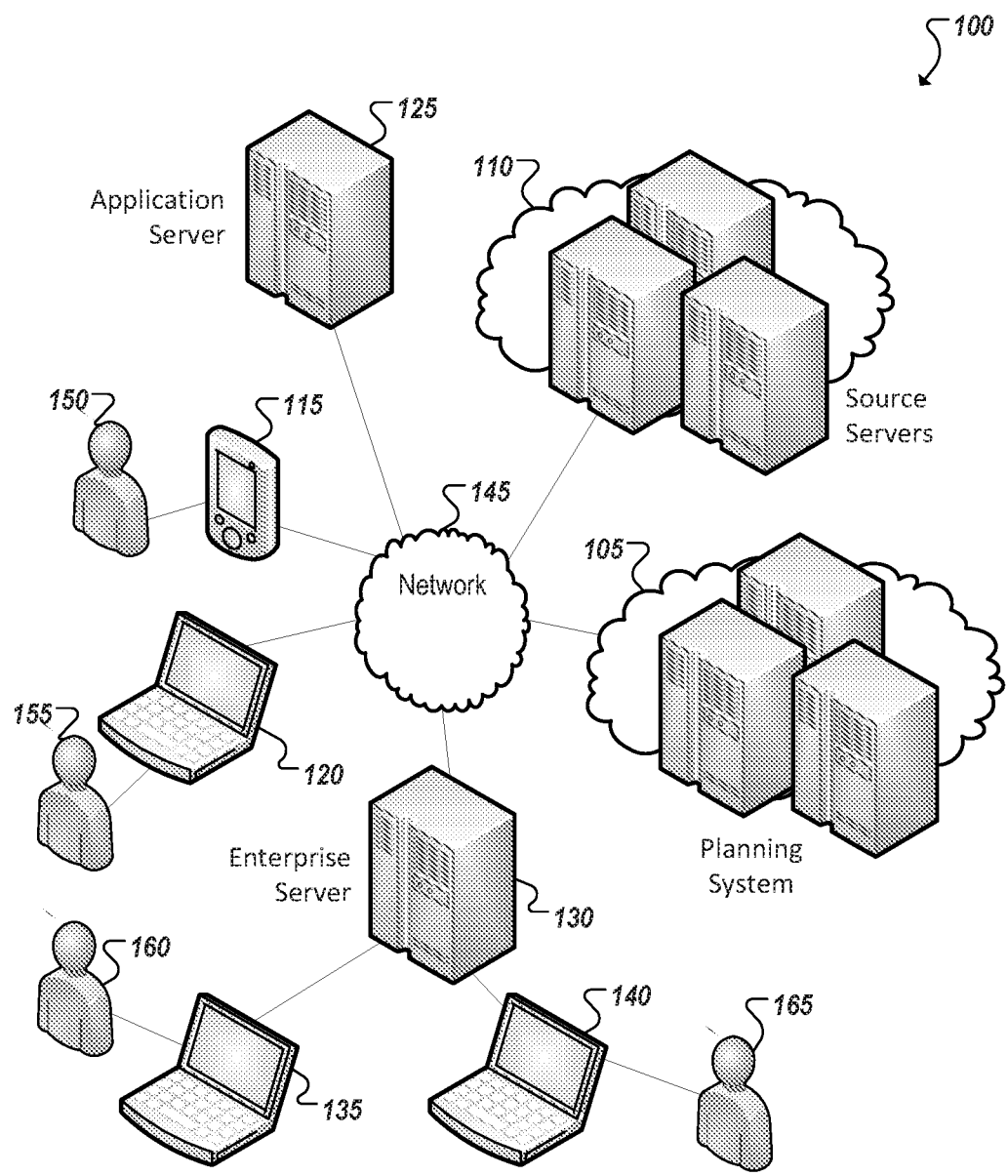
FIG. 1 is a simplified schematic diagram of an example computing system including a planning system.

Modern enterprises can often include complex organizations, such as large multinational corporations with multiple business units and departments operating in multiple different countries, as well as organizations competing in multiple different marketplaces, including multiple product markets and geographical markets, among other examples. Organization can also include stock and commodity markets and exchanges, non-profit organizations, charities, religious organization, educational institutions, joint-ventures, market segments, trade associations, and so on. Such organizations can adopt a variety of goals and plans in connection with their respective operation, including for-profit and not-for-profit goals. Planning and decision-making activities in connection with these goals has become increasingly complex. For instance, such goals can be set at various levels within the organization, including at the organization level (i.e., goals that apply to the entire organization) as well as at various sub-levels, such as the business unit sub-level, the department sub-level, the region sub-level, the office sub-level, etc. Further, separate goals or plans within an organization can be interrelated in that they involve similar business objects, products, or services, or rely on similar or interrelated metrics or other entities. Such business entities can include such entities as product categories, distribution channels, supply channels, customers, products, fiscal calendar terms, geographic regions and sub-regions, etc.

Further, the quality of an organization's business planning activities can be dependent on the quality of the information upon which an organization's (and it's plans') assumptions and goals are based. Collaboration within and outside of an enterprise is prevalent in today's connected enterprise. Such collaboration can include discussion boards, social network threads, email conversations, instant message conversations, voicemail messaging, teleconferencing, text messaging, and other forms of communication. Such collaboration mechanisms can be processed to extract text or other unstructured data describing the conversation(s) (e.g., voicemail or teleconference audio can be converted to text using speech-to-text technologies, among other examples).

In many respects, discussions within and outside of an organization are disconnected today from the enterprise planning process due to a loose coupling or lack of technology to link the sometimes unstructured content of these conversations from the structured nature of an enterprise plan (e.g., as defined in one or more software-based business models). A system can be provided that provide a solution that models the linkage of structured and unstructured content types within discussions that are relevant to a particular product, segment, or plan and contextually present information from these discussions to particular users based on their respective domains of influence. The system utilizes an understanding of the individual entities within a plan as well as the hierarchies corresponding to an associated organization so that relevant discussions can be cascaded along the dimensional hierarchy or activity networks as well. Such a solution can, among other example advantages, reduce the time to action for new information that has a material impact on planning, improve forecast quality through the use of organizational knowledge, and improve quality of assumptions underlying the models used by an organization (as well as gain visibility into these assumptions).

Planning activities can be modeled using software-based models to model the plans, goals, and outcomes within an organization. Such "plan models" (as well as other models) can be accessed and used by systems and users to assist in improving an organization's (or group of organizations') planning activities, as well as the realization of the goals associated with their planning activities. A set of plan models can be provided, each plan model corresponding to a defined domain relevant to an organization and modeling aspects of that domain as well as the inputs and outcomes relevant to achieving or analyzing goals of the specified domain. Plan models can be used to enable interactive, quick, collaborative decision-making within an organization, including along particular user or department roles and functions. Additionally, plan models provide decision-makers of an organization with views into the business entities and attributes relevant to the organization's goals, including views at various levels of abstraction and detail. In general, such plan model and business scenarios can be used to guide the direction of real-world departments and business of an organization, whether for-profit or not-for-profit, to assist in the achieving of the organization's (or multiple organizations') varied goals. In some instances, a plan model can incorporate principles and features of a GraphCube.

FIG. 1 is a simplified block diagram illustrating an example implementation of a computing system 100 including a planning system 105 capable of generating, maintaining, and serving a plurality of models to model aspects of an organization's business and further associate data from user collaborations to improve upon the models used in the organization to coordinate plans, goals, and other objectives of the organizations. Collaboration data can be accessed from a variety of different sources (e.g., 110), including social networking platforms, email servers, online or corporate discussion boards, among other examples. Further, source servers (e.g. 110) can include public and private online sources hosting information used in the models of planning system 105, including information to populate attributes of model instances and information upon which assumptions, targets, and drivers defined in the models of the planning system 105 are based.

In some implementations, a planning system 105 can further include programs, tools, and functionality allowing endpoint devices (e.g., 115, 120), such as user devices, to access and interact with models, including models described in U.S. patent application Ser. No. 13/410,222, filed Mar. 1, 2012 entitled "Global Market Modeling for Advanced Market Intelligence" and U.S. patent application Ser. No. 13/594,723, filed Aug. 24, 2012 entitled "PLAN MODELING", each of which is incorporated by reference herein in its entirety. Users can interact with the models to edit, build, and interlink models, as well as build scenarios from the models, among other functionality and tools, including those discussed explicitly or implicitly herein. Endpoint user devices (e.g., 115, 120) that can include display devices and user interfaces allowing users (e.g., 150, 155, 160, 165) to interact with planning system 105, models hosted or provided through the planning system 105, and applications, programs, and services hosted or provided by the planning system that allow users to perform tasks involving the models, such as developing and comparing scenarios from the models, analyzing and generating working business plans for the organization from the models, among other examples. In some instances, endpoint user devices can include endpoint devices planning system 105 allowing administrators, model developers, and other users to develop and maintain plan models and plan model tools hosted or provided by the planning system 105. Endpoint devices can also include computing devices remote from at least a portion of the planning system 105 and accessing planning system resources, such as model interaction tools and models, from the planning system 105 over one or more networks (e.g., 145). In some implementations all or a portion of the planning system 105 can be distributed to or implemented on endpoint devices (e.g., 115, 120, 135, 140), such as client-specific models, software tools for use by clients in interacting with and using models, etc.

In addition to endpoint devices, other systems can also act as clients of planning system 105. For instance, application servers (e.g., 125) hosting one or more applications, services, and other software-based resources can access and use plan models and functionality of planning system 105 in connection with the applications and services hosted by the application server (e.g., 125). Enterprise computing systems (e.g., 130) (e.g., including an enterprise resource planning (ERP) system)) can also interface with and use models and services provided through an example planning system 105. For instance, enterprise-specific plan models can be developed and used by endpoint devices (e.g., 145, 150) within the enterprise. In some instances, other enterprise tools and software can be provided through enterprise computing system 130 and consume data provided through plan models and plan-model-related services of the planning system 105, among other examples.

In general, "servers," "clients," and "computing devices," including computing devices in example system 100 (e.g., 105, 110, 115, 120, 125, 130, 135, 140, etc.), can include electronic computing devices operable to receive, transmit, process, store, or manage data and information associated with computing system 100. As used in this document, the term "computer," "computing device," "processor," or "processing device" is intended to encompass any suitable processing device. For example, the system 100 may be implemented using computers other than servers, including server pools. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

Further, servers, clients, and computing devices (e.g., 105, 110, 115, 120, 125, 130, 135, 140, etc.) can each include one or more processors, computer-readable memory, and one or more interfaces, among other features and hardware. Servers can include any suitable software component or module, or computing device(s) capable of hosting and/or serving software applications and services (e.g., plan models and plan model applications and services of the planning system 105, applications and services of application server 125, applications and services of enterprise system 130, etc.), including distributed, enterprise, or cloud-based software applications, data, and services. For instance, servers can be configured to host, serve, or otherwise manage models and data structures, data sets, software service and applications interfacing, coordinating with, or dependent on or used by other services and devices. In some instances, a server, system, subsystem, or computing device can be implemented as some combination of devices that can be hosted on a common computing system, server, server pool, or cloud computing environment and share computing resources, including shared memory, processors, and interfaces.

User or endpoint computing devices (e.g., 115, 120, 135, 140, etc.) can include traditional and mobile computing devices, including personal computers, laptop computers, tablet computers, smartphones, personal digital assistants, feature phones, handheld video game consoles, desktop computers, internet-enabled televisions, and other devices designed to interface with human users and capable of communicating with other devices over one or more networks (e.g., 145). Attributes of user computing devices, and computing device generally, can vary widely from device to device, including the respective operating systems and collections of software programs loaded, installed, executed, operated, or otherwise accessible to each device. For instance, computing devices can run, execute, have installed, or otherwise include various sets of programs, including various combinations of operating systems, applications, plug-ins, applets, virtual machines, machine images, drivers, executable files, and other software-based programs capable of being run, executed, or otherwise used by the respective devices.

Some computing devices (e.g., 105, 110, 115, 120, 125, 130, 135, 140, etc.) can further include at least one graphical display device and user interfaces allowing a user to view and interact with graphical user interfaces of applications and other programs provided in system 100, including user interfaces and graphical representations of programs interacting with models and modeling tools and services provided, for example, by a planning system 105. Moreover, while user computing devices may be described in terms of being used by one user, this disclosure contemplates that many users may use one computer or that one user may use multiple computers.

While FIG. 1 is described as containing or being associated with a plurality of elements, not all elements illustrated within system 100 of FIG. 1 may be utilized in each alternative implementation of the present disclosure. Additionally, one or more of the elements described in connection with the examples of FIG. 1 may be located external to system 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2:
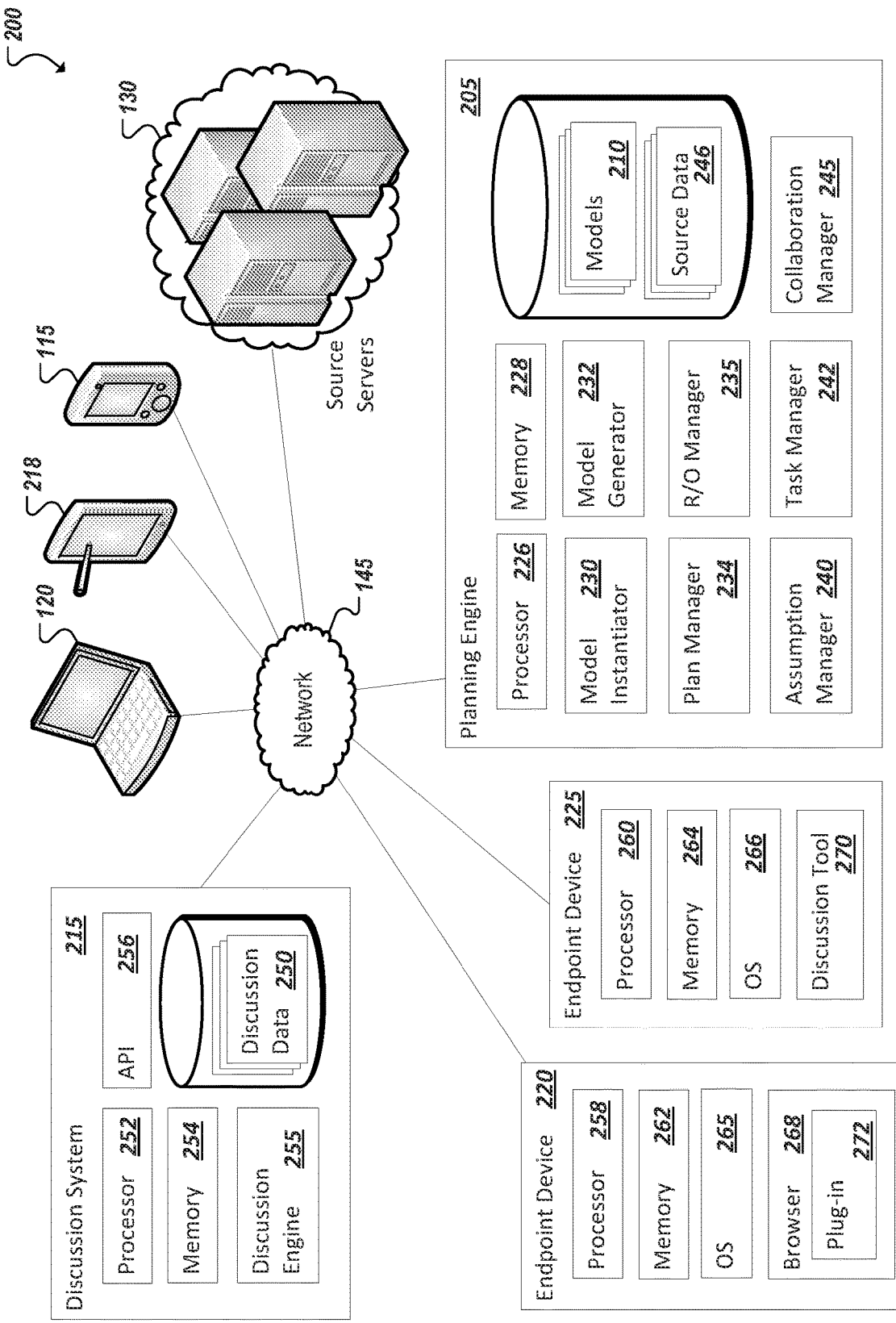
FIG. 2 is a simplified block diagram of an example system including an example planning engine.

Turning to FIG. 2, a simplified block diagram 200 is shown of an example system including an example planning engine 205. In some instances, planning engine 205 can be hosted by a planning system, such as the planning system 105 described in the example of FIG. 1. In other examples, instances of a planning engine 205 (including multiple distinct instances) can be hosted on enterprise computing platforms and other computing environments accessing and otherwise making use of plan models (e.g., 210). A planning engine 205 can host, serve, maintain, access, or otherwise provide a set of models 210 used to model business entities, relationships between these entities, potential business outcomes of a particular organization or plurality of organizations, among other examples. A planning engine 205 can additionally include functionality for using, building, and editing these models 210. Additional, functionality can be provided to mine user-generate feedback data (e.g., from discussion system 215 and/or source servers 130) to supplement and improve upon models 210 as well as assumptions relied upon in the models 210. Moreover, the example system 200 of FIG. 2 can further include one or more additional computing devices, systems, and software-based tools (e.g., 115, 120, 130, 215, 220, 225, etc.) communicating with plan model engine 205, for instance, over one or more networks (e.g., 145).

In one example implementation, a planning engine 205 can include one or more processors (e.g., 226) and memory elements (e.g., 228), as well as one or more software- and/or hardware-implemented components and tools embodying functionality of the planning engine 205. In some examples, a planning engine 205 can include, for instance, such components and functionality as a model instantiator 230, model generator 232, plan manger 234, risk and opportunity (R/O) manager 235, assumption manager 240, task manager 242, and collaboration manager 245, among potentially other additional or alternative components, modules, and functionality, including combinations of functionality and tools described herein. In addition, in some implementations, a planning engine can include models 210 either hosted local to the planning engine 205 or accessed from remote model servers or other data stores. Functionality of planning engine 205 can access, utilize, and consume models generated through or in connection with the planning engine 205 as well as potentially models of other business modeling systems (e.g., another instance of a planning system and engine belonging to another enterprise distinct from the enterprise or host of planning engine 205), among other examples.

In some implementations, an example model instantiator 230 can include functionality for identifying and accessing models 210, including plan models and models modeling entities within an organization including products, services, departments, and business units within the organization, among other examples. In some implementations, a model instantiator can also identify instances where a plan model is to be generated, edited, or otherwise modified. An example model generator 230 can be included possessing functionality for creating or editing plan models. In some instances, a plan model can be generated by instantiating an instance of a preexisting plan model, plan model template (or class), among other examples. Further, in some implementations, user interfaces and controls can be provided in connection with an example model generator 232 allowing human or automated users to input data to populate attributes of various model instances. In some instances, source data (e.g., 246) can also be collected, requested, retrieved, or otherwise accessed to populate attribute fields, build logic of the plan model, and be otherwise used (e.g., by model generator 232) to generate an instantiation of a particular model for addition to the set of plan models 210.

In some cases, models used and generated by planning engine 205 (e.g., through model instantiator 230 and model generator 232), can include models of entities, assumptions, processes, and scenarios relating to a plan of an organization. Such plan models can be defined by an organization as a model of a current working plan, goal, assumption, or approach to be considered by the organization both in its analysis of other business scenarios as well as drive the real world behavior and decision-making of the organization. Various versions of one or more plan models (or other models that relate to or support the modeling of an organization's plan(s)) can be tracked and managed using an example plan manager 234. For instance, a plan manager 235 can manage status of plan models, including modeled scenarios generated based on plan models. For example, a particular modeled scenario can be designated as a current working model, adopted business plan, etc. of an organization, and serve as a guide to the organization's decision makers and employees. The plan manager 234 can further include functionality for generating hypothetical business scenarios based on one or more plan models. Such scenarios can include modeled scenarios based on particular or varying input drivers (e.g., modeling real world business-related inputs affecting a particular business goal or outcome), as well as based on particular goals (e.g., modeling hypothetical conditions that could result in a particular outcome). Additionally, some implementations of plan manager 234 can further include functionality adapted to provide guidance to users in connection with the generation or modification of a particular scenario or comparisons of generated scenarios. Further, implementations of a plan manager 234 can additionally include functionality for comparing generated scenarios, for instance, to determine whether a particular scenario is superior to another. In instances where a user determines that a particular modeled scenario is superior to other scenarios, including scenarios previously designated as current or adopted working models, the particular scenario can be flagged, saved, promoted, or otherwise specially designated, for instance, as a working or adopted scenario of the organization relating to particular goals of the organization, among other examples.

As noted above, in some instances, a particular plan model in a set of plan models 210 can model business outcomes relating to a particular business unit, department, domain, or sub-organization of an organization. Accordingly, some plan models may better relate to or be understandable to particular subsets of users and decision-makers within an organization. Indeed, one or more plan models can be provided and associated with each department, business unit, etc. of an organization having associated plan models in the network relevant to the particular entities, outcomes, work, and goals of that sub-organization. With each sub-organization utilizing, controlling, and accessing its own related plan models, collaborative decision-making and scenario-planning can be accomplished across an organization as the network of plan models interplay and interconnectedness of various goals and outcomes of the various sub-organizations. Indeed, in some implementations, interactions with some models, including plan models, can be at least partially restricted, limited, or otherwise organized to provide varying levels of access to the models based on a user's respective association with, ownership, or expertise in the sub-organization, product, business, unit, etc. to which the particular models are related. In connection with this, models can be defined and used to define such aspects as users' roles, identities, and attributes as well as the users' respective permissions, access, and associations to one or more respective models, among other examples.

While information can be obtained from more structured or organized sources, such as websites, online articles, databases, and other sources of market or organization information, organizations themselves generate large amounts of data through digital communications and collaborations within the organization (or to and from the organization and third party customers, vendors, partners, etc.). In some implementations, a collaboration manager 245 can be provided that can mine discussion data (e.g., 250) acquired by, sent to, or accessible to the planning engine 205 and identify discussions and collaborations that relate to entities and/or plans modeled in models 210. As models 210 can define relationships between entities, between plans, between entities and plans, etc., associations identified in discussion data can be extended based on the relationships defined in models 210. While collaboration manager 245 can include logic for identifying associations between discussion data (e.g., 250) and models 210, collaboration manager 245 can also include functionality to provide or supplement a user interface to permit tagging of discussion data by users to more manually associate a given discussion with one or more models. The collaboration manager 245 can provide a subset of available tags and these tags can be based on relationships and entities defined in models 210. The collaboration manager 245 can further utilize models 210 by identifying particular persons, such as department, segment, or business unit owners or managers that are associated with a particular plan or entity, which the collaboration manager has identified as associated with a particular discussion or collaboration in discussion data 250, among other examples.

Additional tasks and actions can be performed on discussions identified (e.g., by collaboration manager 245) as associated with a given business entity or plan. For instance, user feedback can be received to identify at least a portion of a discussion as evidence of a risk or opportunity associated with the related business entity or plan. A risk can be an event, circumstance, trend, or condition that suggests that a business entity or plan (e.g., modeled in models 210) will be affected negatively. An opportunity, on the other hand, can be an event, circumstance, trend, or condition that suggests that a business entity or plan is likely to be affected or impacted positively. Users, appreciating the implication of a condition, fact, event, etc. expressed in a particular portion of a discussion, can tag that portion of the discussion as representing a risk or opportunity. The risk or opportunity can then be associated with any plans or business entities identified as associated with the discussion. An R/O manager 235 can be provided to implement this functionality, including defining associations between risks and opportunities and modeled entities and plans, as well as supporting user interfaces receiving user inputs indicating whether a discussion is evidence of a risk or opportunity, among other related functionality.

A discussion, or part of a discussion, can also serve as evidence of the accuracy (or inaccuracy) of an assumption (e.g., a particular attribute value, formula, relationship, etc.) upon which a model (e.g., in 210) depends. For instance, the content of a user entry in a discussion can indicate that an assumption over- or under-estimates a condition or effect, or alternatively indicate that an assumption is on target. Assumptions can be tracked and adjusted where appropriate. An assumption manager 240 can be provided in some implementations to allow authorized users to track the historical accuracy of assumptions in one or more models 210. The basis for determining that an assumption is accurate or not can be established through empirical data from sources (e.g., 130), such as empirical data that indicate the true value realized for a particular measure. The basis of an assumption's accuracy can also be based on information expressed by users in discussion data 250. Assessing the accuracy of an assumption can be done retrospectively (e.g., after the actual value or relationship has been observed for comparison with the corresponding assumption used in the model) or prospectively (e.g., based on information that indicates that the assumption is likely to end up being accurate/inaccurate). Further, as prospective feedback is received regarding the accuracy of an assumption, an owner of the model(s) relying on the assumption can be notified (e.g., using planning engine 205 logic) to allow the owners to assess the effect of the feedback on the model, as well as plans defined by the model. In some cases, a user can adjust an assumption to account for new information obtained from feedback received (e.g., in discussion data) indicating that the assumption is not entirely accurate.

Tasks related to plans and business entities modeled in models 210 can be defined and managed using, for instance, a task manager 242 of planning engine 205. In some cases, functionality can be provided to assign tasks based on user feedback or discussions received in connection with planning engine, including associated discussion data identified by collaboration manager 245, risk and opportunity indications defined using RIO manager 235, and assumption feedback received through assumption manger 240, among other potential e examples. For instance, a task can be assigned based on a risk or opportunity identified by a user or in response to an indication that a particular assumption is inaccurate. Such tasks can relate to investigating and/or addressing the issues related to the respective indication. Additionally, such user feedback and discussion data can be associated with an existing task or with a new task during the definition of the task, to assist the users assigned to perform and supervise the task with additional context and intelligence relating to the assigned task. The task manager 242 can provide further functionality, including monitoring and tracking progress of a task, task assignments, and other functions related to the creation, assignment, and management of tasks relating to business and planning and associated models 210, among other examples.

Discussion data (e.g., 250) can be obtained from a variety of sources. For instance, a discussion system 215, such as a private or public social network platform, instant messaging platform, discussion board platform, or other platform or tool facilitating discussion and/or collaboration between users, can generate discussion data describing the communications of users utilizing the discussion system. The discussion system can be owned by an organization and facilitate discussions specifically for that organization, or the discussion system can be a platform offered as a service to multiple customers and used by multiple different organizations. In some implementations, an example discussion system (e.g., 215) can include one or more processors (e.g., 226) and memory elements (e.g., 228), as well as one or more software- and/or hardware-implemented components and tools embodying functionality of a discussion engine 255 that provides the discussion or collaboration platform to users.

Users can participate in discussions and collaboration provided by discussion system 215 utilizing various endpoint devices (e.g., 115, 120, 218, 220, 225, etc.). Endpoint devices can include one or more processors (e.g., 258, 260) and memory elements (e.g., 262, 264), an operating system (e.g., 265, 266), as well as one or more applications and other software programs, including programs (e.g., 268, 270, 272) that facilitate interaction with discussion system 215. In some implementations, a discussion system (e.g., 215) can provide a web-based interface accessible using an internet browser (e.g., 268). In other instances, a discussion system client, such as a discussion tool 270, can be installed on the endpoint device (e.g., 225) to allow a user to utilize the discussion platform hosted by discussion system 215. In either case, users can generate discussion posts and other discussion and collaboration data, as well as view the discussion posts generated by others utilizing endpoint devices (e.g., 220, 225). In some cases, functionality can be provided by the discussion system 215 itself to support tagging and feedback of discussion posts and discussion data by users in connection with the features provided by planning system 205, including risk and opportunity tagging, associating discussions with models 210, providing assumptions feedback, among other examples. In other instances, a discussion client can be provided with supplemental functionality to permit a user to provide additional inputs in connection with a discussion or collaboration hosted by discussion system 215, such as indications of an association with a model, indication of a risk or opportunity, indication of the accuracy of one or more model assumptions, among other examples. In some instances, a specialized discussion tool (e.g., 270) can be provided with such additional functionality (e.g., compatible with planning system 205), or the discussion tool (such as a web browser) can be supplemented with a plug-in or other software tool that provides users with the ability to provide planning-related feedback in connection with discussions or collaborations facilitated through a discussion system 215, among other implementations.

User inputs received from user endpoints in connection with discussions hosted by discussion system 215 can be described in discussion data. Other discussion or collaboration data (collectively discussion data) can be collected by other systems, such as email servers, discussion board servers, etc., and planning system 205 can access discussion data from potentially multiple different sources. For instance, the collaboration manager 245 can access discussion data from various sources (e.g., 130, 215) and identify portions of the discussion data that correspond to plans and/or business entities modeled by models 210. In some cases, an application programming interface (API) (e.g., 256) can be provided through which the planning engine can access discussion data generated, collected, or otherwise managed by the discussion system 215. In still other implementations, the discussion system 215 can be integrated with planning engine 205 and facilitate discussions and collaborations to be associated with information included in models 210.

Figure 3:
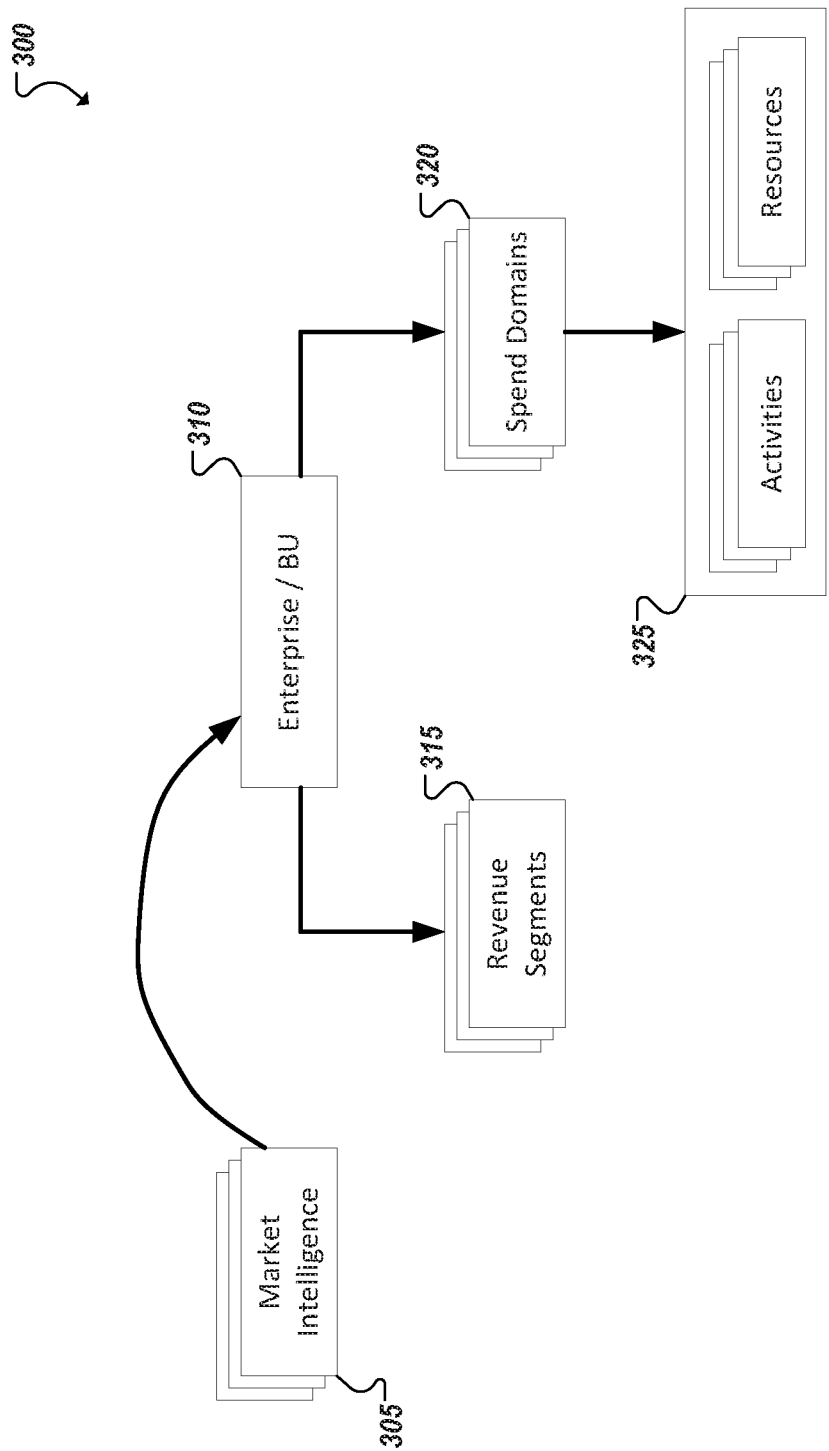
FIG. 3 is a simplified block diagram representing principles of a business model.

Turning to the example of FIG. 3, a simplified representation 300 is shown representing principles of an example modeling approach (such as implemented in models 210). An enterprise can be modeled using dimensional and activity network constructs. For instance, such constructs can be derived from an industry reference model that forms the basis of modeling any enterprise within the industry. The reference model shown in FIG. 3 includes some of the basic entities that reflect some of the key plans and models to depict an enterprise. For instance, market intelligence 305 (collected from one or more sources) can be used to develop a model of an enterprise 310, which further models the various revenue segments 315 pursued by the enterprise (or business unit) and the spend domains 320 of the enterprise. Models of these revenue segments and/or spend domains can include additional sub-models (e.g., 325), such as models of activities and resources within each spend domain, among other examples. The various plans and models (e.g., of a model of enterprise 310) can be linked through measures and relationships. The relationships between the various plan entities can include relationships that are hierarchical in nature modeled using dimensional constructs or relationships that are relational and modeled using either association matrix constructs or graph network representations, among other examples. The models can incorporate both these types so that relationships include both hierarchical and related concepts. This translates to a rich metadata representation within the application that understands and maintains relationships for the various elements including ancestors (parent relationships), descendants (children relationships), siblings, related, associated, etc. Meta-models can be further maintained to define these relationships, including dimensional and graph meta-models (e.g., (dimensions, hierarchies, attributes, network, relationships etc.)

Figure 4:
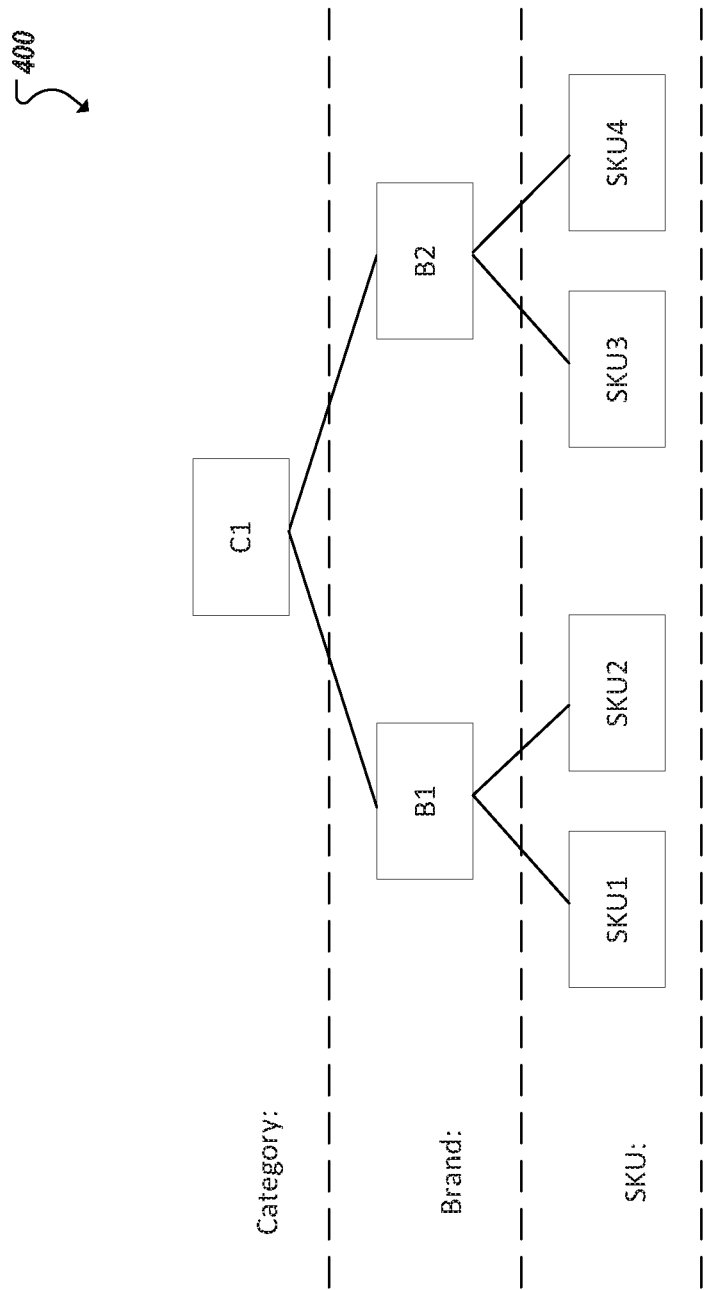
FIG. 4 is a simplified block diagram representing principles of hierarchical relationships defined in business models.

FIG. 4 is a simplified representation 400 of hierarchical relationships defined for an example product dimension, such as can be defined in corresponding meta-models of a planning system. For instance, the example product dimension can be hierarchical in nature, with each product/service category (e.g., C1) having corresponding brands (e.g., B1, B2) under the category. The brands can have individual products (or services) under the brand within the hierarchy, such as SKU1 and SKU2 under brand B1, etc.

Figure 5A:
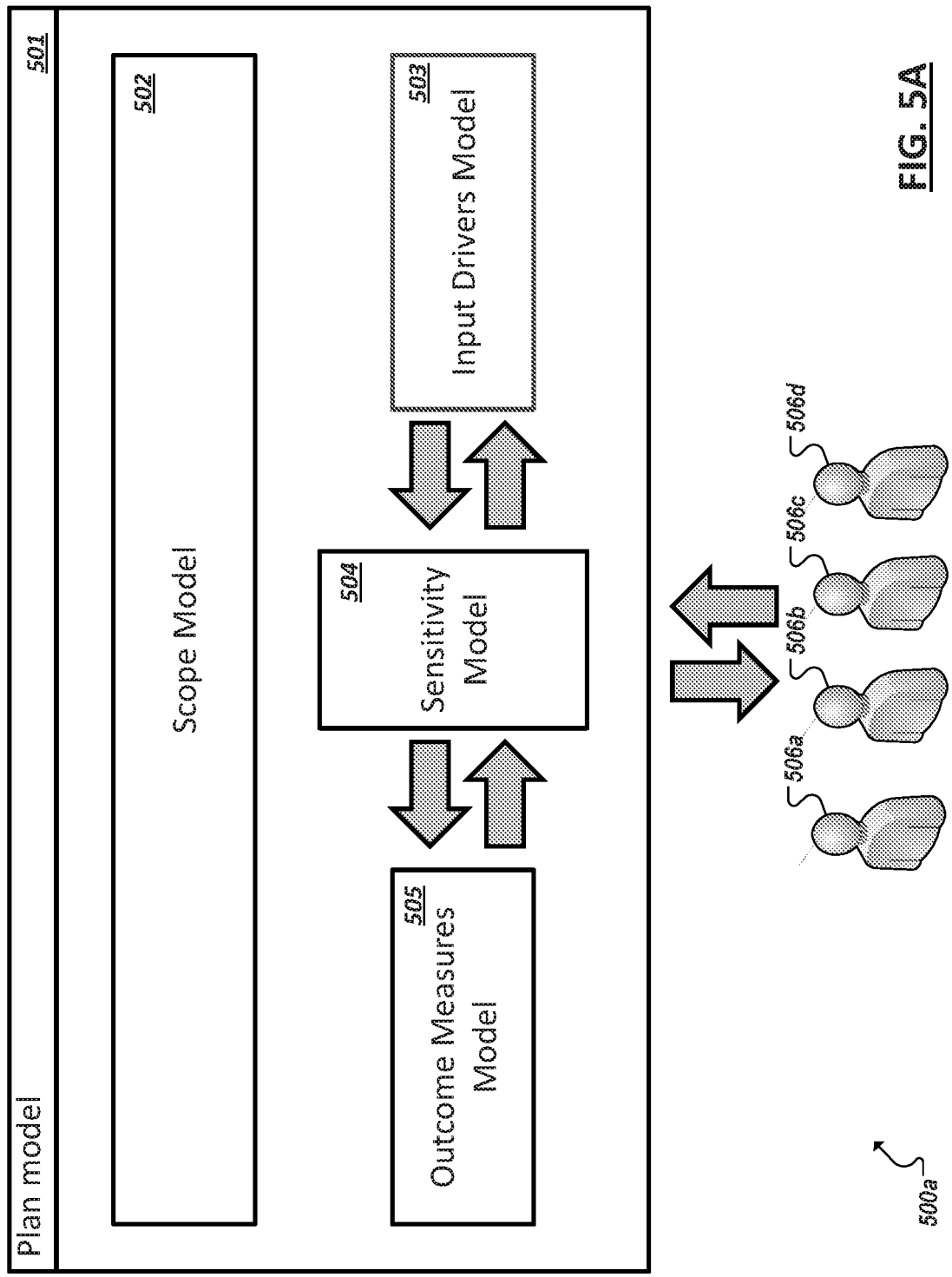

FIG. 5A shows a simplified representation 500a of an example software-implemented plan model 501, in accordance with some implementations. A plurality of instances of plan model 501 can be developed, each instance of plan model 501 modeling a respective business outcome of an organization (or group of organizations), including business outcomes relating to administrative, educational, charity, commercial, industrial, logistic, and other for profit and not-for-profit activities of the organization. In one example implementation, a plan model can include a scope model 502, an input drivers model 503, a sensitivity model 504, and outcome measures model 505. Additional models can be included in or linked to by a respective plan model, such as entity models, member models, and hierarchy models, among other examples. Additionally, in some implementations, plan models can each include a process model for use in managing planning activities involving the plan model as well as coordinating planning activities between multiple plan models. Further, one or more designated users, user roles, or users within particular sub-organization (collectively users 506a-d) can interact with and use the plan model, for instance, in connection with planning activities within one or more organizations, among other examples.

A scope model 502 can identify and model the specific domain within an organization on which the particular instance of the plan model 501 operates and is associated with. Domains can be relatively broad or narrow and capture certain segments of a particular organization. The scope model 502 can further enable certain domain-specific planning processes and logic relevant to the corresponding domain within the organization. Input drivers model 503 can represent one or more input drivers specifying key variables influencing outcome measures modeled by the particular domain-specific instance of the plan model 501. Accordingly, outcome measures model 505 can model and represent the outcome measures that the particular instance of the plan model will state, predict or attempt to achieve in its modeling of a particular business outcome(s) which can also be expressed as one or more of the outcome measures modeled in outcome measures model 505. A sensitivity model 504 can define the dependencies, relationships, processes, formulas, and other logic used to derive values of various outcome measures from values of input drivers of the plan model 501. Such dependencies, relationships, processes, formulas, and other logic (collectively dependencies) can be domain-specific as well as define how values of intermediate outcome measures or input drivers can be derived from other input drivers or outcome measure values, among other examples.

Figure 5B:
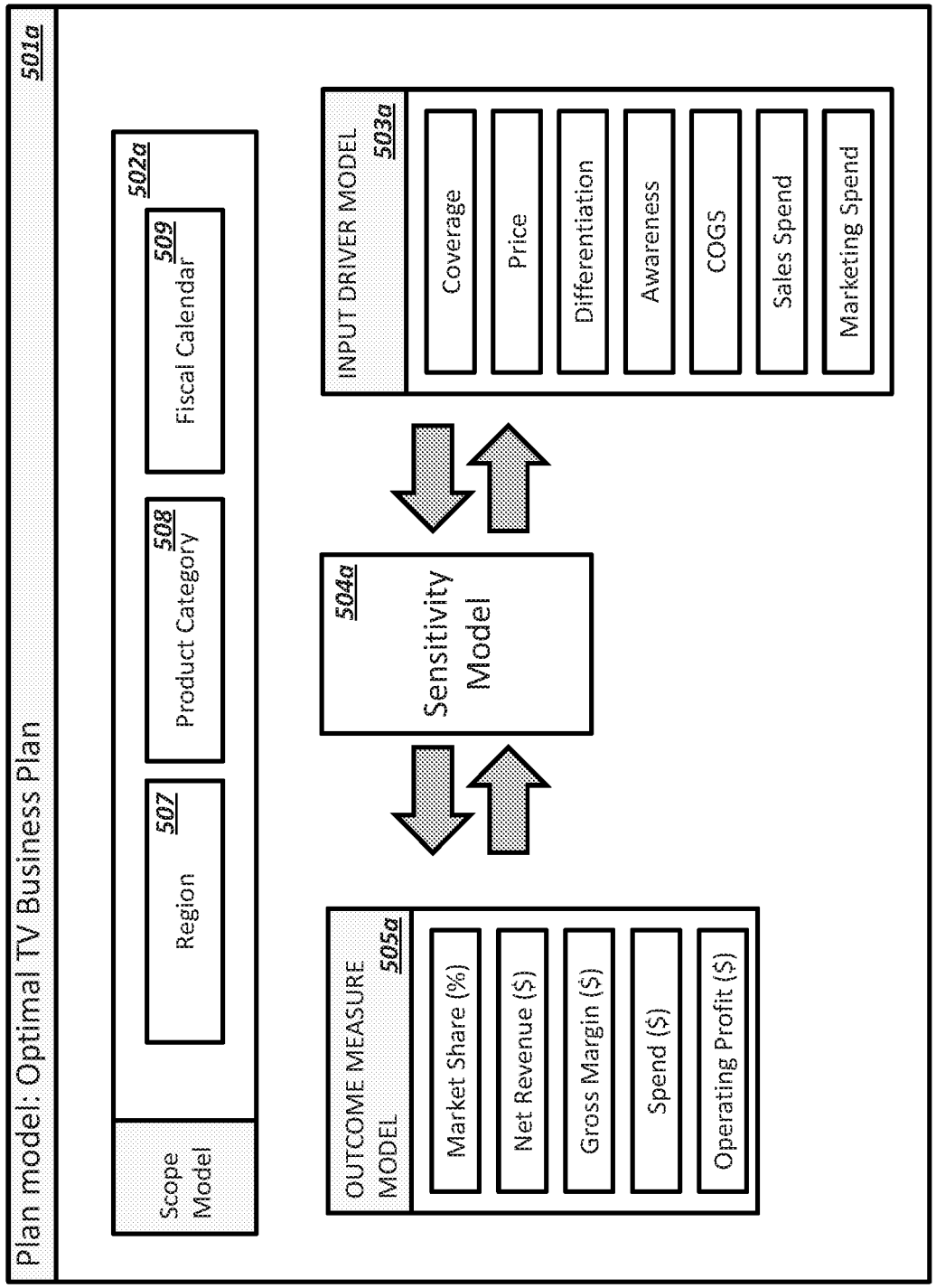

Turning to the example of FIG. 5B, a simplified schematic block diagram 500b is shown of a particular example instance of a plan model 501a. In this example, the plan model 501a is an optimal television business plan model modeling outcomes for a particular product category of a business (e.g., a business selling televisions). As in the example of FIG. 5A, example plan model instance 501a can include a scope model 502a, input drivers model 503a, sensitivity model 504a, and outcome measures model 505a. Scope model 502a defines a domain to which the modeled outcomes of plan model 501a apply. For instance, scope model 502a can model a domain encompassing a particular product category (i.e., TVs), within one or more geographic regions (or market regions), and within a particular period of time (e.g., a fiscal quarter, year, five year span, etc.). Accordingly, scope model 502a can define the domain according to one or more business entities, such as regions, product categories, and fiscal calendar, among other examples. Moreover, in this implementation, scope model 502a can include entity models 507, 508, 509 corresponding to the relevant business entities used to define the domain in the scope model 502a (e.g., geographic region, product category, fiscal calendar period, etc.).

A plan model's domain, as defined in its scope model (e.g., 502) can drive other models (e.g., 503, 504, 505) of the plan model as the inputs, outcomes, and relationships between outcomes and inputs (e.g., as defined in sensitivity model 504) can be highly domain-specific and tied back to the particular business entities used to define the modeled domain. For instance, in the example input drivers model 503 can include such input drivers, or variables, pertaining to a television product category and product market region for televisions, including input drivers such as channel coverage, price, product differentiation, consumer awareness, cost of goods sold (COGS) or inventory cost, sales spend, marketing spend, etc. Similarly, outcome measures relevant to the outcome, or goal, modeled for the defined domain can be defined in outcome measures model 505, such as market share percentage, net revenue, gross margin, total spend, operating profit, etc.

It should be appreciated that FIG. 5B is but one illustrative example, and that plan models can model a potentially limitless variety of plans. Accordingly, plan models can model outcomes of corresponding domains that result in sets of input drivers and outcome measures quite different from the input drivers and outcome measures of the particular example of FIG. 5B. However, other plan models can also be developed for different domains (e.g., a different market region, different product, products of a different organization, etc.) that include input drivers and outcome measures similar to those of the optimal television business plan model 501b. The dependencies of the respective outcome measures on the respective input measures of a particular domain, however, can fluctuate considerably between domains. For instance, sensitivity of a market share outcome measure to particular input drivers such as price or product differentiation can be quite different in two different markets, including different product markets and market regions. Accordingly, sensitivity model 504 can define domain-specific dependencies between input drivers and outcome measures for a plan model of a particular domain, representing the sensitivities of the outcome measures to the respective input drivers upon which the value of the outcome measure is dependent.

Figure 5C:
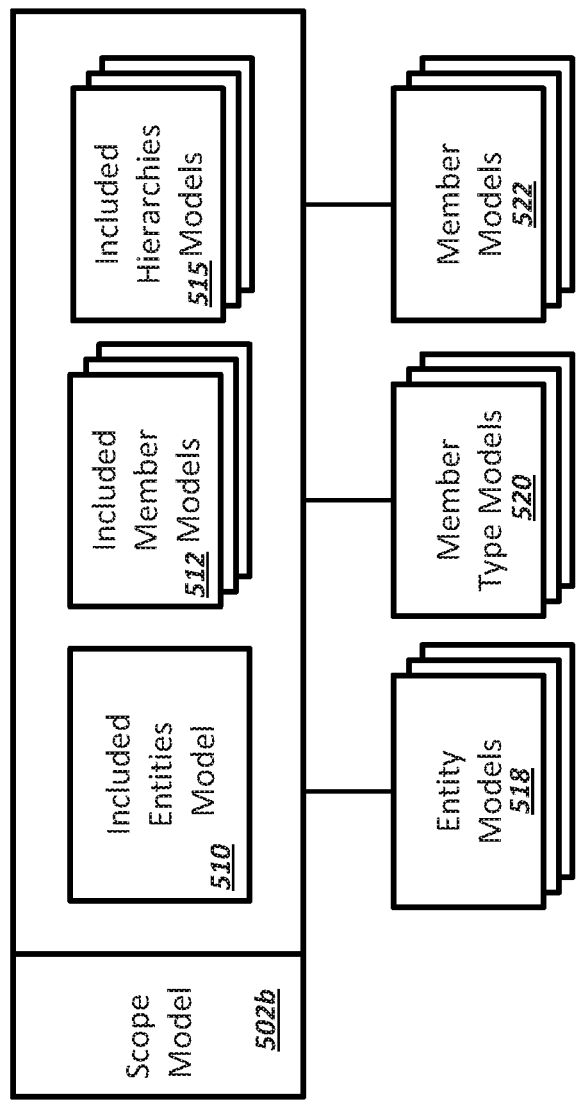

Turning to FIG. 5C, a simplified block diagram 500c is shown illustrating an example scope model structure. For instance, instances of a scope model 502b included in plan models can include an included entities model 510, one or more included members models 512, and one or more included hierarchies models 515 corresponding to those business entities designated as defining the particular domain of the scope model instance 502b. The included entities model 510 and included member models 512 can reference or link to one or more entity models 518, member type models 520, and member models 522 maintained in connection with a plan model system. As noted above and in other example discussed herein, business entities can include such entities as regions, organizations, persons, products, product categories, market regions, market segments, channels, calendar periods, time, locations, customers, suppliers, factories, and so on. The entities included in the domain can be defined in included entities model 510. A particular business entity can have constituent subcategories of business entities, or member types, and particular members of these entity member types can be included in the particular domain to which a plan model applies. Accordingly, in some examples, each entity designated in included entities model can have a corresponding set of designated members of the respective entity designated in a respective included member model 512. Additionally, for each designated entity, a set of included hierarchies (or included different possible hierarchical representations of the included members of an entity) can be designated in included hierarchies models 515, each entity having its own included hierarchy model 515. In other implementations, the sets of included members and/or included hierarchies can be defined in a single included member model for the scope model 502b or a single included hierarchies model for the scope model 502b (i.e., rather than distinct included member models 512 and included hierarchies models 515 for each individual entity designated in an included entities model 510), among other examples.

Further, a scope model 502b can reference (e.g., through included entities model 510) corresponding entity models 518 of the designated included entities of the domain modeled by the scope model. Entity models 518 can model a particular entity as well as the member types of the entity, hierarchies of the entity, and other attributes and information pertaining to the individual entity. Member type models 520 can also be referenced through the scope model, each member type model 520 modeling a particular type of the business entity as well as defining relevant attributes of that member type (or member type attributes). Further, member models 522 can be referenced, corresponding to the included member models 512, each member model 522 defining the individual members within a particular modeled domain. Each member can be of a particular one of the member type models 520. In some implementations, included member models 512 can be defined for each entity of the domain and included as sub-models of the entity models 518. Relationships between entities, member types, members (or groups (or "sets") of members), and particular member type attributes can be hierarchical and, in some instances, be organized in multi-dimensional hierarchies that allow members, member groups, and member type attributes to organized in multiple different alternate hierarchies. Such hierarchical organizations can be defined, in some instances, through included hierarchies models 515.

Figure 5D:
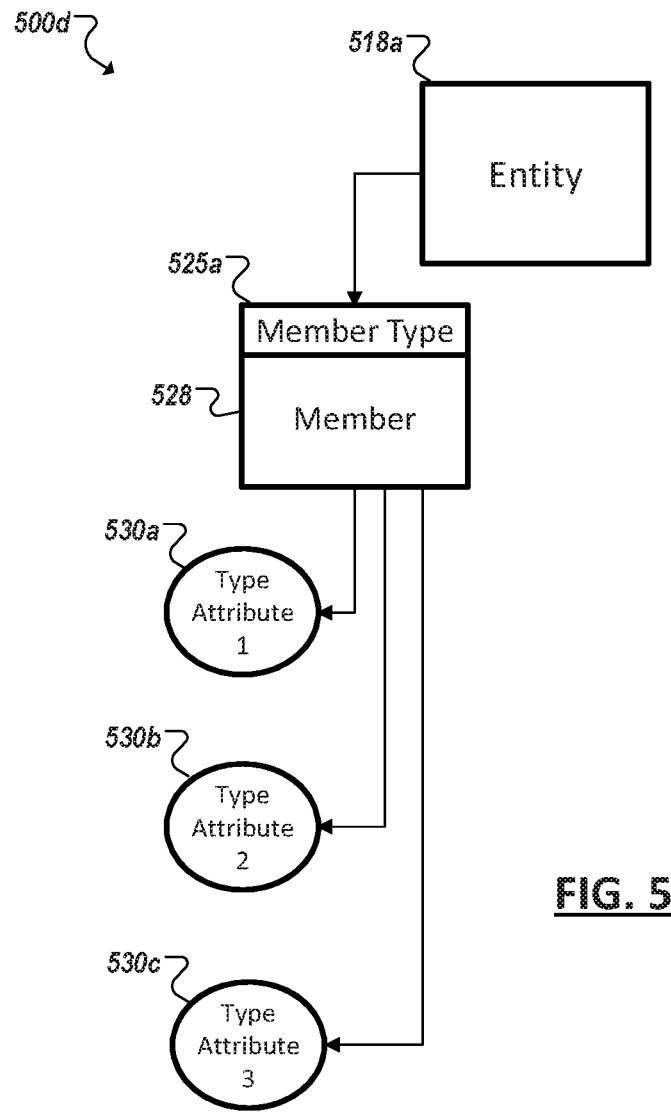

Turning to FIG. 5D, an example block diagram 500b is shown of a simplified hierarchy of a business entity as can be captured through one or more models of the corresponding scope model and/or entity model of a corresponding included business entity including corresponding member type models, member models, included hierarchies models, etc. For instance, in the particular example of FIG. 5D, a member type can be one of a plurality of member types of an entity and each member type (e.g., 525a) can include one or more instances, or members (e.g., 528), of that particular member type (e.g., 525a). The member type (e.g., 525a) can define a set of member type attributes (e.g., 530a-c) relevant to members of that type and that can define members of that type. Indeed, each member (and member model) of a particular member type can inherit the member type attributes of the corresponding member type. To illustrate, turning to FIG. 5E, an example entity 518b is illustrated corresponding to a product business entity. Within the global marketplace a wide variety of different products may exist from smartphones, printers, and digital video recorders to cardboard packaging, breakfast cereal, and tissue papers, among scores of other examples. Further, in the example of product business entities, various products may have relevance to different organizations and different goals within the same organization. Accordingly, plan models can include product business entities within their domains for different reasons in modeling particular outcomes, including domains corresponding to particular products of a particular business unit of an organization, corresponding to competitor products, corresponding to marketing budgets, inventory, etc.

Figure 5E:
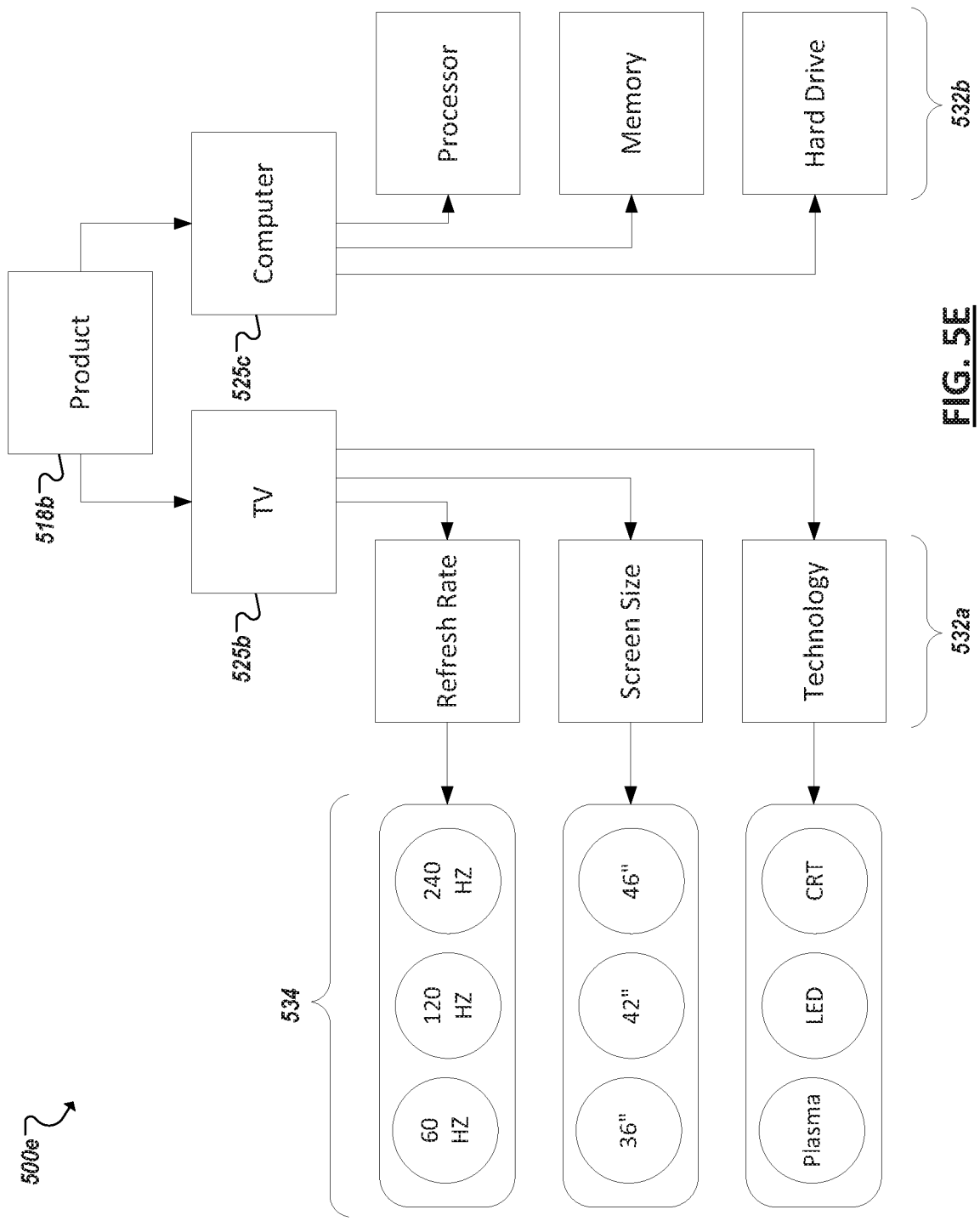

In the particular example 500e of FIG. 5E, a scope model can define a particular domain to which a particular plan model applies by defining two particular member types within the product business entity 518b, in this example, a televisions member type (525b) and computer member type (525c). Each of the member types 525b, 525c can respectively define a set of member-type attributes (e.g., 532a, 532b) describing features and details generally relevant to members of that type. For example, a television member type 525b can include member type attributes such as the refresh rate, screen size, and technology (e.g., LED, LCD, plasma, etc.) of a particular television (i.e., member of the television member type), including other potential television-related attributes. Similarly, a computer member type, while a member type of the same business entity (e.g., Product), can have a different set of attributes corresponding to features and specifications of computers, such as processor type, processor speed, memory, hard drive, etc.

Each member of a member type can be defined, at least in part, according to attribute values defined for the member. For instance, a variety of different attribute values (e.g., 534) may exist among a set of members. For example, a first television member considered in the domain may be a 120 Hz 42" LCD television, while a second television member in the domain is a 240 Hz 46" plasma model. In some instances, multiple members in a member type can share one or more attribute values. Shared member type attributes can serve as the basis for member groups. For instance, a group of members of the example television member type of FIG. 5C can be defined based on screen size, with a group of televisions being defined for 36" televisions, 42" televisions, 46" televisions, and so on.

Figure 5F:
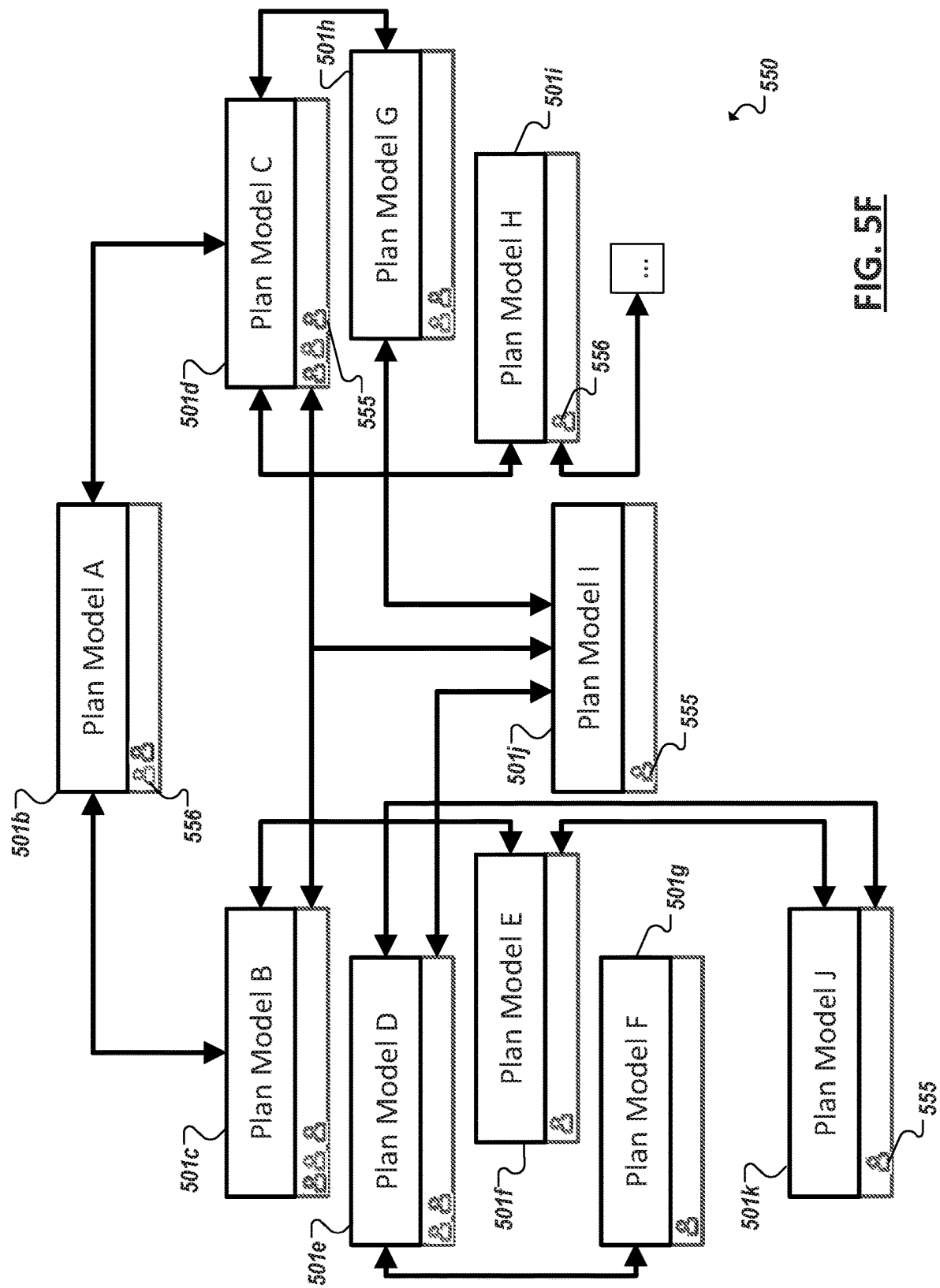

Turning to the example of FIG. 5F, a simplified block diagram is shown representing a network 550a of plan models (e.g., 501b, 501c, 501d, 501e, 501f, 501g, 501h, 501i, 501j, 501k). Plan models in the network 550 can be interconnected with one or more different other plan models in the network 550 based on one or more input drivers of the plan model being dependent on one or more outcome measures (or even input drivers) of another plan model in the network 550. Further, a plan model in the network 550 can also be interconnected with other plan models in the network 550 by virtue of an outcome measure (or input driver) of the plan model driving values of input drivers of the other plan model. Each plan model in the network 550 with respective included scope models, input drivers models, outcome measures models, sensitivity models, process models, etc. The respective models of each plan model in the network 550 can be tailored to model outcomes for a particular, distinct domain within the network, including representative scope models, sets of input drivers and outcome measures, etc.

Further, different users (or groups of users) (e.g., 555, 556) within an organization (or organizations) of the network 550 of plan models can be assigned to or associated with particular plan models in the network 550. Such associations can be based, for instance, on the users' respective roles, office locations, departments, etc. within the organization, with particular plan models being made available to those users corresponding to the particular defined domain of the respective plan model. As a simplified example, a particular user can be a manager of a particular department of an organization that is responsible for one or more different product lines. As the particular user 1118 can be responsible for managing, planning, and making decisions within this particular realm of the organization, the particular user 555 can be associated with plan models that relate to the user's role, such as plan models (e.g., 501*d*, 501*j*, 501*k*) with domains corresponding to the particular department or constituent product lines of the user. Being associated with the plan models can authorize access and use of the respective plan models 501*d*, 501*j*, 501*k* associated with the user in some instances. Other users not associated with the plan models 501*d*, 501*j*, 501*k* may be blocked or limited in their ability to access and use the plan model 501*d*, 501*j*, 501*k*. However, other users (e.g., 556) can be associated with other plan models (e.g., 501*i*) with domains more pertinent to their role within an organization. Some users can be associated with multiple plan models based on their role(s) within the organization, among other examples.

Dependencies between values of outcome measures (or other input drivers) of one plan model and input drivers (or outcome measures) of another plan model can be defined through link expressions. FIG. 5G illustrates one potential example of link expressions (e.g., 566, 568, 570, 572, 574, 576, 578, 580, 582) between example plan models (e.g., 501*m*, 501*n*, 501*o*, 501*p*, 501*q*) in a network 550*b* of plan models. In the example of FIG. 11B, input drivers of each of the represented plan models 501*m*, 501*n*, 501*o*, 501*p*, 501*q* are listed in a right column and outcome measures in a left column. For instance, example Optimal TV Business Plan plan model 584 can include input drivers Coverage, Price, and Spend while including outcome measures Share and Revenue. As further illustrated by FIG. 5G, inputs drivers of the example Optimal TV Business Plan plan model 501*m* can be based on outcome measures of other plan models. For instance, values of Coverage input driver of example Optimal TV Business Plan plan model 584 can be dependent on a Coverage outcome measure of example Optimal TV Sales Plan plan model 585, the dependency defined through a link expression 578. Similarly, the Price input driver of plan model 584 can be dependent on a Price outcome measure of plan model 585 and the Spend input driver of plan model 501*m* can be dependent on multiple outcome measures (Sales Spend and R&D Spend) of two different plan models (e.g., 501*n*, 501*o*), with respective link expressions (e.g., 582, 575) defining the dependencies between the respective input drivers and outcome measures, among other examples.

Link expressions (e.g., 566, 568, 570, 572, 574, 576, 578, 580, 582) can interconnect example plan models (e.g., 501*m*, 501*n*, 501*o*, 501*p*, 501*q*) in a network 550*b* of plan models and further enable scenario planning, analyses, and other uses across multiple plan models. This can further enable users of the network of plan models to cross-collaborate and plan across multiple, corresponding domains within an organization. This can also facilitate propagation of user-provided feedback regarding a model and its modeled entities, including discussions or collaborations identified as associated with the entities, risks or opportunities identified for plans, user feedback of assumptions of the plan models, among other examples.

As introduced above, a planning system can accept unstructured data from email and other sources and process content of the unstructured data to establish connections between such content and data contained in a structured data model such as the plan models (and network of plan models) described herein. Unstructured data can be collected and processed from a variety of sources to make the content of this unstructured data contextually available to users of the planning system as they reviewing the structured data (e.g., of the plan model(s)). Users can search the enterprise model and data together with the unstructured data, and the system can provide results and graphical representations that incorporate both the structured and unstructured data to assist in enabling interactive, quick, collaborative decision making for a given user role or roles and functions to achieve the specified domain's goals (and the user's expected contributions to these goals).

In some implementations, unstructured data can be received as a stream of inputs (e.g., individual communications). The input stream can consist of email, text-based instant messages, voice data, feeds from external systems (via APIs of the planning system), and any other mechanism by which content can be exchanged between systems. Each of the inputs can be scanned to determine whether the respective input is relevant to any one of the structured data models of the system, as well as specific entities modeled within the model. Unstructured data inputs, such as emails, may not possess tags, metadata, or other identifiers (e.g., hashtags) that designate keywords, taxonomies, or categorizations relevant to the input. Matches can be found between the inputs and one or more structured data models. Tags can then be employed to record the discovery of connecting the models with the unstructured content.

As detailed herein, in addition to determining associations with unstructured data inputs, a planning system can provide, or be associated with, a mechanism for generating unstructured data, such as through a discussion system. For instance, a graphical interface can be provided through which the user can create and submit unstructured data. In some implementations, additional capabilities can be offered, including offering the users the ability to convert an unstructured text to a structured data element, among other example features. In one example, users' textual inputs can be autocompleted with suggestions drawn from the structured data model.

By supplementing a structured data model with unstructured data inputs, use of the planning system can be enhanced. For instance, when users are reviewing data from the structured data model for information about a given business entity or entities, the system can scan the unstructured data (e.g., as received in real time or from a repository of unstructured data) for the discovered tags or keywords in the unstructured data. Such content can be provided inside views that display data form the structured data model to illustrate associations determined between particular unstructured data inputs and particular portions of the structured data models. Further, content of the structured data models can be enriched by populating, modifying, or otherwise enhancing values of attributes defined within the data models with content extracted from unstructured content.

Figure 6:
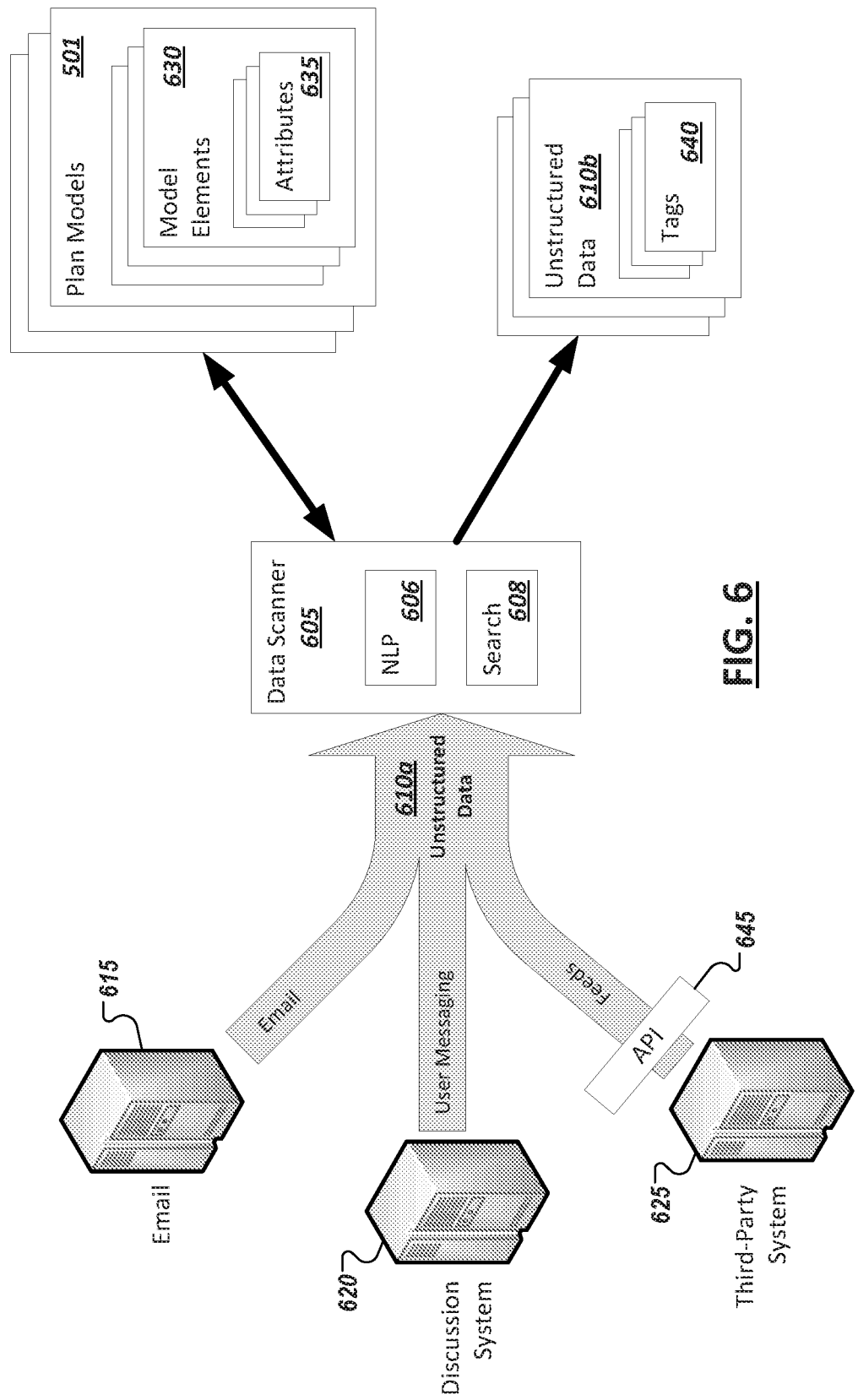
FIG. 6 is a simplified block diagram illustrating processing of example unstructured data for use with an example planning system.

Turning to FIG. 6, a data scanner 605 can be provided in some implementations of a planning system (e.g., 105). The data scanner 605 can be configured to receive or otherwise access unstructured data 610 from a variety of sources 615, 620, 625 and prepare the unstructured data 610a to be associated with structured data models, such as models in a network of plan models 501. The data scanner can reformat the unstructured data to prepare the unstructured data 610a for processing to determine associations between the unstructured data 610a and the models (e.g., 501). Natural language processing logic 606 can be provided in some implementations to process text in unstructured data 610a. A model search engine 608 can be provided that is configured to parse the plan models' structure and identify defined model elements 630 (e.g., entities in entity models (e.g., 518), member types in member type models (e.g., 520), members in member models (e.g., 522), etc.), which may have corresponding sub-models within the respective plan model 501, as well as attributes 635 (e.g., attributes names and values of each attribute) of each model element 630 in the plan model(s). The search engine 608 can access and query the structured data models 501 based on specific terms or phrases identified within at least some of the unstructured data messages or inputs 610a.

The scanner 605 can further determine that at least some of the terms or phrases identified within the unstructured inputs 610a match, are similar to, or otherwise relate to specific model elements 630 and/or attributes 635 within the structured data models 501. Tags (e.g., 640) can be defined based on these associations. The tags 640 can be appended to, embedded within, linked to, or otherwise associated with the corresponding unstructured data input (at 610b) in which the associated terms or phrases were found. The tags 640 can define the association between these unstructured data inputs 610b and related specific model elements and attributes. The tags 640 can be further used to define associations between the respective unstructured inputs 610b and the corresponding plan model and the sub-models modeling these specific elements and attributes.

Tags 640 can be used to facilitate enhancement of a planning system (including a network of plan models 501) through the various unstructured data 610a accessible to the planning system. For example, user interactions with the network of plan models may generate results that present various portions of the plan models to the user (e.g., through a graphical user interface (such as illustrated herein)). If a query, scenario, search, or other interaction with the network models identifies one or more specific plan models or sub-models of these plan models, a subset of a library of defined tags (e.g., 640) can be identified that correspond to the identified plan models and/or sub-models (e.g., a specific outcome measures model, input drivers model, entity model, member type model, member model, etc.). The set of tagged unstructured data (e.g., 610b) can then be searched to identify those unstructured inputs 610b (e.g., emails, discussion board entries, user product reviews from third party websites, user text or voice messages, etc.) that have been identified as relating to the structured data model and the user's particular plan model interactions. These related unstructured inputs can then also be presented or made available for inspection in connection with graphical user interfaces utilized by the user to interact with these specific structured data models (e.g., plan models and sub-models). The information within the unstructured inputs 610b can provide additional context and information to the user, thereby enhancing the user's interactions with the plan models 501. Additionally, associations between specific unstructured inputs 610b and particular structured model attributes (e.g., 635) defined by the tags 640 can be used to identify opportunities to update or supplement values of the attributes, as stored in the structured models, with values identified (e.g., by scanner 605) in the associated unstructured input. For instance, an unstructured input may name a value (e.g., a numeric, logical, or string value) or include information that can be interpreted (by the scanner 605) as a value that maps to a value of one of the associated attributes (e.g., 635). The planning system can automatically update values of structured data model attributes, in some implementations, based on the scanning of unstructured data (e.g., 610a) and determining association between the unstructured data (e.g., through tags 640) and models and model attributes of the structured data models (e.g., 501).

As one illustrative example, an email may be captured by the planning system and passed to data scanner 605. In some implementations, the data scanner may be implemented together with the planning system. Indeed, the data scanner can access and utilize the network of plan models (or primitives describing the structure(s) of the network of plan models), to scan unstructured data within the context of the structure of one or more plan models. In some cases, the data scanner can be a service consumable by the planning system. The data scanner can scan the email to identify text referencing a product offered by a particular beverage manufacturer, such as a competitor company, in this example, a soft drink "Cola X" offered by "Company X". The data scanner 605 can be utilized to identify the text and interpret that the text references soft drink Cola X. In one example, the data scanner 605 can be provided as a service to scan unstructured data relating to any one of a plurality of different networks of plan models (e.g., hosted by one or more instances of a planning system). The data scanner 605 can determine that the email corresponds to a particular organization "Company Y" (competing with Company X) and recognize that "Cola X" maps to a member (e.g., a member of a plan model modeling competing products of Company Y) of a particular one of a plurality of networks of plan models (or simply a particular subset of plan models) 501 of the planning system corresponding to Company Y. In some instances, the data scanner 605 can be a dedicated instance of an organization (e.g., local to an enterprise system corresponding to organization) and can assume that all unstructured data it receives or accesses corresponds to a particular network of plan models. In either implementation, the data scanner 605 can search the structured data of the identified particular network of plan models for particular plan models (and sub-models of these particular plan models) that reference "Cola X" or "Company X." For example, a market share model can include sub-models modeling each of a plurality of competitors competing with Company Y for market share. The market share model can further define markets, such as a soft drink model and include models modeling members within this market, such as individual cola products (including Cola X).

As a result of its scan, in some implementations, a data scanner 605 can generate (or identify previously-generated) tags that correspond to Company X, competitors of Company Y, Cola X, a soft drink market, cola products, among other elements (at varying levels of aggregation) defined within this example plan model and assign these tags to the email based on identifying the mention of "Cola X" and/or "Company X". As a result of the tagging, subsequent (or contemporaneous) user interactions with the plan model to investigate aspects relating to the soft drink market, competitor companies, Cola X or Company X specifically, etc. can be enhanced to identify that the email has been tagged as related to the user's interactions. Further, structured data (e.g., of the corresponding plan models to which a piece of unstructured data has been mapped through the scanning) can be presented (e.g., in a GUI) together with such unstructured data to which it is mapped. Further, a user can access the email (or other unstructured data) through the GUI presentation, further tag the email, edit the tags to the email (e.g., add tags, delete tags assigned automatically by the scanner 605, etc.), among other activities.

As illustrated in FIG. 6, unstructured data 610a, in some implementations, can be sourced from a variety of different sources and can be embodied in a variety of different input types. In one example, one or more email systems (e.g., 615) can provide email (e.g., from a corporate email system related to the corporation associated with the plan models 501) for use by data scanner 605 in supplementing data of the structured plan models. In one example, the data scanner 605 can mine a repository storing emails previously sent or received using the email system 615. In another example, the data scanner 605 can intercept emails as they are sent or received from the email system 615 to scan the emails in real time, among other examples. In another example, a discussion system 620 can facilitate electronic communications between users within (and potentially also outside) an organization. The user messages may also be unstructured and can also be fed into or otherwise accessed by the data scanner as at least a portion of the unstructured data inputs 610a. Third-party or external sources, such as systems (e.g., 625) providing third-party email, messaging, telephony, and social media platforms, can also make unstructured data available to the planning system and/or data scanner 605, via one or more APIs (e.g., 645). Thus, while a limited subset of users in an organization may control or manage information in a particular portion of the network of plan models for that organization, communications and discussions involving other users (inside and outside the organization) and embodied as unstructured data can be mined for information relevant to those domains modeled in the plan model(s) and managed by one or more managers, among other examples. Accordingly, the knowledge base and information sources facilitating the plan models (and planning activities utilizing the plan models) can be broadened. Any form of data that is unstructured can be utilized. Further, structured data of other entities (e.g., a third party social media provider, ecommerce site, third party customer relationship management (CRM) services, or other sources) may be considered unstructured to the planning system and data scanner 605, as the structure of such data may be proprietary or otherwise obscured to the planning system (i.e., the structure of the data is only full known to the owner or source of the data and not the planning system).

Figure 7:
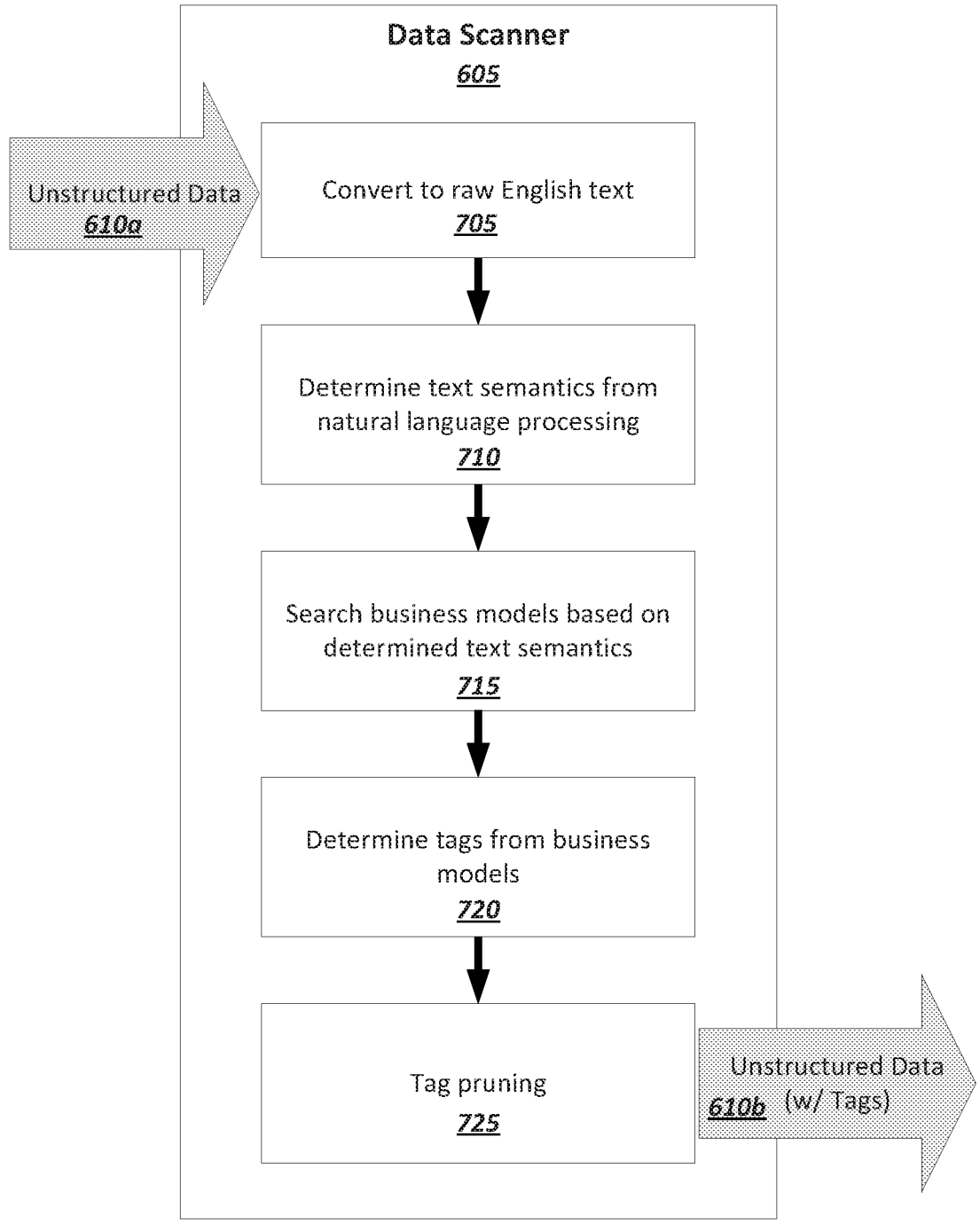
FIG. 7 is another simplified block diagram illustrating processing of example unstructured data for use with an example planning system.

FIG. 7 is a simplified block diagram 700 illustrating a detailed example of processing of unstructured data inputs (e.g., 610a) by an example data scanner 605. In this example, a pipeline component is integrated into the data scanner to access or route any incoming text data to the data scanner for processing. Upon receiving the unstructured text data, the data scanner can convert 705 the text data to a common format, such as raw English text. Depending on the original format of the unstructured input 610a, conversion 705 of the text data can include performing optical character recognition (OCR) on the input, performing a speech-to-text conversion, removing formatting tags (e.g., HTML, XML, CSS, or other tags), translating the text from its native language (e.g., German, Russian, Chinese, etc.) to the common language (e.g., English) used by the data scanner 605, among other example processes.

With the unstructured input converted to raw text, the data scanner can perform one or more cycles of natural language processing 710 on the text (e.g., supplemented by machine learning algorithms) to determine semantics, or meanings, for individual words (or terms) in the text, as well as phrases or paragraphs in the input (comprising multiple terms). Determining the one (or more) most likely meanings for each term can be based on the overall context of the content of the input (e.g., how and where the term is used in a phrase or paragraph, etc.). The type of the input can also be considered to derive context for the terms' definitions, as well as titles, subject lines, headers, etc. included in the input (e.g., that the input is a product review or an email, a subject line of the email, a title of a webpage on which the message (input) was posted, etc.), among other examples.

Having determining the semantics of the individual terms included in the unstructured inputs (e.g., 610a), metadata can be defined that maps the terms to these semantic definitions. The defined terms can then serve as the basis of queries of an associated network of plan models (e.g., 715) for model elements matching or similar to these defined terms. Tags can be determined 720 to be assigned to individual unstructured inputs based on correlations between the determined content of the input and various model elements and/pr attributes defined in the plan models. In some instances, rather than searching 715 the plan model for every term found in an input, a corpus of pre-determined or -defined tags can be searched for correspondence with the inputs' terms. If terms are found to match with pre-determined tags, these tags can also be determined to apply to the corresponding inputs. Where terms are found to match model elements for which no tag has yet been defined, a new tag can be generated (e.g., by the data scanner) and added to the corpus of tags. User-defined tags can also be generated to supplement those automatically determined from the structure of the network of plan models, among other examples.

In some cases, upon determining 720 that one or more tags should be associated with a given unstructured input, the tags can be assigned, or tagged, to the input (e.g., at 610b) and a copy of the tagged unstructured input can be stored in a repository for access in connection with planning activities performed utilizing the network of plan models. These tags can serve to define a correlation between the unstructured inputs and one or more models or model members in the network of plan models, as detailed elsewhere herein. In some cases, a pruning step 725 can be performed before (or after) assigning the tags to the unstructured input. For instance, in some cases, one or more of the determined tags may be determined to be overinclusive or underinclusive, unpopular with or unhelpful to users (e.g., from records generated from monitoring user interactions with tagged inputs in the planning system), or redundant to another (e.g., more popular or useful) tag also determined to be associated with the input, causing the tag to be pruned and either not added or removed from the copy of the unstructured input. Further, the data scanner (or another element of the planning system) can include a machine learning component to continually assess the quality of tags applied or made available for assignment to unstructured inputs for their value in linking unstructured inputs to the plan models to facilitate their useful reference during planning activities conducted with the planning system. Accordingly, a final set of tags can be determined to be assigned to at least a subset of the stream of unstructured inputs received (or otherwise accessed) by the data scanner to generate a corpus of tagged unstructured inputs (e.g., 610b) for use during planning activities utilizing the network of plan models.

Figure 8:
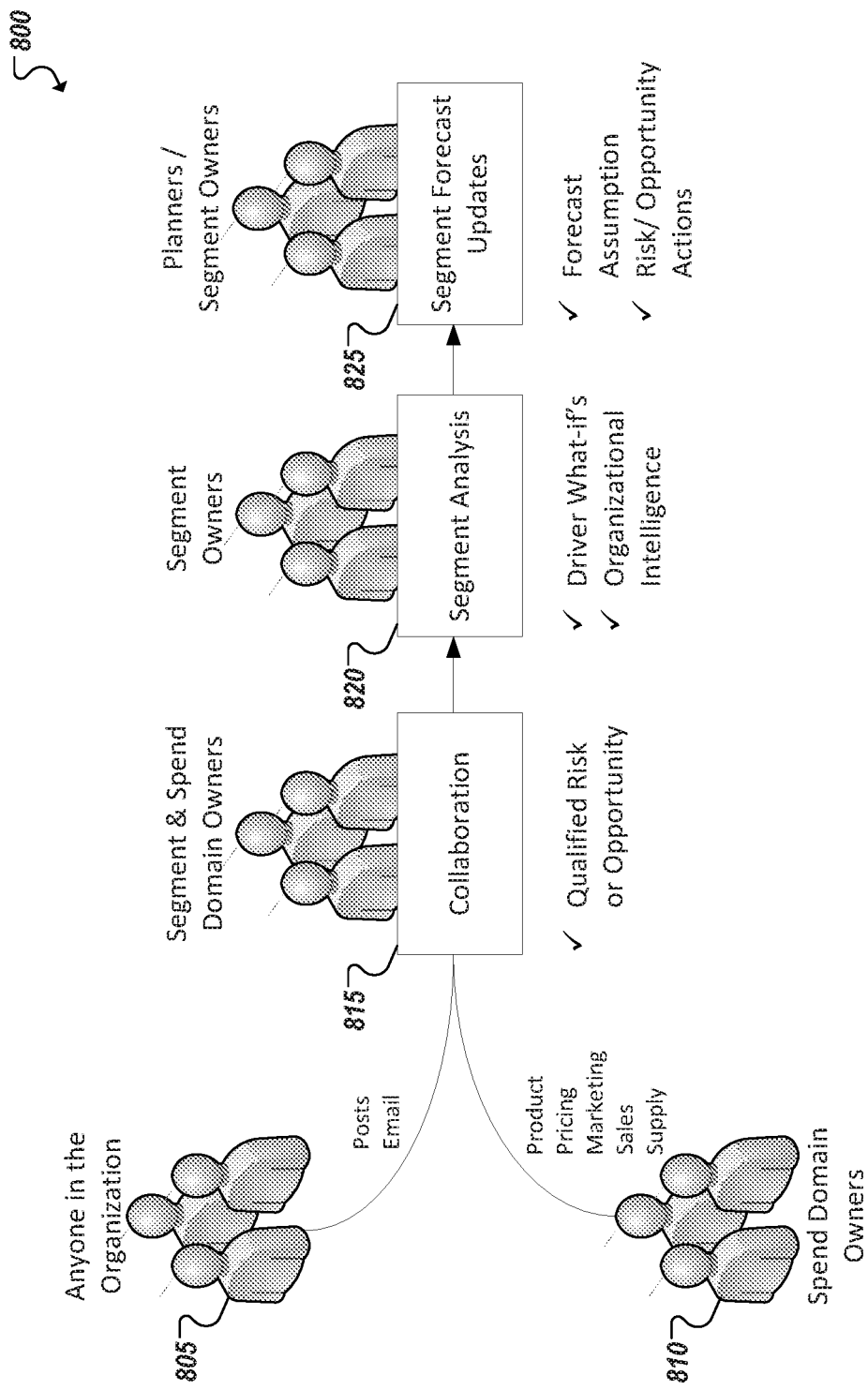
FIG. 8 is a simplified block diagram illustrating an example workflow involving collaboration and planning of organization.

As noted above, in addition to identifying general associations between unstructured data and particular structured data models in a system, additional tags can be defined relating to unstructured data accessible to a planning system. For instance, FIG. 8 is a diagram 800 illustrating an example workflow involving collaboration and associating intelligence gleaned from these collaborations with planning activities of the organization. Users can be associated with one or more roles within the workflow, and authorization to participate within the various stages of the workflow can be based on the users' respective roles. In the example of FIG. 8, a variety of different users 805, 810 can participate in discussions using one or more collaboration platforms, and discussion data can be generated describing the posts and messages provided by the participants during the collaboration 815. Participants in a discussion can view postings within their own collaboration or discussion. In some cases, within a given discussion, participants can tag individual postings to indicate that the posting relates to a risk or opportunity, to an assumption of one or more models, or is associated with a business entity (such as a product, brand, business unit, etc.) modeled in plan models or other models of an organization.

In addition to the immediate participants in a discussion, tagging postings within the discussion as related to a particular business entity can cause other users (e.g., domain owners 810) associated with that business entity to gain access to the discussion or the individually tagged postings within the discussion 815. For instance, tagged posts (or other inputs) can be delivered (e.g., via a dashboard interface, email, or other interface) to other users in response to the posts being tagged as related with business entities associated with other users. The other, non-participant users (e.g., 810) may further tag postings (generated by the discussion participants (e.g., 805)) to indicate that the posting references or is otherwise associated with additional business entities, is a risk or opportunity, or is associated with one or more assumptions of a model. Further, where the posting has been tagged as a risk or opportunity or as associated with an assumption of a model, owners or other users associated with the post can provide additional feedback or comments relating to the tagging (e.g., to qualify or validate the tag, retain or de-promote an indication that a discussion is a risk or opportunity, provide additional information relating to the tagging, etc.), as well as assign tasks from the same interface and link the tasks to the tagging, among other examples. These tags added to promote (or demote) an input (e.g., as a risk or opportunity) or to expand (or contract) access to other users can be added on top of the generalized tags tying inputs to specific portions of the network of plan models.

Intelligence gleaned from collaboration 815 can supplement and improve the information included in models, such as plan models, used by segment owners 810 to manage business issues and develop and manage business plans of an organization. This intelligence can also be used to guide owners in assessing progress of organizational plans, making adjustments to associated models, and assigning tasks in the organization to realize these goals and plans, among other potential uses. For instance, owners can utilize this intelligence in their analysis of their corresponding business segment (e.g., at 820), to develop organization intelligence, perform scenario and hypothetical "what-if" analysis using associated models, among other task. Segment owners can additional review the lifecycle of previously identified risks and opportunities, to develop a "post-game analysis" for a plan (e.g., at 825) and understand when risks/opportunities were first identified, whether actions were taken against them (and if not, why not), whether the risks/opportunities had any actual impact on their forecasts or plan, among other information. Agility metrics can also be calculated to determine the average time between a discussion post and its promotion to risks/opportunities, the time to convert the risk/opportunity into corresponding action (e.g., actionable updates to the forecast), among other information. Such analyses can be used to improve future planning activities and the models upon which corresponding plans are developed and defined.

In some examples, in response to identifying risks and opportunities from a corpus of discussion posts, segment planners can initiate collaboration with impacted groups or people within the enterprise to understand the size and impact of the opportunity or risk. This could be facilitated through the same (or different) discussion tools or via polling relevant groups for feedback on impact. In addition, tasks can be assigned to request information or details from specific people to meet forecast deadlines. Segment planners can then summarize the outcome of the collaboration and decide to act upon the risk or opportunity so its impact (e.g., on a corresponding forecast driver) is reflected in the forecasting process. For instance, segment planners can update driver forecasts and review the impact on segment forecasts for the various forecast drivers as part of the bottoms-up forecast submission process for review by the segment owner. Indeed, segment owners can be responsible for reviewing and updating the content submitted by the planner. In addition, they can be responsible for providing an executive summary for review by management teams. The executive summary can also capture a forecast status indicator and its trend from past cycles. Other management team members can be responsible for reviewing the assumptions and executive summary for these segment forecasts, collaborate, and assign tasks on the content. As planning cycles are completed, the plan (and underlying plan model, can be versioned, for instance, based on the knowledge acquired from the discussions and collaborations facilitated through these solutions.

FIGS. 9A-9M are example screenshots 900a-m of user interfaces that can be provided in connection with a discussion system, discussion client (e.g., a dedicated client or web browser used to interface with a web-based discussion system), and/or planning system. It should be appreciated that these screenshots are but illustrative examples and are provided to illustrate additional example features of systems and processes for integrating collaboration and plan modeling. For instance, in the screenshot 900a of FIG. 9A, a user interface is provided that presents a view of a portion of a plan model of an organization. A user can select a particular market segment and perform one or more activities to analyze a plan associated with the segment. For instance, a variance analysis can be performed and a particular measure (e.g., gross revenue) can be selected (e.g., from menu 902) for analysis. The user interface can present a comparison of the target, or planned, value of the measure with the forecast value (e.g., based on current and past market observations described in various sources, such as news, market analysis, and other sources) for a particular accounting period. The user interface can further present a representation (e.g., 904) of the gap (negative or positive) between the target and forecast values. The user interface can further include a presentation of the assumptions in the model that are relevant to the current analysis. As different analyses or segments are selected, the user interface can be updated with views of corresponding instances or portions of plan models that relate to that view. For instance, in FIG. 9B, a view is shown in screenshot 900b of a marketing plan model, with key measures being presented (e.g., spend domain, budget, approved budget) as well as the assumptions (e.g., in 908b), that underlie the values or conclusions (e.g., the budget values) of the model in this particular domain (e.g., marketing domain). Each of the values presented in these user interfaces (in either of the examples of FIGS. 9A and 9B) can be derived through attribute values and logic of a corresponding software-based plan model.

Forecast values can be defined through a plan model and can be based on one or more assumptions. Returning to the example of FIG. 9A, a set of assumptions underlying a given forecast (e.g., a gross revenue forecast) can be presented (e.g., in table 908) and indicate, based on a comparison of assumption values with currently observed values (obtained from sources and populating attributes of one or more models), whether and to what degree the assumption value is accurate. While a planning system can automatically determine whether an assumption is below, above, or substantially on target, in some implementations, a user, such as a segment owner, can also manually indicate whether an assumption is on target or not. For instance, in table 908, a graphic (such as a sun indicating a positive outlook for an assumption or an umbrella indicating a negative outlook for an assumption) can be provided for each assumption based on how well it tracks to the target. As users can adjust assumptions of plan models, the user interface can also indicate whether an assumption of a plan has been adjusted or not (e.g., by an upward or downward arrow in table 908 indicating a change, or a sideways arrow indicating that the assumption remains as originally defined in the plan model), among other examples and presentations. For instance, multiple plan model instances representing previous plans and forecasts of an organization can be analyzed by the planning system to determine the historical accuracy of a given assumption within an organization (or the accuracy of a particular owner in charge of setting the assumption). An indication of the historical bias of an assumption (e.g., whether a particular assumption is historically susceptible to being over- or -under-valued) can also be presented (e.g., at 910) in this or another user interface of the planning model. These indications can serve as guidance to a segment owner or other user in understanding the assumptions underlying a forecast.

The analysis of a plan can be further refined to analyze a particular submarket or segment, such as by selecting an icon (e.g., 906) or control of user interface of 900a corresponding to the segment. In one example, icon 906 can be selected to view results of revenue gap analyses for a mass market segment as well as the individual brands within the segment. In response, an updated view can be presented, such as represented in example screenshot 900c of FIG. 9C. The revenue forecast value (e.g., $1,507.7M) and target revenue value (e.g., $1,760.6M) of the segment can reflect the aggregate of the revenue forecasts and targets of each of the brands (e.g., "Cosmo Cola", "Muse Fruit Flavors", etc.). Likewise, the indication (in table 908) of an assumption's accuracy for the entire segment (e.g., 911a) can be based on the aggregate accuracy of the assumptions (e.g., 911b-d) utilized to develop the forecast for each sub-component (e.g., brand) of the segment.

Figure 9A:
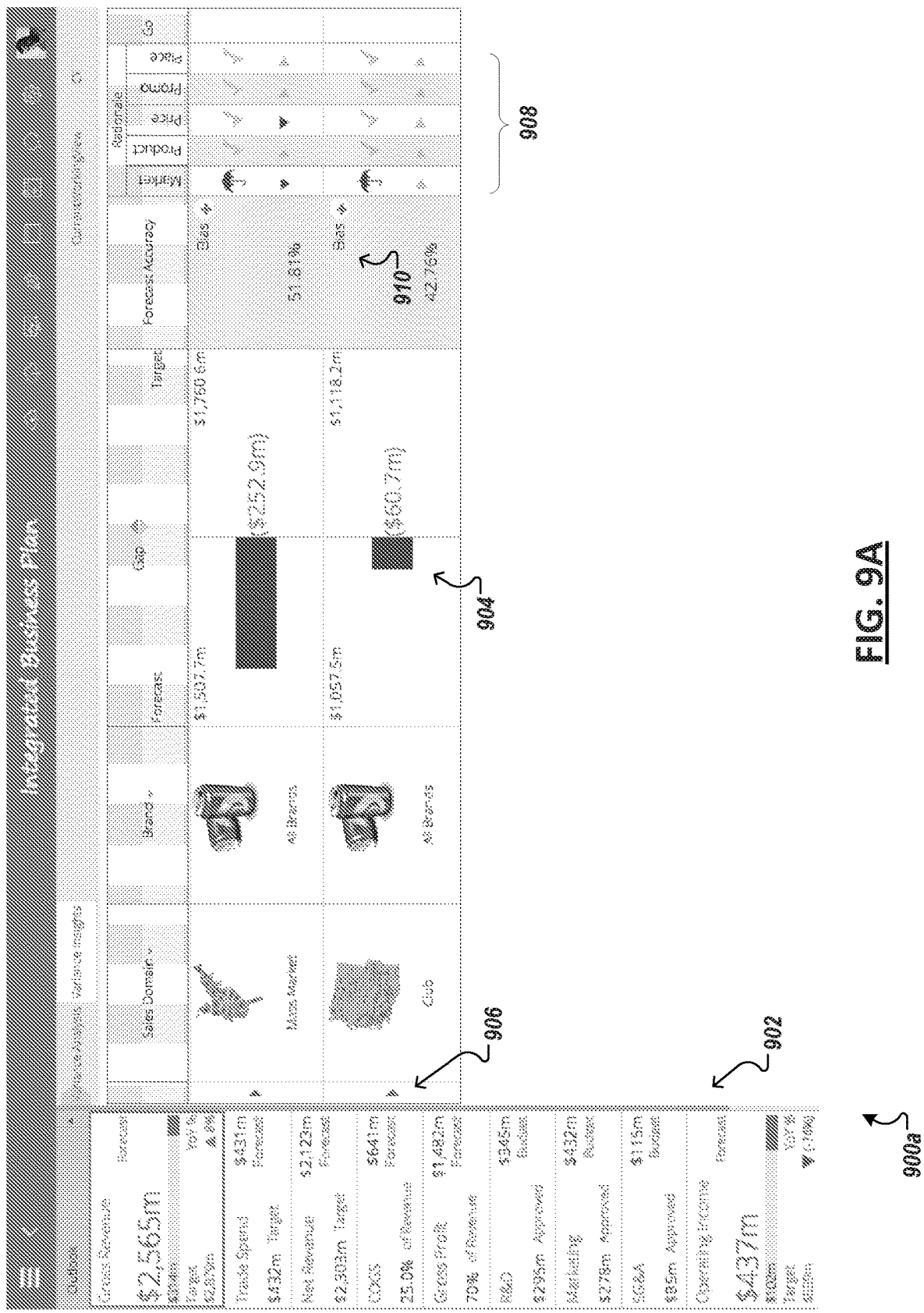
Figure 9B:
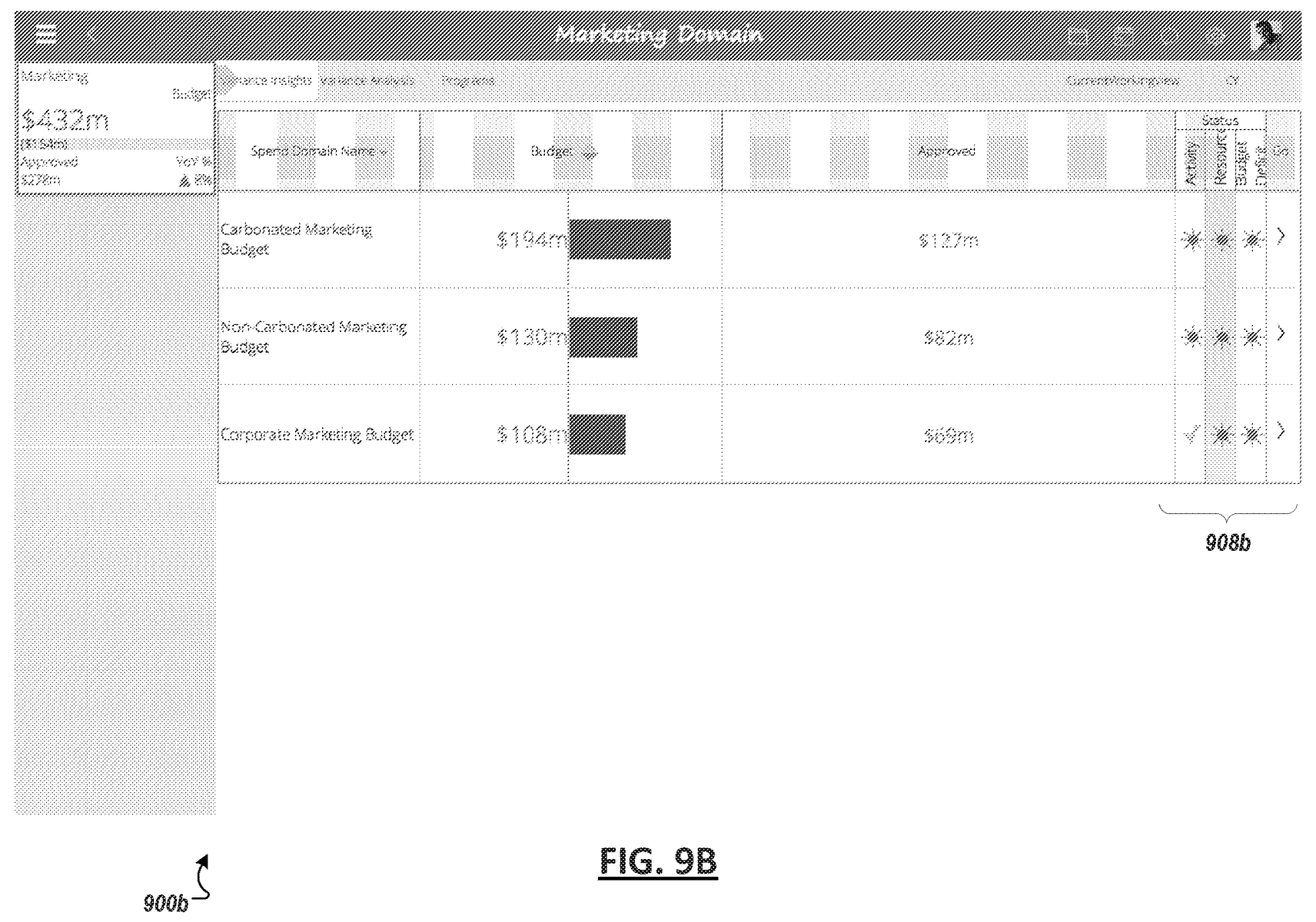
Figure 9C:
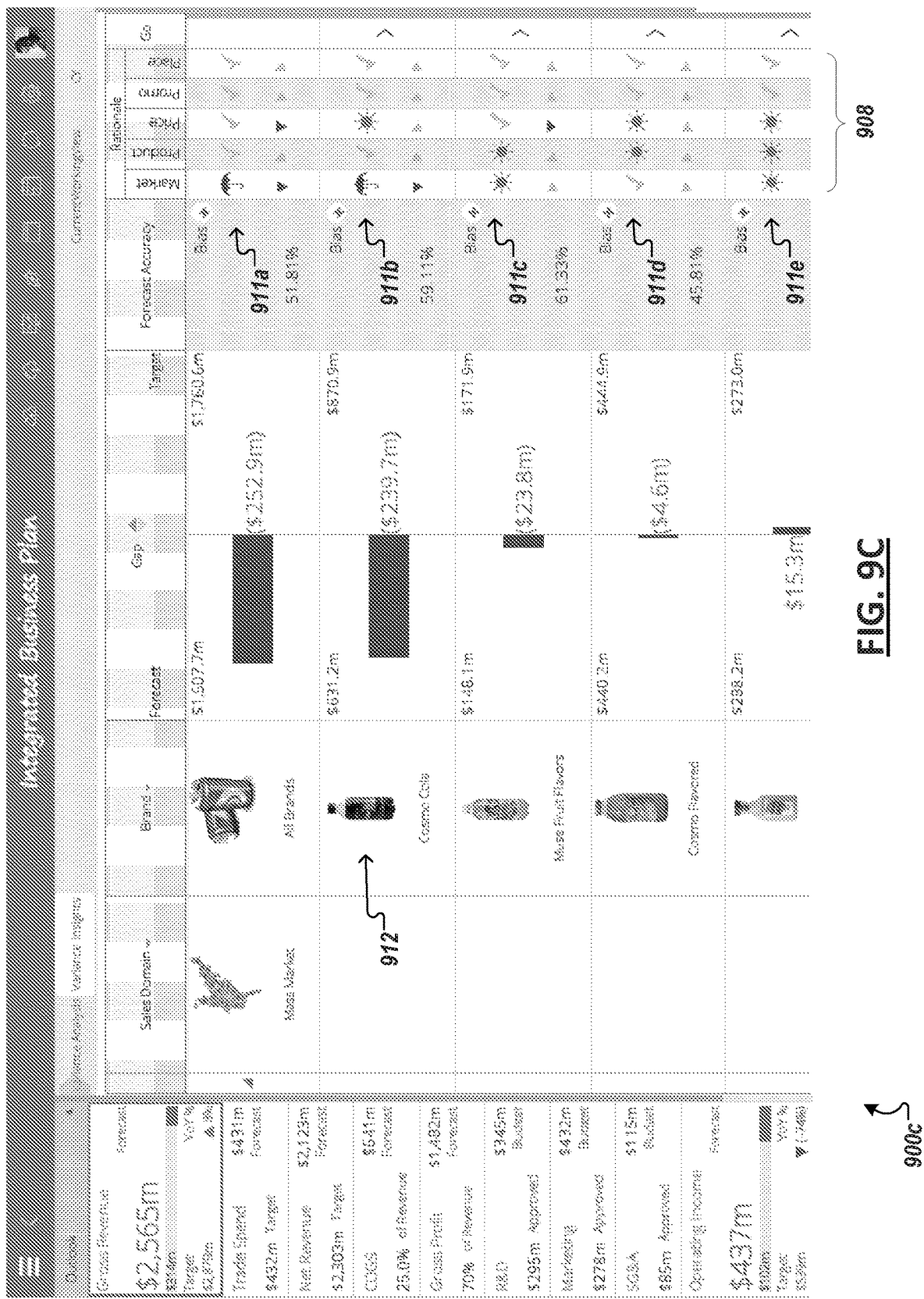
Figure 9D:
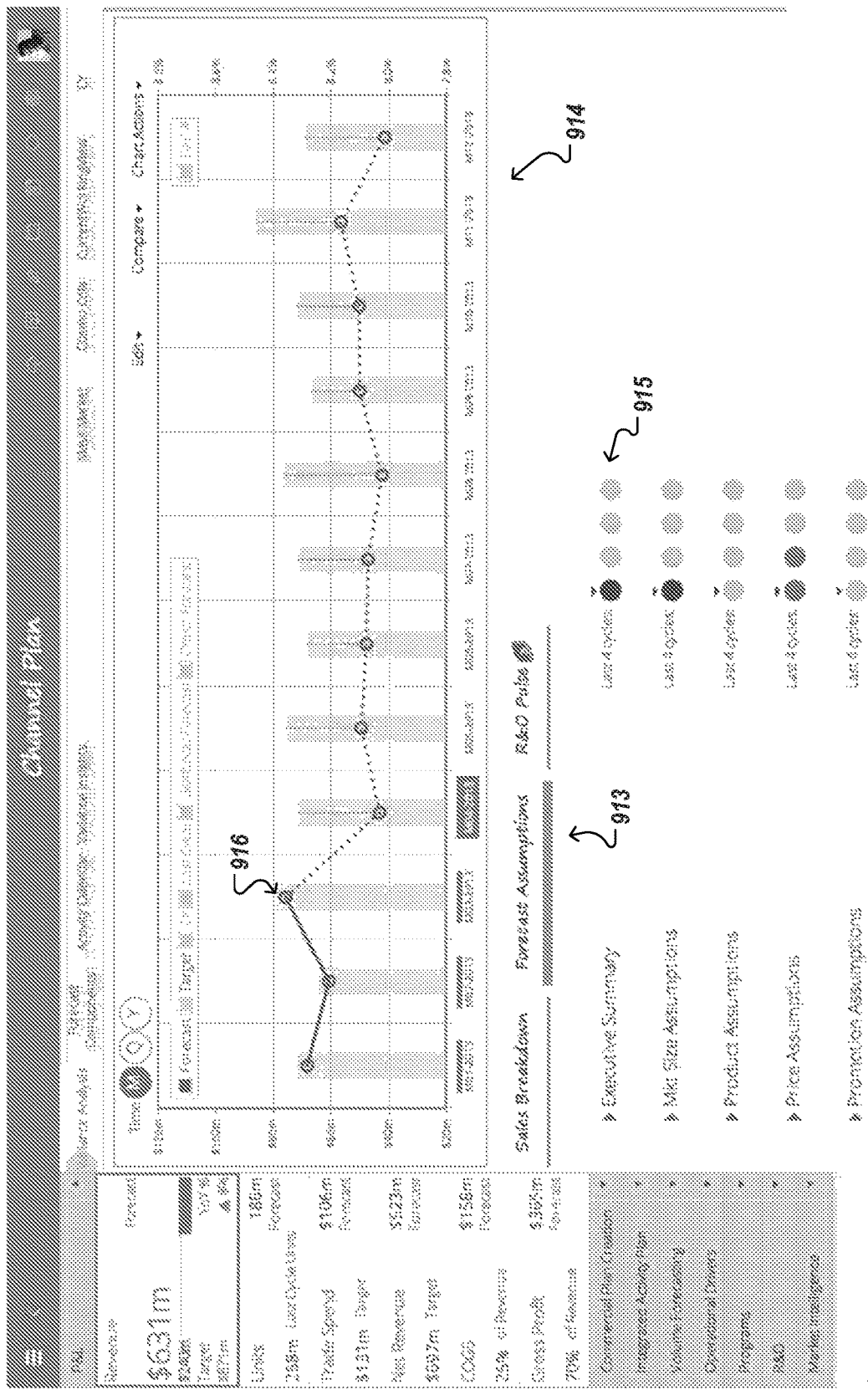
Figure 9E:
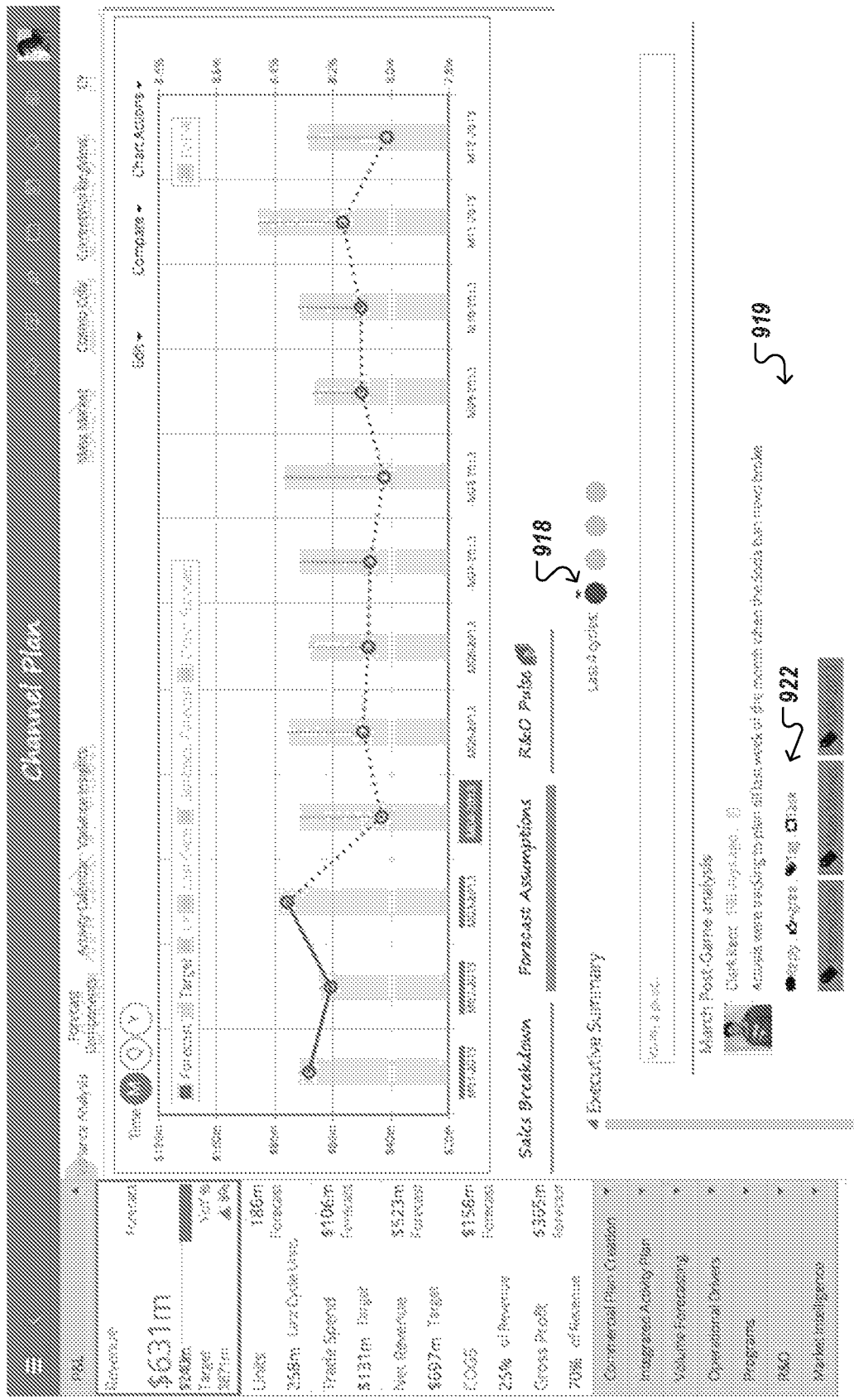

The user interfaces of FIGS. 9A-9C each provide a variety of opportunities for users to click on an icon or control and further refine (or broaden) the view of a model within a particular domain (or even to change domains (and potentially the plan models being viewed). For instance, in FIG. 9C, a user can select an icon corresponding to a particular sub-segment, such as the selection of an individual brand within the mass market sales domain. Indeed, upon selecting an image 912 corresponding to the soft drink brand "Cosmo Cola", the user interface can transition to a view specific to the Cosmo Cola revenue domain, such as illustrated by the example screenshot 900d of FIG. 9D. The example of FIG. 9D shows a view of the revenue targets and forecast for the individual brand Cosmo Cola. A variety of views can be selected, including a view of the forecast assumptions utilized by the model from which the views are generated (e.g., by selecting link 913). Various graphs and other presentations of values and information within the model can be generated and presented to a user. In this example, a graph 914 is presented that includes columns representing month-by-month revenue targets overlaid with a line graph representing month-by-month revenue forecasts. In some cases, the forecasts (or even targets) defined in the model can be adjusted through the user interface's data presentation (and thereby also change values populating the model). For instance, a user can select a graph element (e.g., 916) and drag the element to adjust the forecast for a particular month (e.g., M04-2013), for instance, in response to user feedback indicating that an assumption or forecast is incorrect (e.g., based on a discussion monitored in connection with the Cosmo Cola brand). In the example of FIG. 9D, for instance, a user may have adjusted the revenue forecasts downward relative to the target revenue, from M04-2013 onward, based on an event, news item, information in a discussion, or other information known to the user (e.g., a user familiar with why the original forecast was set and why this information affects that forecast), among other examples.

Continuing with the example of FIG. 9D, the assumptions underlying the plan model's calculation or definition of target and/or forecasted revenue (or any other measure presented in the user interface based on an underlying plan model) can be presented for the domain (e.g., the Cosmo Cola brand). The assumptions in this example match the assumptions displayed in the presentations of FIGS. 9A and 9C, namely "Market Size Assumptions" (e.g., an estimated size of the market), "Product Assumptions" (e.g., the product offerings that are planned to be offered to meet the demand of the market), "Price Assumptions" (e.g., the price at which the products will be sold to remain competitive), "Promotion Assumptions" (e.g., the types, scope, and duration of promotions to be offered in connection with the products), and "Executive Summary" (e.g., an aggregate summary of the assumptions of interest within this domain (e.g., Market Size Assumptions, Product Assumptions, Price Assumptions, Promotion Assumptions, etc.)), among potentially other examples. A series of graphical circles (e.g., at 915), or other graphical element, can be presented with each assumption included in the plan model. Each circle can represent the real or anticipated accuracy of an assumption based on current information (i.e., information emerging after the assumption was defined). In the example of FIG. 9D, four circles are presented for each assumption, representing four cycles (e.g., financial quarters). The color of each circle can be set to indicate the degree of accuracy of the assumption within a particular cycle. In some cases, software-based logic can identify data that suggest that an assumption is, or likely is, too low, too high, or on target. Users can alternatively, or additionally, change the assessment of an assumption by selecting the graphical element (e.g., a circle in row 915) and indicate whether the assumption is or is anticipated to be (e.g., a future cycle), inaccurate. Varying degrees of inaccuracy can also be indicated and presented in the elements (e.g., 915) to indicate graphically to users the accuracy of a model's assumptions. For instance, planning system logic or a user can set a circle to red to indicate that the assumption has been over/undervalued in a negative way, to green to indicate that the assumption is incorrect in a positive way (e.g., market size assumption was too low), or set to yellow (or light green) to indicate that the assumption remains accurate and on-target. Through these interactive graphic element (e.g., 915), or other GUI controls, a user can provide feedback regarding the general accuracy of one or more assumptions of a market. The perceived accuracy or inaccuracy of a given assumption can vary from domain-to-domain, or from sub-domain-to-sub-domain (e.g., as illustrated in varying green/red values of assumptions in table 908b of FIG. 9C), among other examples.

Additional information and comments can be added by users to help provide information for identifying accuracy of model assumptions and what conditions are contributing to these assumptions. For instance, as shown in the example of screenshot 900e of FIG. 9E, a user, such as a segment owner (or other user authorized to manage assumptions within a particular segment), can select a particular one of the assumptions (e.g., by selecting the circle 918 indicating accuracy of the assumption in a first cycle) and view discussion posts (e.g., 919) that have been entered that relate to an indication of an assumption's accuracy. These discussion posts can be captured by a discussion framework offered in connection with the planning model program providing the model view (in screenshot 900e) or may be copies of posts detected on other discussion and collaboration frameworks. For instance, discussion boards, social networks, and other sources can be crawled (e.g., by a crawler tool) to identify posts that potentially relate to a particular segment. Associations between the post and one or more modeled entities can be identified. The posts can be tagged to indicate the associations, such as illustrated by the tags (e.g., 920) in FIG. 9E. In addition to identifying associations (between a discussion post and a model entity) automatically, users can manually add additional tags to a post (or even verify computer-recommended associations). Further, based on hierarchical and dimensional relationships defined in the model, tagging a post as related to one modeled entity can cause the tagging to propagate to other related model entities (e.g., causing the post to also be automatically associated with these related model entities).

Posts that are presented in connection with the assessment of the accuracy of an assumption can be further tagged by a user to provide additional information regarding the assumption. For instance, as shown by controls 922, a user can be presented with one or more postings identified as related to a particular assumption modeled for a particular domain and further presented with controls 922 to provide additional information relating to the posting. For instance, a user can select a Reply control to generate an additional discussion posting relating to the post (or for inclusion within the discussion or collaboration from which the posting 919 originated), or indicate agreement with the contents of the post 919 (e.g., by selecting the "Agree" control), among other examples. A user can also add additional tags to associate the posting with other modeled entities, and can even launch the creation of a new task (by selecting a Task control) that will be automatically associated with the posting 919 and the corresponding assumption indication (at 918), among other examples.

Figure 9F:
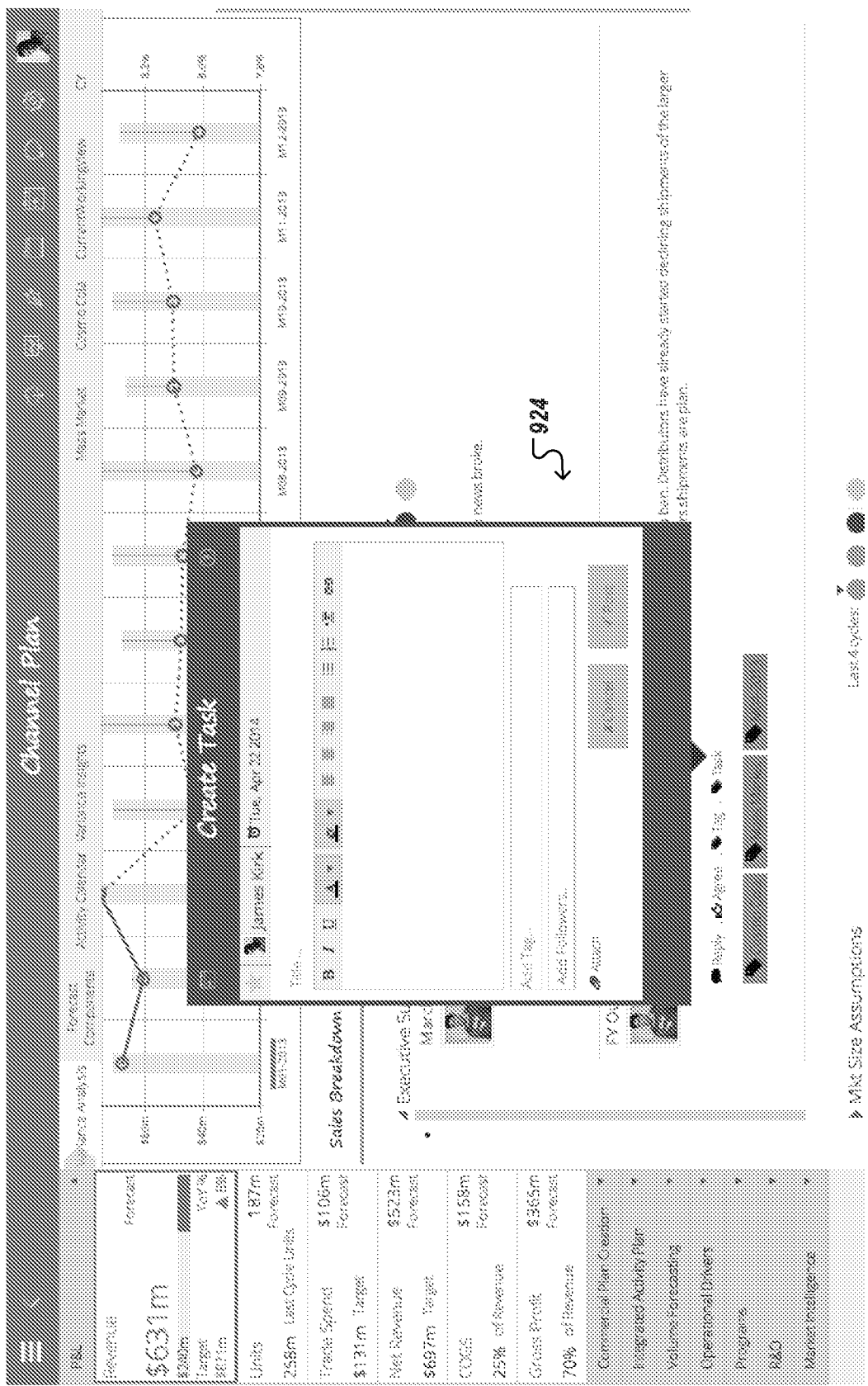

FIG. 9F shows a screenshot 900f showing a Create Task window 924 that can be displayed in response to a user selecting a Task control. A user (e.g., segment owner) can use window 924 to describe the task that is to be assigned, designate another user (or group of users) to perform the task, set a timeframe for completion of the task, attach a file or other data for consideration in connection with the task, as well as add followers to the task (e.g., other managers or persons in an organization interested in the task). The task, and additional information added by the user during creation of the task, can be automatically associated with the assessment of a particular assumption's accuracy and the particular assumption from which the task was launched.

Figure 9G:
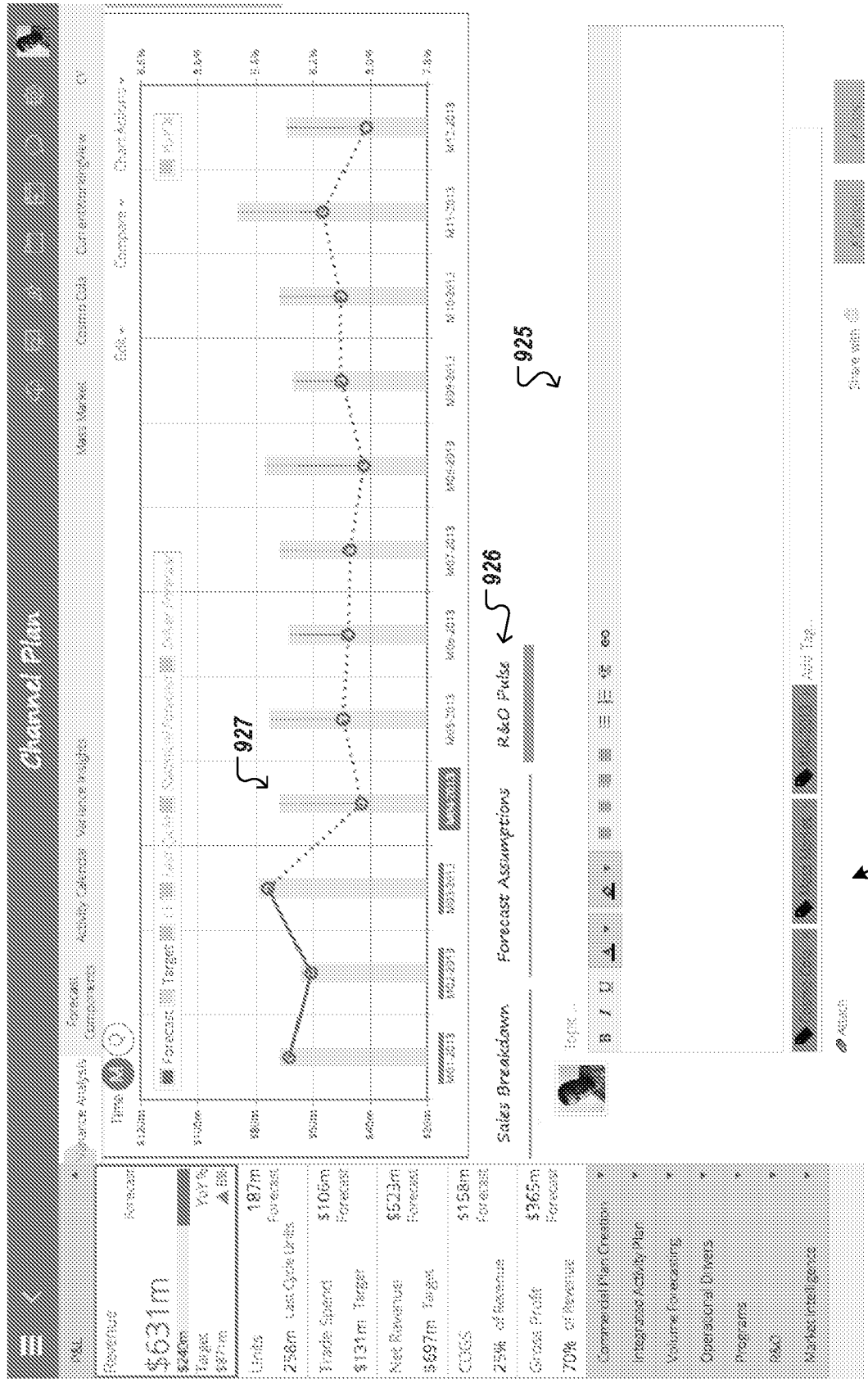
Figure 9H:
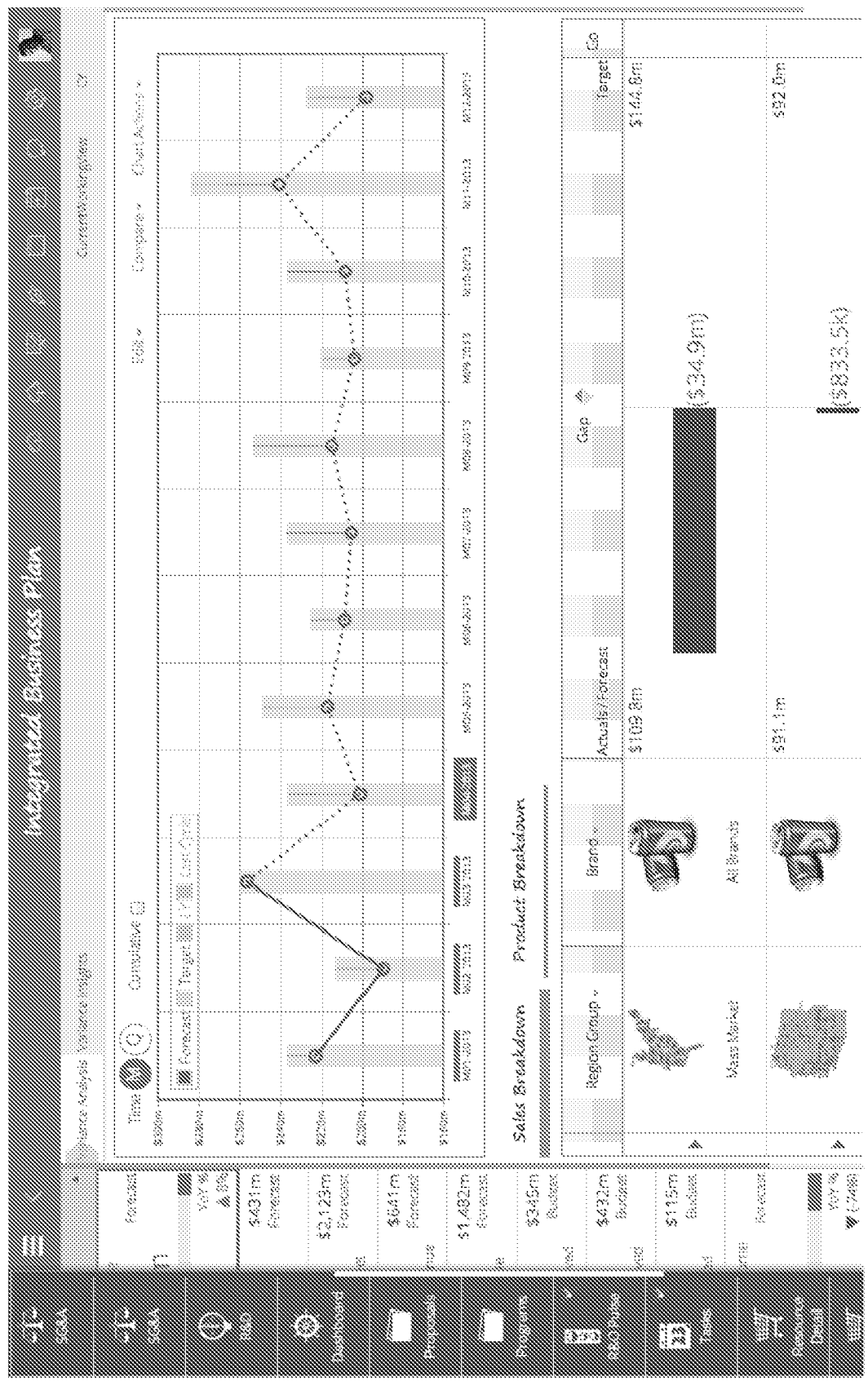

Turning now to the example of FIG. 9G, a screenshot 900g is shown illustrating an additional user interface that can be presented in connection with a Cosmo Cola brand domain and views of a corresponding portion of a plan model. For instance, a user can toggle between a sales breakdown interface, a forecast assumption analysis interface, and a risk and opportunity analysis (e.g., "R&O Pulse"), among other example views, through a navigation menu (e.g., 926). A variety of different views and analyses can be supported by a user interface of a planning system. Additional navigation menus can be provided to allow users to access such interface. For instance, as shown in the example of FIG. 9H, a navigation menu 928 can be displayed allowing a user to access a variety of user interfaces, such as shown in example screenshot 900h.

Returning to the example of FIG. 9G, a risk and opportunity analysis window can allow users to view discussion posts associated with a corresponding segment (e.g., a Cosmo Cola brand segment within a Mass Market segment), as well as generate new postings relating to the segment. For instance, a window 925 can be provided to allow a user (such as an owner accessing and analyzing views of a plan model assigned to the owner) to generate a new post to be associated with a corresponding segment. For instance, the user can select a portion (e.g., column 927) of graph 914 to filter the view to focus on a period M04-2013 in the revenue forecasts for the Cosmo Cola brand segment. Accordingly, new postings generated within this context (e.g., using window 925) are automatically tagged and associated with Cosmo Cola, period M04-2013, and the Mass Market segment (the parent of Cosmo Cola) as shown through tags 929.

Figure 9I:
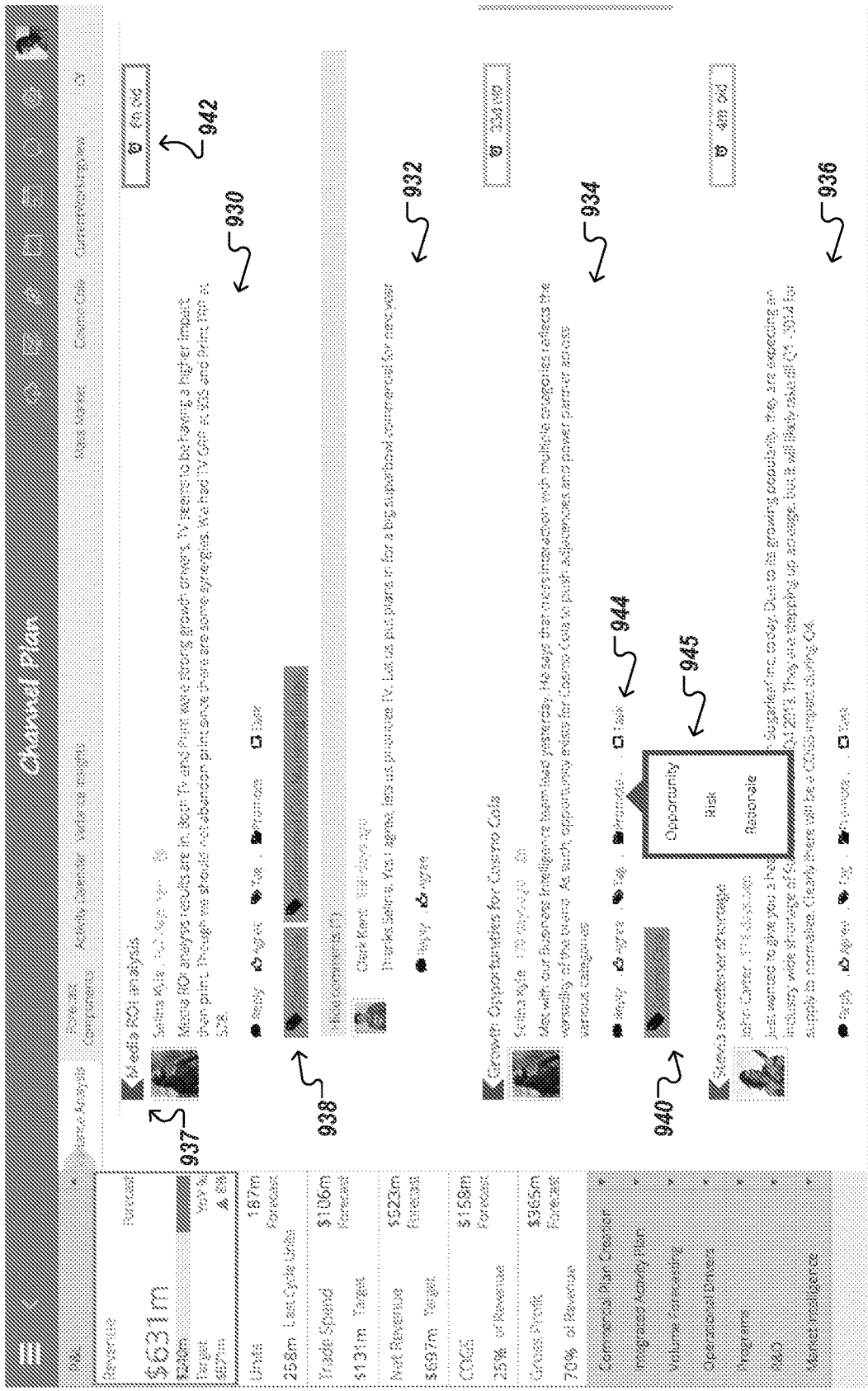

Turning now to FIG. 9I, a set of postings can be identified that are associated with a particular segment (e.g., Cosmo Cola). These postings can be presented to a user, such as an owner of the segment. The postings can be generated by users participating in discussions hosted on one or several of the planning system, an email server of an organization, a social networking platform, discussion board platform, or other discussion or collaboration platforms whose data is accessible using the planning system. The screenshot 900i shows a collection of postings (e.g., 930, 932, 934, 936) identified and tagged (e.g., 938, 940) as associated with the segment. The postings can be generated by a variety of different users through a variety of different collaboration and discussion platforms. Some of the postings can include replies (or comments) (e.g., 930) to other postings (e.g., 930). Additionally, some of the postings can be promoted as evidence of a risk or opportunity. In some implementations, a visual indicator (e.g., 937) can be presented with the posting to indicate whether the posting has been designated as a risk or opportunity. The user interface can present additional information concerning the postings, including indications (e.g., 942) of when the postings were created and whether the postings are recent, old, etc.

Controls 944 can be provided to allow a user to promote a particular posting (e.g., 934) as evidence of an opportunity or risk, or as evidence of the accuracy of an assumption (or "rationale") pertaining to a particular segment (e.g., the segments to which the posting is tagged). For instance, a user can select a Promote control associated with the posting (e.g., 934) to cause a dropdown menu 945 to be presented, allowing the user to designate the posting 934 as evidence of either an opportunity, risk, or rationale corresponding to the segment. For instance, in the particular example of FIG. 9I, the discussion post 934 discusses that "[an] opportunity exists for Cosmo Cola to push adjacencies and power partner across various categories," which a user can interpret as representing an opportunity for Cosmo Cola. Accordingly, the user can select to promote the post 934 as an "Opportunity" using the dropdown menu 945. The user can further elect, in some instances, to add a reply or comment to the posting describing why the posting was promoted by the user, among other examples.

Figure 9J:
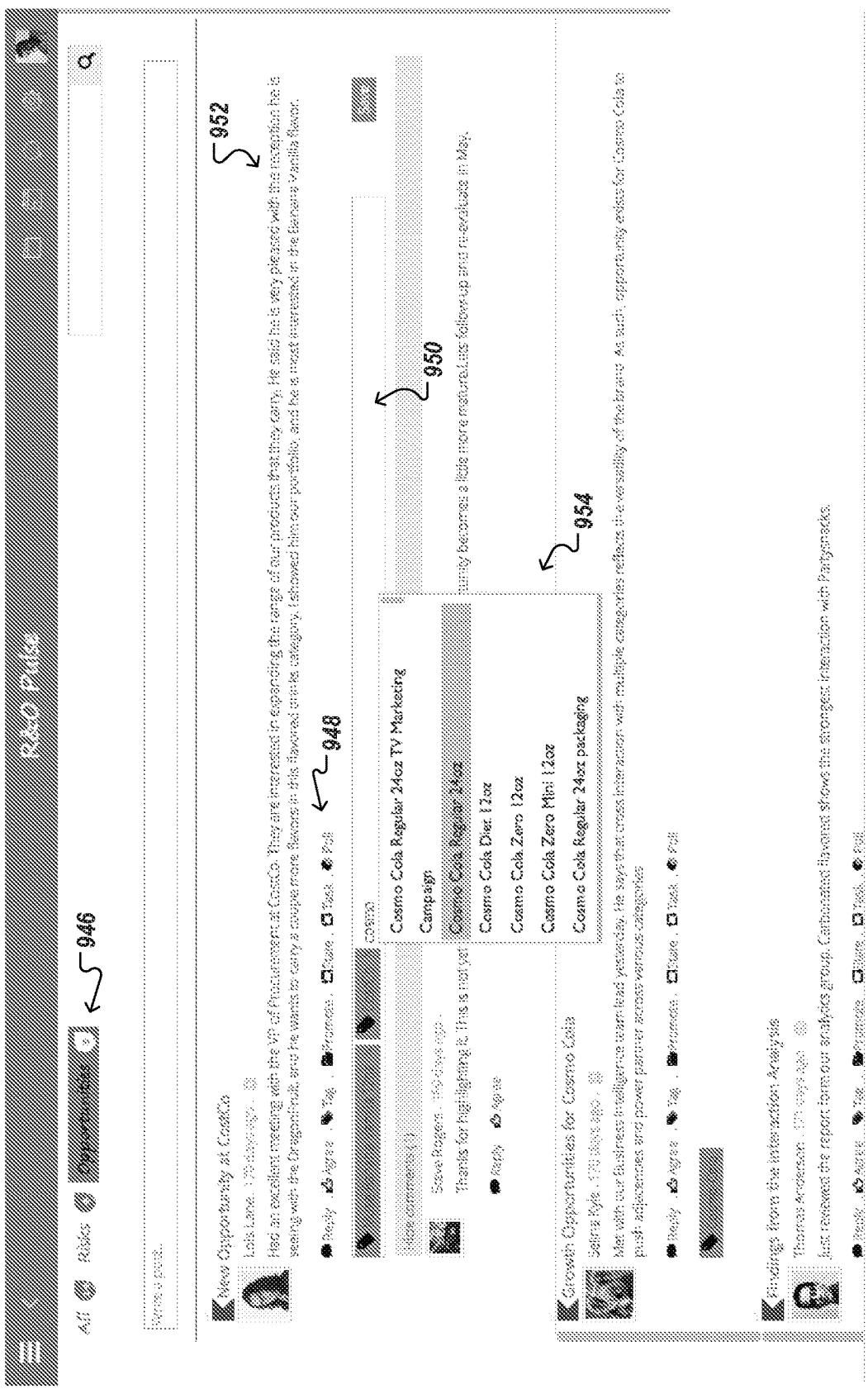

Turning to FIG. 9J, in some implementations, a user can filter (using controls 946) a set of discussion posts identified as associated with a segment based on whether the posts have been promoted to evidence of a risk or opportunity. The screenshot 900j further shows an example of a user adding a tag to one or more postings in a collection of postings to associate the postings within corresponding segments modeled in plan models of a planning system. For instance, using controls 948, a user can select a Tag control to cause a text box 950 to be presented to the user to allow the user to designate a tag to associate the post 948 with a portion of a plan model. In some implementations, the user can enter text in text box 950 causing tag suggestions to be dynamically presented in a menu 954 corresponding to business entities modeled in one or more models (including plan models) of a planning system. For instance, the planning system can identify models, sub-models, or attributes within models of the planning system that correspond to text entered by the user in textbox 950. The user can then select the desired available tag (e.g., Cosmo Cola Regular 24 oz corresponding to a product business entity defined in a plan model) from the menu 954 and cause the tag, and the corresponding business entity to be associated with the posting 952. Additionally, the tag can cause additional associations to be made with the post 952, such as the parent brand "Cosmo Cola" of the Cosmo Cola Regular 24 oz product, and the "Mass Market" segment of an organization (which is the parent of the Cosmo Cola brand), among other examples. These associations can then be used in future analyses and to pair the tagged posts with users associated with the business entities and segments corresponding to the assigned tags.

Figure 9K:
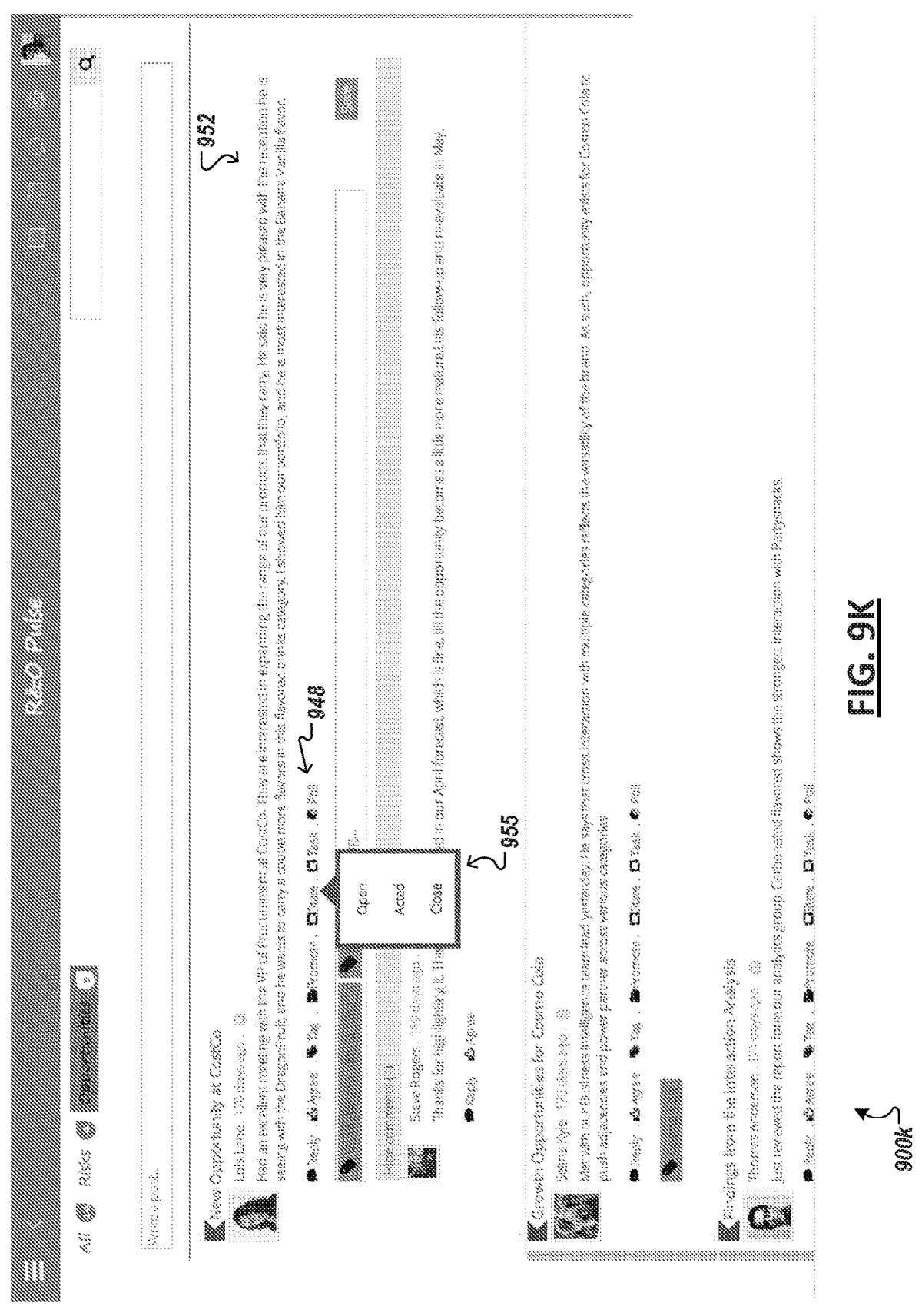

Other user actions can be taken associated with a discussion post. For instance, a user can create a task (from controls 948), such as in the example of FIG. 9F. Other actions can be taken, such as the assignment of a state to be associated with a post. For instance, as shown in the example of FIG. 9K, the State control can be selected by a user from control menu 948 to cause a dropdown menu 955 to be presented to the user in response. The state can correspond to a resolution state of a risk or opportunity related to a particular discussion post (e.g., 952). For instance, once a post has been associated with (i.e., promoted to) a risk or opportunity, a state can be defined for the post. States can indicate whether a risk or opportunity has been addressed. States can include, as examples, Open (e.g., where no action has been prescribed or completed), Acted (e.g., where action has been prescribed, such as through the creation of one or more tasks for the risk or opportunity (e.g., using the Task control), but the risk or opportunity is not yet resolved), and Close (e.g., when the risk or opportunity is judged to be fully addressed, such as in response to the completion of one or more tasks), among potentially many other examples. An owner can control the state of a risk or opportunity using dropdown box 955 and selecting or changing the state that is to be assigned to a particular risk or opportunity. In some instances, state dropdown box 955 can be hidden within a set of controls (e.g., 948) displayed in connection with a post (e.g., 952) and only exposed in response to the promotion of the post (e.g., through the Promote control) to a risk, opportunity, or rationale. In other cases, the State control can be made available within particular user interfaces, such as a user interface associated with reviewing previously promoted risks and opportunities (e.g., a R&O Pulse window), among other examples. The set of posts promoted to risk or opportunity status and presented to a user, such as a corresponding segment owner, can be filtered or sorted based on the state assigned to the post.

A variety of different controls (e.g., 948) can be provided natively with a discussion platform's client interface. In some platforms, such as platforms linked or provided explicitly in connection with a planning system, the discussion platform can include more traditional controls, such as "Reply" and "Like" or "Agree" together with the additional planning-specific tools used in connection with, and in some cases supported by, plan models of the planning system, such the "Tag", "Promote", "State", and "Task" controls introduced above. Other discussion platforms, such as third party platforms (e.g., platforms not controlled by nor natively interoperable with the planning system), may not natively provide planning-specific controls. However, in some implementations, the functionality of such third party discussion platforms can be extended to include planning system-specific controls (e.g., "Tag", "Promote", "State", and "Task" controls), through a plug-in or other modification. In such instances, general purpose discussion tools, such as social network platforms, instant messaging platforms, email platforms, and/or discussion board platforms can be modified to provide controls, including planning system specific controls, and permit discussion posts on these platforms to be associated with risks, opportunities, and modeling assumptions associated with business entities modeled by the planning system. Not only this, tasks and state management associated with the planning system can also be launched directly from user interfaces of these discussion and collaboration platforms, for instance, using a plug-in to supplement the functionality of the platforms with planning system user interface controls, including those example controls described herein among other examples.

Figure 9L:

Turning now to the example of FIG. 9L, in some implementations, a discussion platform can be integrated with programs and logic of a planning system that allows users, such as segment owners, to review and manage collections of discussion posts (from potentially multiple different discussion platforms and authored by potentially multiple different users) as well as promote posts (to risk, opportunity, or rationale) and assign and manage tasks and state of the promoted posts. Accordingly, in some instances, a user can even generate a new post within the user interfaces of the planning system, for instance, using a post editor window 958. The newly created post can be tagged (automatically by the planning system or manually by the user) to business entities modeled by the planning system and can also be promoted to a risk or opportunity. Further, the post can be shared with other users within a planning system (e.g., using "Share with" control 962), and the new post can be viewable by these users (e.g., for further comments, promotion, task assignments, and so on).

Figure 9M:
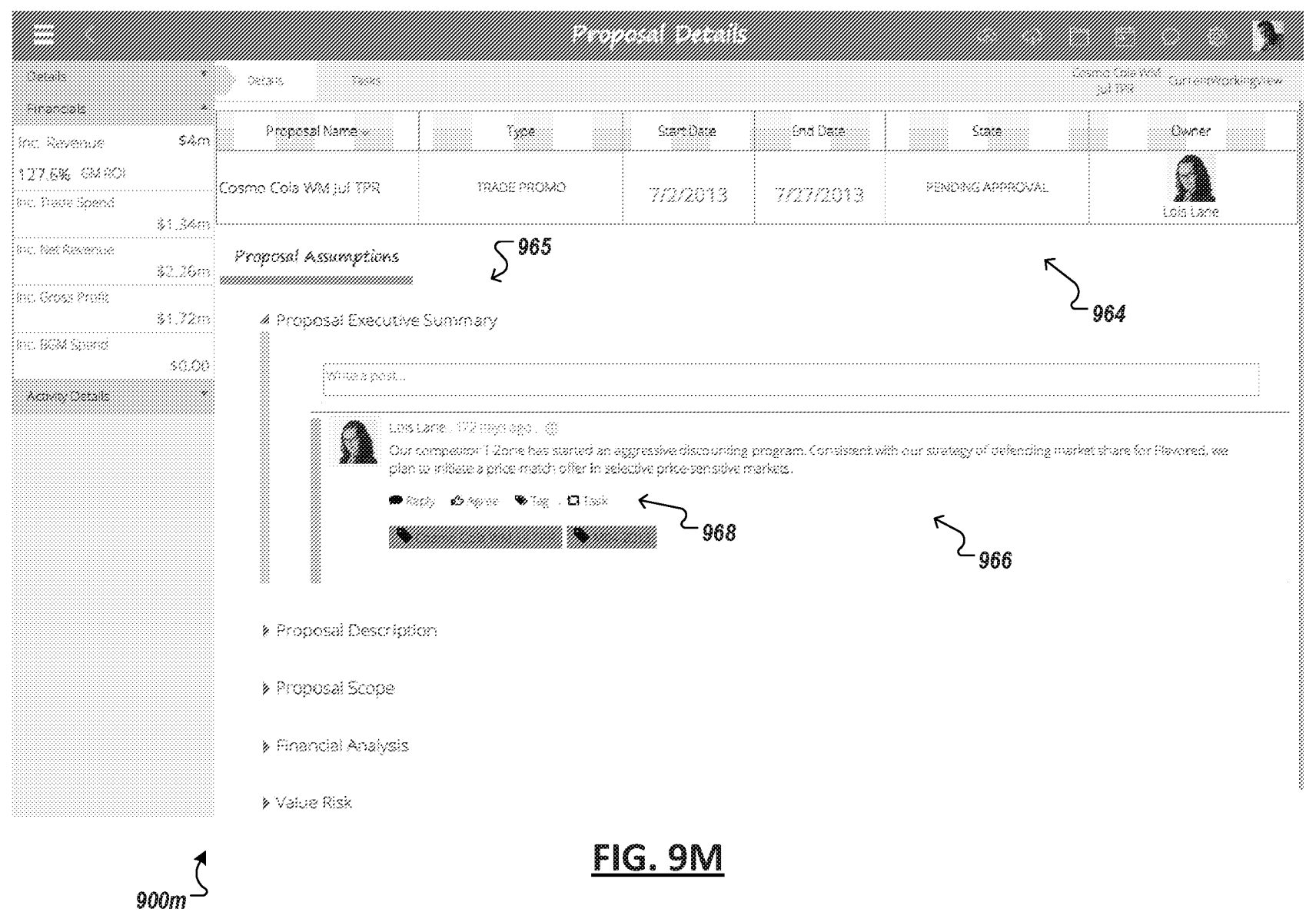

In another example, shown in FIG. 9M, a planning system can include models, such as plan models, that enable modeling of various new and existing business proposals. Assumptions for such proposals (and corresponding models can include proposal scope, financial analysis, value risk, and among other example assumptions. A graphical representation (e.g., 964) of information included in a model of the proposal can be presented, as well as user interfaces for assessing the assumptions of the model and analyzing discussion data collected and determined to be relevant to the proposal and its assumptions. Accordingly, as in previous examples, a comment or other post (e.g., 966) can be identified or generated in the user interface and associated with the post. Controls (e.g., 968) can be provided to allow user intelligence embodied in the content of the post, as well as readers' reactions to the post, to be entered and associated with the associated business entities (e.g., Cosmo Cola) and proposal, among other examples.

The systems, processes, and tools can be utilized to provide solutions that integrate information, included in the massive amounts of largely free form communications that occur within, are sent or received by, or that reference an organization, with the planning activities of the organization. Risks and opportunities that potentially effect the organization' plans can be quickly identified from the content of these communications (or discussion or collaboration data) and connected to these planning activities, including the persons in charge of that planning. Accordingly, such solutions can enable the intelligent propagation and connection of discussions to relevant enterprise plans and the owners of those plans. Additionally, a variety of assumptions are made within the decision making/planning processes of an organization. A planning system can be further equipped with functionality for discovering, from these communications, the knowledge of potentially many persons to inform decision makers and planners of the accuracy of these assumptions (and thereby also the assumptions of their models). These tools can help people participating in the planning process to collaborate within themselves and also seek/solicit inputs from other stakeholders (in some cases in real time) by connecting plans (and exceptions).

FIGS. 10A-10E include simplified flowcharts 1000a-e illustrating example techniques for integrating plan modeling and user communications. In the flowchart 1000a of FIG. 10A, for instance, a user communication can be identified 1005, such as an email, social network post, instant message, discussion post, transcription of an audio conversation or conference, etc. An indication by a user can be identified 1010 that indicates that the communication represents evidence of a risk or opportunity to an organization. The indication can be received in connection with the presentation of the communication to the user who participated in the communication or from another non-participant user viewing the presentation of the communication. Based on the indication, the communication can be associated 1015 with the risk or opportunity. Further, the communication can be identified as relating to a particular business entity and the risk or opportunity can be associated with the business entity based on this identified relationship. Additionally, various tasks can be performed in connection with managing the risk or opportunity relating to the communication, including the creation and management of tasks, validation of the risk/opportunity, modification of a modeling assumption in response to the risk/opportunity, among other examples.

Figures 10A, 10B:
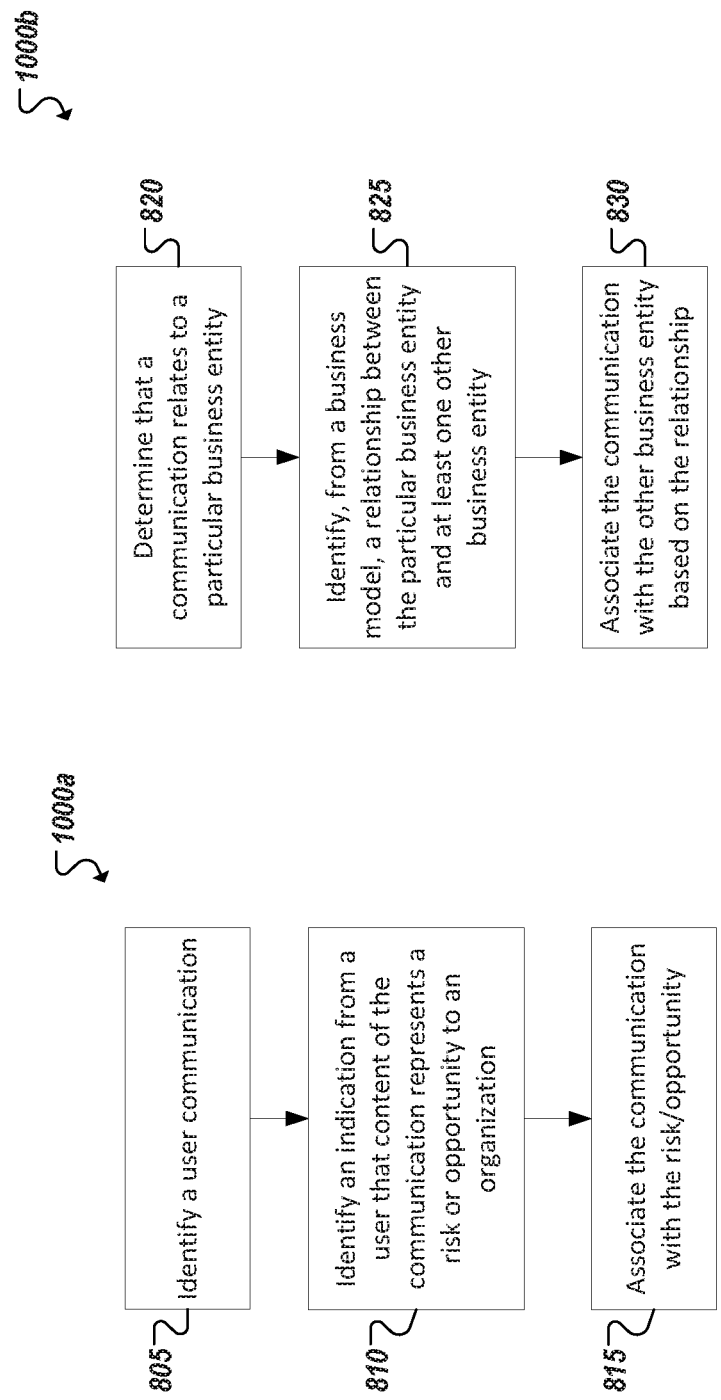
FIGS. 10A-10E are flowcharts of example techniques for integrating planning and collaboration in accordance with at least some embodiments.

Turning to FIG. 10B, a user communication can be determined 1020 to include content that relates to a particular one of a plurality of business entities. A relationship between the particular business entity and another business entity can be defined in one or more software-based models and the relationship can be identified 1025 from these models. By virtue of this relationship, the communication can also be associated 1030 with the other business entity. Additionally, associations of the communication or particular business entity with tags, risks/opportunities, assumption accuracy feedback, tasks, and other actions can be propagated to cause the same to be associated with the other business entity.

Figures 10C, 10D:
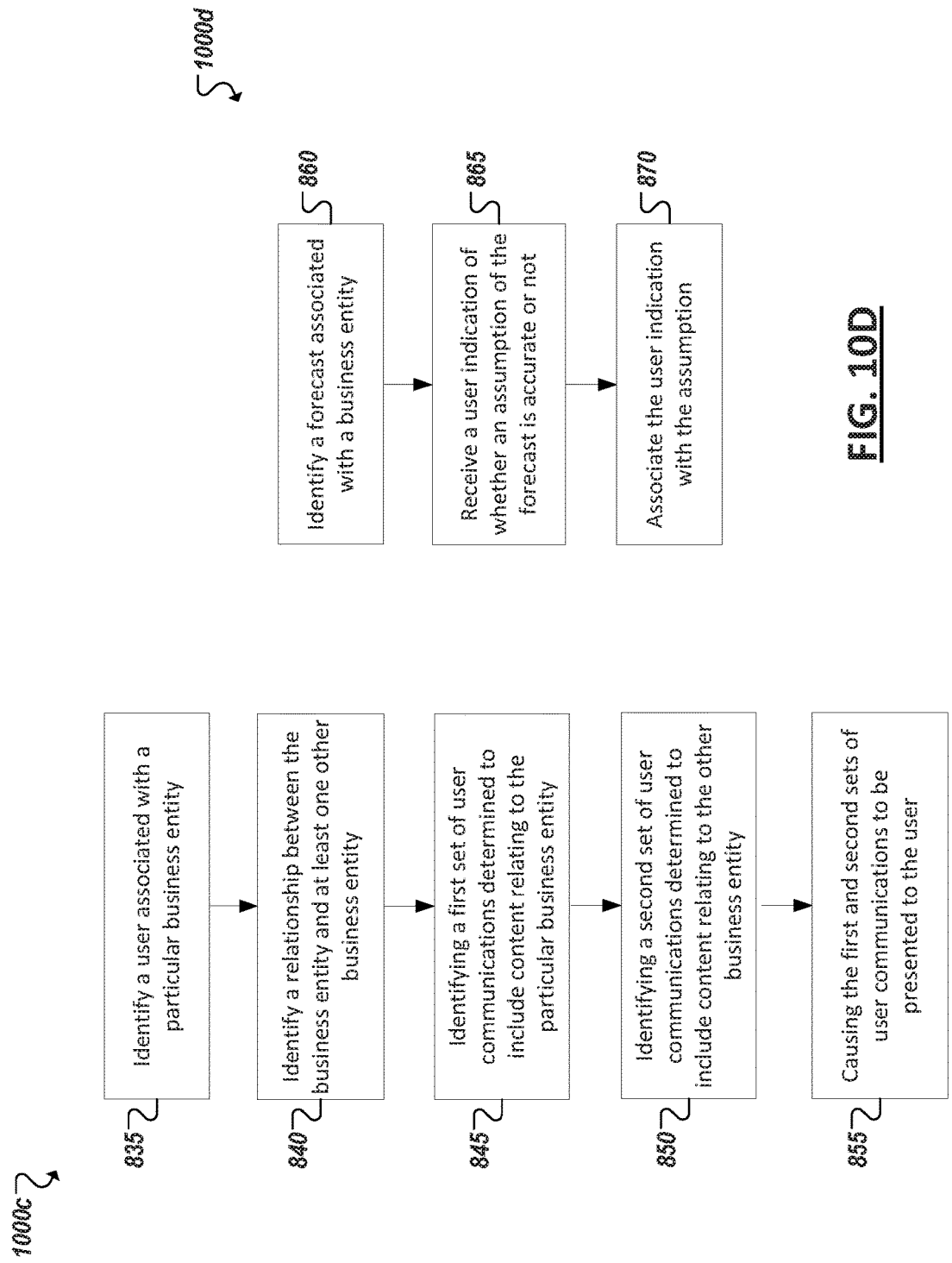

In FIG. 10C, a user can be identified 1035 as being associated with a particular business entity (e.g., based on a role of the user within the business, planning responsibilities with regard to the business entity, etc.). A relationship can be identified 1040 between the business entity and at least one other business entity. A first set of user communications (including user communications from users other than the user) can be identified 1045 as including content that relates to the particular business entity. Additionally, a second set of user communications can be identified 1050 as including content that relates to the other business entity. The first and second sets of user communications can be caused 1055 to be presented to the user based on these relationships. For instance, a dashboard or email can be provided for the user summarizing the communications that have been identified as relating to business entities for which the user has responsibility, among other examples.

Turning to FIG. 10D, communications can also be associated with forecast assumptions to provide additional intelligence regarding the accuracy of a forecast of a business model (such as a forecast included in a plan or goal model). A forecast can be identified 1060 that is modeled by a software-based model, the model including one or more assumptions underlying the forecast. The forecast can be identified 1060 as associated with a business entity, for instance, due to the model modeling the business entity. A user indication can be received or otherwise identified 1065 indicating whether a particular one of the assumptions is accurate or not and the indication can be associated 1070 with the assumption (such as in a model of the assumption). The indication can be based on evidence included in a user communication that relates to the business entity, and this communication can also be associated with the assumption. The assumption can also be modified to correct an inaccuracy, such as in response to the indication. Further, the historical accuracy of an assumption (or the user providing the assumption) can be calculated based on user indications of assumptions' accuracy, among other examples.

Figure 10E:
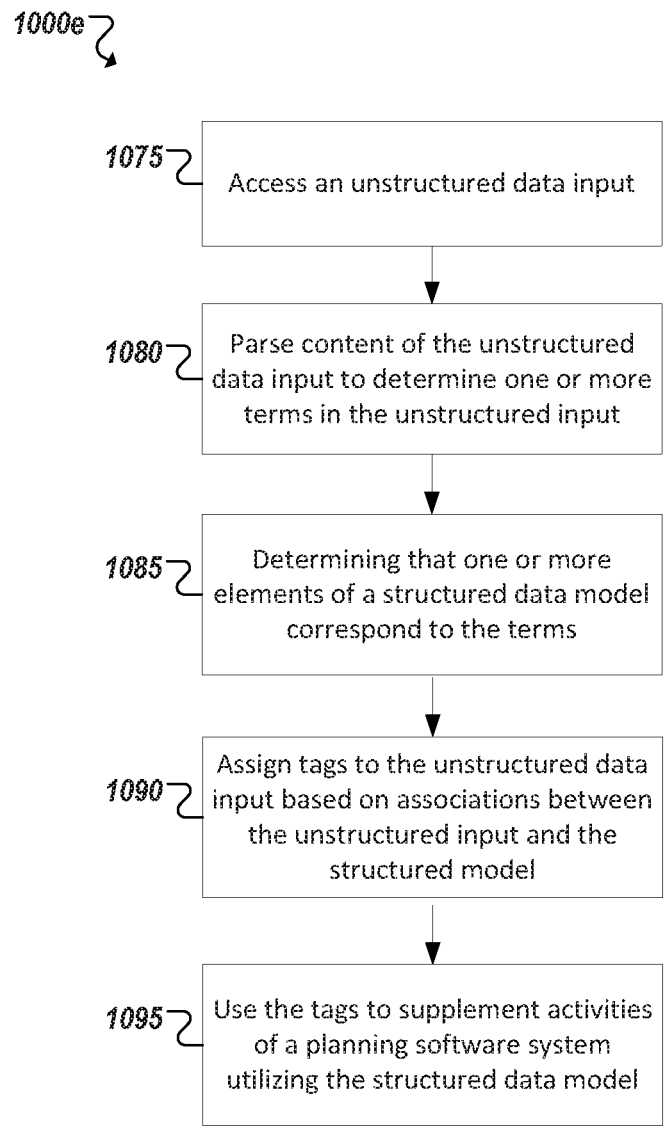

Turning to FIG. 10E, an unstructured data input, such as an email or other electronic communication, can be accessed 1075. The unstructured data input may be a single unstructured input or one of a plurality of input included in a stream or collection of unstructured inputs. In some cases, the source the unstructured data input can be received or otherwise accessed via an API facilitating communication between an application providing the unstructured data input and a data scanner (or planning software system hosting the data scanner). Content of the unstructured data input can be parsed 1080 (e.g., using natural language processing techniques) to determine (meanings of) terms or phrases within the content of the unstructured data input. The terms can be mapped to particular elements of a structured data model, such as one or more plan models in an interconnected network of plan models, to determine 1085 that these particular elements correspond to the terms (and thereby the unstructured data input).

Based on the determined correspondence between the unstructured data input and particular elements (and/or specific attributes of these elements), one or more tags can be assigned 1090 to the unstructured data input to define the association between the unstructured data input and the structured data model. The tags, in some cases, can also represent how the unstructured data input is related to the structured data model by defining that the unstructured data input specifically corresponds to the one or more particular elements of the model. In some cases, sub-models of the structured data model may correspond to the particular elements and the tags can link the unstructured data input to these corresponding sub-models. The tags can be used 1905 (e.g., by a planning system) to supplement and enhance planning activities performed using the planning system. For instance, values of the structured data model can be augmented or modified to reflect information collected from the parsing of the unstructured data input and graphical representations generated for visualizing the particular elements of the structured data model can be supplemented with presentations of (or controls to access presentation of) the associated unstructured data inputs (e.g., tagged with corresponding tags), among other examples.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. Systems and tools illustrated can similarly adopt alternate architectures, components, and modules to achieve similar results and functionality. For instance, in certain implementations, multitasking, parallel processing, and cloud-based solutions may be advantageous. Additionally, diverse user interface layouts, structures, architectures, and functionality can be supported. Other variations are within the scope of the following claims.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. A computer storage medium can be a non-transitory medium. Moreover, while a computer storage medium is not a propagated signal per se, a computer storage medium can be a source or destination of computer program instructions encoded in an artificially generated propagated signal. The computer storage medium can also be, or be included in, one or more separate physical components or media (e.g., multiple CDs, disks, or other storage devices), including a distributed software environment or cloud computing environment.

Networks, including core and access networks, including wireless access networks, can include one or more network elements. Network elements can encompass various types of routers, switches, gateways, bridges, load balancers, firewalls, servers, inline service nodes, proxies, processors, modules, or any other suitable device, component, element, or object operable to exchange information in a network environment. A network element may include appropriate processors, memory elements, hardware and/or software to support (or otherwise execute) the activities associated with using a processor for screen management functionalities, as outlined herein. Moreover, the network element may include any suitable components, modules, interfaces, or objects that facilitate the operations thereof. This may be inclusive of appropriate algorithms and communication protocols that allow for the effective exchange of data or information.

The operations described in this specification can be implemented as operations performed by a data processing apparatus on data stored on one or more computer-readable storage devices or received from other sources. The terms "data processing apparatus," "processor," "processing device," and "computing device" can encompass all kinds of apparatus, devices, and machines for processing data, including by way of example a programmable processor, a computer, a system on a chip, or multiple ones, or combinations, of the foregoing. The apparatus can include general or special purpose logic circuitry, e.g., a central processing unit (CPU), a blade, an application specific integrated circuit (ASIC), or a field-programmable gate array (FPGA), among other suitable options. While some processors and computing devices have been described and/or illustrated as a single processor, multiple processors may be used according to the particular needs of the associated server. References to a single processor are meant to include multiple processors where applicable. Generally, the processor executes instructions and manipulates data to perform certain operations. An apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, module, (software) tools, (software) engines, or code) can be written in any form of programming language, including compiled or interpreted languages, declarative or procedural languages, and it can be deployed in any form, including as a standalone program or as a module, component, subroutine, object, or other unit suitable for use in a computing environment. For instance, a computer program may include computer-readable instructions, firmware, wired or programmed hardware, or any combination thereof on a tangible medium operable when executed to perform at least the processes and operations described herein. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Programs can be implemented as individual modules that implement the various features and functionality through various objects, methods, or other processes, or may instead include a number of sub-modules, third party services, components, libraries, and such, as appropriate. Conversely, the features and functionality of various components can be combined into single components as appropriate. In certain cases, programs and software systems may be implemented as a composite hosted application. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. Additionally, applications may represent web-based applications accessed and executed via a network (e.g., through the Internet). Further, one or more processes associated with a particular hosted application or service may be stored, referenced, or executed remotely. For example, a portion of a particular hosted application or service may be a web service associated with the application that is remotely called, while another portion of the hosted application may be an interface object or agent bundled for processing at a remote client. Moreover, any or all of the hosted applications and software service may be a child or sub-module of another software module or enterprise application (not illustrated) without departing from the scope of this disclosure. Still further, portions of a hosted application can be executed by a user working directly at a server hosting the application, as well as remotely at a client.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), tablet computer, a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device, including remote devices, which are used by the user.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include any internal or external network, networks, sub-network, or combination thereof operable to facilitate communications between various computing components in a system. A network may communicate, for example, Internet Protocol (IP) packets, Frame Relay frames, Asynchronous Transfer Mode (ATM) cells, voice, video, data, and other suitable information between network addresses. The network may also include one or more local area networks (LANs), radio access networks (RANs), metropolitan area networks (MANS), wide area networks (WANs), all or a portion of the Internet, peer-to-peer networks (e.g., ad hoc peer-to-peer networks), and/or any other communication system or systems at one or more locations.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

The following examples pertain to embodiments in accordance with this Specification. One or more embodiments may provide an apparatus, a system, a machine readable storage, a machine readable medium, a method, and hardware- and/or software-based logic (e.g., implemented in connection with a shared memory controller) to determine that a communication by a first user within a digital collaboration relates to a particular business entity, identify, from one or more business models, a relationship between one or more additional business entities and the particular business entity, and associate the communication with the additional business entities based on the relationship.

In one or more examples, the communication can be associated with one or more other users based on relationships defined between the one or more other users and the business entities. The relationships between the users and the business entities can be based at least in part on roles of the users within an organization. The communication can be presented to at least a particular one of the one or more users based on the relationship, and the particular user can be allowed to perform one or more actions relating to the communication. The one or more actions can include associating the communication with a rationale for an assumption of the model. The one or more actions can include associating the communication with a risk involving the particular business entity. The one or more actions can include associating the communication with an opportunity involving the particular business entity. The one or more actions can include associating the communication with another business entity. The one or more actions can include assigning a task associated with the communication. The one or more actions can include generating a comment in reply to the communication.

In further examples, the one or more business models can include a plan model modeling a business plan of an organization. A plan mode can represent a respective business outcome expressed as one or more respective outcome measures and include: one or more input drivers representing variables influencing the one or more outcome measures, a scope model defining a domain of the plan model to which the business outcome applies, and a sensitivity model corresponding to the domain and defining one or more dependencies between the input drivers and outcome measures. The relationship can be a hierarchical relationship. The relationship can include both a hierarchical relationship and a non-hierarchical relationship. Tags corresponding to the business entities can be presented with the communication. The business entities can each include at least a respective one of a market segment, a product category, a product, a brand, and a business unit. Determining that a communication by a first user within a digital collaboration relates to a particular business entity can include analyzing text corresponding to the communication to identify a correlation between at least a portion of the text and at least one model modeling the particular business entity and/or identifying an assignment of a tag to the communication by a user, wherein the tag corresponds to the particular business entity. Tags can be assigned through an interactive control presented with the communication in a user interface. The interactive control can be provided that accepts text from a user and provides suggestions for the tags from business entities included in the one or more business models. The relationship can be defined in a model and the model models a plurality of market segments.

One or more embodiments may provide an apparatus, a system, a machine readable storage, a machine readable medium, a method, and hardware- and/or software-based logic (e.g., implemented in connection with a shared memory controller) to identify a forecast modeled by a software-based and associated with a particular business entity, receiving a user indication that the communication includes an indication of whether at least a particular one of the assumptions is accurate, and associating the user indication with the assumption. The forecast can be generated using a model modeling one or more assumptions, where the forecast is based on the one or more assumptions.

In one or more examples, it can be identified that a communication by a user within a digital collaboration relates to the particular business entity and that content of the communication relates to whether the particular assumption is accurate. The content of the communication can be determined to relate to whether the particular assumption is accurate based on a user input. The communication can be presented in a set of communications identified as related to the particular business entity and the input can be received through a control presented with the communication. The communication can be by a first user and the user input can be received from a user different from the first user. The different user can be identified as a user authorized to provide the user input for assumptions associated with the particular business entity. A modification of the assumption can be received. The modification can modify the model and the model can include a plan model modeling a business plan of an organization. The plan model can represent a respective business outcome expressed as one or more respective outcome measures and include one or more input drivers representing variables influencing the one or more outcome measures, a scope model defining a domain of the plan model to which the business outcome applies, and a sensitivity model corresponding to the domain and defining one or more dependencies between the input drivers and outcome measures. The user indication can include an indication that the assumption is inaccurate and further include an indication of how the assumption is inaccurate.

In further examples, the user indication can include an indication that the assumption is accurate. An historical assumption accuracy can be calculated for the assumption based on accuracy of the assumption over a plurality of cycles. The assumption can correspond to one of a plurality of planning cycles for an organization, such as a current or future planning cycle. The assumption can be a particular one of a plurality of assumptions for the business entity, and a graphical user interface can be provided that represents each of the plurality of assumptions. Representations of the plurality of assumptions can include interactive representations and user indication can be received through a particular one of the interactive representations corresponding to the particular assumption.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A system comprising:
   at least one processor; and
   memory including instructions that, when executed by the at least one processor, cause the at least one processor to perform operations to:
   access an unstructured data input by issuing an application programming interface (API) call to an API interface of a planning system, wherein the unstructured data input comprises an electronic communication;
   parse content of unstructured data of the unstructured data input to produce parse output;
   apply a machine learning algorithm to the parse output to determine, based on probabilities calculated as output by the machine learning algorithm, one or more terms in the unstructured data input based on semantic definitions of the unstructured data identified through evaluation of context of text of the unstructured data using natural language processing;
   determine that one or more particular elements defined in a structured data model correspond to the one or more terms, wherein the structured data model comprises a business model identified based on the semantic definitions of the unstructured data;
   assign, from a set of predefined tags, a set of tags to the unstructured data based on the one or more terms corresponding to the one or more particular elements, wherein each tag of the set of tags defines an association between the unstructured data and the structured data model;
   embed the set of tags in the unstructured data by mapping metadata to elements of the unstructured data;
   evaluate a tag of the set of tags with a machine learning component to determine that the tag does not improve the association between the unstructured data and the structured data model when executing an activity using a plan model;
   based on determining that the tag does not improve the association, remove the tag from the set of tags;
   receive a search query for a tag of the set of tags;
   identify that the unstructured data input relates to the structured data model and plan model interactions of a user;
   in response to the query, modify a value of an attribute defined within the structured data model with content extracted from unstructured content based on the tag; and
   generate query response in a user interface view in a graphical user interface that includes an interactive structured data model representation illustrating the plan model interactions and the modified value.

2. The system of claim 1, the memory further comprising that, when executed by the at least one processor, cause the at least one processor to perform operations to:
   determine at least one tag of the set of tags is unhelpful to users based on an evaluation of monitored user interactions with inputs in the planning system that are tagged using the at least one tag.

3. The system of claim 2, the memory further comprising that, when executed by the at least one processor, cause the at least one processor to perform operations to:
   automatically unassign the at least one tag of the set of tags from unstructured data assigned the at least one tag;
   identify a particular element from unassigned unstructured data corresponding to a term where a tag is not defined;
   generate a new tag, outside the set of predefined tags, for the particular element based on the term; and
   assign the new tag to the unstructured data corresponding to the term.

4. The system of claim 1, the memory further comprising that, when executed by the at least one processor, cause the at least one processor to perform operations to:
   receive a search query that identifies the business model and a search term;
   execute the search query against the structured data model and the unstructured data;
   retrieve structured search results from the structured data model based on the search term;
   retrieve unstructured results from the unstructured data based on the association between the unstructured data and the structured data model; and
   output a combined search result including the structured search results and the unstructured results for display in a planning user interface.

5. The system of claim 1, wherein the instructions to access the unstructured data input comprises instructions to receive the unstructured data input from another system contemporaneously with creation of the unstructured data input.

6. The system of claim 1, the memory further comprising that, when executed by the at least one processor, cause the at least one processor to perform operations to cause one or more values included in the unstructured data input to populate data in the structured data model that correspond to an attribute associated with one of the one or more particular elements.

7. The system of claim 1, the memory further comprising that, when executed by the at least one processor, cause the at least one processor to perform operations to cause the unstructured data input to be presented together with a visualization of the structured data model based on the set of tags.

8. A method comprising:
   accessing an unstructured data input by issuing an application programming interface (API) call to an API interface of a planning system, wherein the unstructured data input comprises an electronic communication;
   parsing content of unstructured data of the unstructured data input to produce parse output;
   applying a machine learning algorithm to the parse output to determine, based on probabilities calculated as output by the machine learning algorithm, one or more terms in the unstructured data input based on semantic definitions of the unstructured data identified through evaluation of context of text of the unstructured data using natural language processing;

determining that one or more particular elements defined in a structured data model correspond to the one or more terms, wherein the structured data model comprises a business model identified based on the semantic definitions of the unstructured data;

assigning, from a set of predefined tags, a set of tags to the unstructured data based on the one or more terms corresponding to the one or more particular elements, wherein each tag of the set of tags defines an association between the unstructured data and the structured data model;

embedding the set of tags in the unstructured data by mapping metadata to elements of the unstructured data;

evaluating a tag of the set of tags with a machine learning component to determine that the tag does not improve the association between the unstructured data and the structured data model when executing an activity using a plan model;

based on determining that the tag does not improve the association, removing the tag from the set of tags;

receiving a search query for a tag of the set of tags;

identifying that the unstructured data input relates to the structured data model and plan model interactions of a user;

in response to the query, modifying a value of an attribute defined within the structured data model with content extracted from unstructured content based on the tag; and generating query response in a user interface view in a graphical user interface that includes an interactive structured data model representation illustrating the plan model interactions and the modified value.

9. The method of claim 8, further comprising:
determining at least one tag of the set of tags is unhelpful to users based on an evaluation of monitored user interactions with inputs in the planning system that are tagged using the at least one tag.

10. The method of claim 9, further comprising:
automatically unassigning the at least one tag of the set of tags from unstructured data assigned the at least one tag;
identifying a particular element from unassigned unstructured data corresponding to a term where a tag is not defined;
generating a new tag, outside the set of predefined tags, for the particular element based on the term; and
assigning the new tag to the unstructured data corresponding to the term.

11. The method of claim 8, further comprising:
receiving a search query that identifies the business model and a search term;
executing the search query against the structured data model and the unstructured data;
retrieving structured search results from the structured data model based on the search term;
retrieving unstructured results from the unstructured data based on the association between the unstructured data and the structured data model; and
outputting a combined search result including the structured search results and the unstructured results for display in a planning user interface.

12. The method of claim 8, wherein accessing the unstructured data input comprises receiving the unstructured data input from another system contemporaneously with creation of the unstructured data input.

13. The method of claim 8, further comprising causing one or more values included in the unstructured data input to populate data in the structured data model corresponding to an attribute associated with one of the one or more particular elements.

14. The method of claim 8, further comprising causing the unstructured data input to be presented together with a visualization of the structured data model based on the set of tags.

15. At least one non-transitory machine-readable medium including instructions that, when executed by at least one processor, cause the at least one processor to perform operations to:

access an unstructured data input by issuing an application programming interface (API) call to an API interface of a planning system, wherein the unstructured data input comprises an electronic communication;

parse content of unstructured data of the unstructured data input to produce parse output;

apply a machine learning algorithm to the parse output to determine, based on probabilities calculated as output by the machine learning algorithm, one or more terms in the unstructured data input based on semantic definitions of the unstructured data identified through evaluation of context of text of the unstructured data using natural language processing;

determine that one or more particular elements defined in a structured data model correspond to the one or more terms, wherein the structured data model comprises a business model identified based on the semantic definitions of the unstructured data;

assign, from a set of predefined tags, a set of tags to the unstructured data based on the one or more terms corresponding to the one or more particular elements, wherein each tag of the set of tags defines an association between the unstructured data and the structured data model;

embed the set of tags in the unstructured data by mapping metadata to elements of the unstructured data;

evaluate a tag of the set of tags with a machine learning component to determine that the tag does not improve the association between the unstructured data and the structured data model when executing an activity using a plan model;

based on determining that the tag does not improve the association, remove the tag from the set of tags;

receive a search query for a tag of the set of tags;

identify that the unstructured data input relates to the structured data model and plan model interactions of a user;

in response to the query, modify a value of an attribute defined within the structured data model with content extracted from unstructured content based on the tag; and generate query response in a user interface view in a graphical user interface that includes an interactive structured data model representation illustrating the plan model interactions and the modified value.

16. The at least one non-transitory machine-readable medium of claim 15, further comprising instructions that, when executed by the at least one processor, cause the at least one processor to perform operations to:

determine at least one tag of the set of tags is unhelpful to users based on an evaluation of monitored user interactions with inputs in the planning system that are tagged using the at least one tag.

17. The at least one non-transitory machine-readable medium of claim 16, further comprising instructions that, when executed by the at least one processor, cause the at least one processor to perform operations to:
   automatically unassign the at least one tag of the set of tags from unstructured data assigned the at least one tag;
   identify a particular element from unassigned unstructured data corresponding to a term where a tag is not defined;
   generate a new tag, outside the set of predefined tags, for the particular element based on the term; and
   assign the new tag to the unstructured data corresponding to the term.

18. The at least one non-transitory machine-readable medium of claim 15, further comprising instructions that, when executed by the at least one processor, cause the at least one processor to perform operations to:
   receive a search query that identifies the business model and a search term;
   execute the search query against the structured data model and the unstructured data;
   retrieve structured search results from the structured data model based on the search term;
   retrieve unstructured results from the unstructured data based on the association between the unstructured data and the structured data model; and
   output a combined search result including the structured search results and the unstructured results for display in a planning user interface.

19. The at least one non-transitory machine-readable medium of claim 15, wherein the instructions to access the unstructured data input comprises instructions to receive the unstructured data input from another system contemporaneously with creation of the unstructured data input.

20. The at least one non-transitory machine-readable medium of claim 15, further comprising instructions that, when executed by the at least one processor, cause the at least one processor to perform operations to cause one or more values included in the unstructured data input to populate data in the structured data model that correspond to an attribute associated with one of the one or more particular elements.

* * * * *